(12) United States Patent
Kontio et al.

(10) Patent No.: US 7,421,411 B2
(45) Date of Patent: Sep. 2, 2008

(54) DIGITAL RIGHTS MANAGEMENT IN A MOBILE COMMUNICATIONS ENVIRONMENT

(75) Inventors: Markku Kontio, Palojoki (FI); Juha-Pekka Sipponen, Espoo (FI); Tapio Ylitalo, Espoo (FI)

(73) Assignee: Nokia Corporation, Espoo (FI)

( * ) Notice: Subject to any disclaimer, the term of this patent is extended or adjusted under 35 U.S.C. 154(b) by 452 days.

(21) Appl. No.: 10/095,062

(22) Filed: Mar. 12, 2002

(65) Prior Publication Data

US 2005/0004875 A1    Jan. 6, 2005

Related U.S. Application Data

(60) Provisional application No. 60/303,157, filed on Jul. 6, 2001.

(51) Int. Cl.
*G06Q 99/00* (2006.01)

(52) U.S. Cl. .............. 705/52; 705/51; 705/57; 705/59; 705/65; 705/67; 726/28; 726/29; 726/30; 380/200; 380/201; 380/202

(58) Field of Classification Search .......... 705/50–59; 713/182; 380/200–203, 210, 277–286; 726/26–33
See application file for complete search history.

(56) References Cited

U.S. PATENT DOCUMENTS

| | | | |
|---|---|---|---|
| 4,114,139 A | 9/1978 | Boyd et al. | |
| 4,227,253 A | 10/1980 | Ehrsam et al. | |
| 4,577,289 A | 3/1986 | Comerford et al. | |
| 4,644,493 A | 2/1987 | Chandra et al. | |
| 4,714,992 A | 12/1987 | Gladney et al. | |
| 4,757,534 A | 7/1988 | Matyas et al. | |
| 4,817,140 A | 3/1989 | Chandra et al. | |
| 4,866,769 A | 9/1989 | Karp | |
| 4,888,798 A | 12/1989 | Earnest | |
| 4,903,296 A | 2/1990 | Chandra et al. | |

(Continued)

FOREIGN PATENT DOCUMENTS

AU    739693    2/1998

(Continued)

OTHER PUBLICATIONS

Mori et al. "Superdistribution: The Concept and the Architecture", Paper from Transactions of the IEICE, vol. E 73, No. 7, Jul. 1990, pp. 1113-1146.

(Continued)

*Primary Examiner*—Jalatee Worjloh
(74) *Attorney, Agent, or Firm*—Morgan & Finnegan LLP

(57) ABSTRACT

A method, system, and computer program product for enabling a wireless device in a mobile communication environment to obtain rights to protected content of a digital asset. The digital asset is downloaded to the wireless device from any one of a plurality of content servers or other wireless devices. The digital asset comprising a content ID, content encrypted with a content key, and information on obtaining rights to the content being expressed in a voucher generated by a voucher server in the network. The method, system, and computer program product also creates the digital asset for downloading to a wireless device from one of a plurality of content servers in a network and generates a voucher at the voucher server.

18 Claims, 40 Drawing Sheets

U.S. PATENT DOCUMENTS

| | | |
|---|---|---|
| 4,930,073 A | 5/1990 | Cina, Jr. |
| 5,048,085 A | 9/1991 | Abraham et al. |
| 5,109,413 A | 4/1992 | Comerford et al. |
| 5,146,575 A | 9/1992 | Nolan, Jr. |
| 5,148,481 A | 9/1992 | Abraham et al. |
| 5,224,166 A | 6/1993 | Hartman, Jr. |
| 5,263,158 A | 11/1993 | Janis |
| 5,276,901 A | 1/1994 | Howell et al. |
| 5,287,407 A | 2/1994 | Holmes |
| 5,310,705 A | 5/1994 | Mitlitsky et al. |
| 5,349,643 A | 9/1994 | Cox et al. |
| 5,365,587 A | 11/1994 | Campbell et al. |
| 5,381,480 A | 1/1995 | Butter et al. |
| 5,392,351 A | 2/1995 | Hasebe et al. |
| 5,414,852 A | 5/1995 | Kramer et al. |
| 5,421,011 A | 5/1995 | Camillone et al. |
| 5,423,042 A | 6/1995 | Jalili et al. |
| 5,442,771 A | 8/1995 | Filepp et al. |
| 5,454,000 A | 9/1995 | Dorfman |
| 5,457,746 A | 10/1995 | Dolphin |
| 5,490,270 A | 2/1996 | Devarakonda et al. |
| 5,491,750 A | 2/1996 | Bellare et al. |
| 5,495,533 A | 2/1996 | Linehan et al. |
| 5,497,491 A | 3/1996 | Mitchell et al. |
| 5,500,897 A | 3/1996 | Hartman, Jr. |
| 5,504,757 A | 4/1996 | Cook et al. |
| 5,509,070 A | 4/1996 | Schull |
| 5,528,759 A | 6/1996 | Moore |
| 5,530,235 A | 6/1996 | Stefik et al. |
| 5,530,920 A | 6/1996 | Takeda |
| 5,532,920 A | 7/1996 | Hartrick et al. |
| 5,535,322 A | 7/1996 | Hecht |
| 5,537,642 A | 7/1996 | Iowny et al. |
| 5,539,826 A | 7/1996 | Dwork et al. |
| 5,539,828 A | 7/1996 | Davis |
| 5,542,046 A | 7/1996 | Carlson et al. |
| 5,546,573 A | 8/1996 | Obermann et al. |
| 5,560,008 A | 9/1996 | Johnson et al. |
| 5,563,946 A | 10/1996 | Cooper |
| 5,564,038 A | 10/1996 | Grantz et al. |
| 5,564,040 A | 10/1996 | Kubala |
| 5,598,470 A | 1/1997 | Cooper et al. |
| 5,629,980 A | 5/1997 | Stefik et al. |
| 5,634,012 A | 5/1997 | Stefik et al. |
| 5,636,277 A | 6/1997 | Nagahama |
| 5,638,443 A | 6/1997 | Stefik et al. |
| 5,642,515 A | 6/1997 | Jones et al. |
| 5,652,908 A | 7/1997 | Douglas et al. |
| 5,661,800 A | 8/1997 | Nakashima et al. |
| 5,663,896 A | 9/1997 | Aucsmith |
| 5,671,360 A | 9/1997 | Hambrick et al. |
| 5,673,315 A | 9/1997 | Wolf |
| 5,673,316 A | 9/1997 | Auerbach et al. |
| 5,677,953 A | 10/1997 | Dolphin |
| 5,689,560 A | 11/1997 | Cooper et al. |
| 5,692,190 A | 11/1997 | Williams |
| 5,703,951 A | 12/1997 | Dolphin |
| 5,706,349 A | 1/1998 | Aditham et al. |
| 5,712,914 A | 1/1998 | Aucsmith et al. |
| 5,715,403 A | 2/1998 | Stefik |
| 5,719,943 A | 2/1998 | Amada et al. |
| 5,721,777 A | 2/1998 | Blaze |
| 5,721,943 A | 2/1998 | Johnson |
| 5,734,719 A | 3/1998 | Tsevdos et al. |
| 5,737,416 A | 4/1998 | Cooper et al. |
| 5,757,417 A | 5/1998 | Aras et al. |
| 5,757,907 A | 5/1998 | Cooper et al. |
| 5,757,908 A | 5/1998 | Cooper et al. |
| 5,757,915 A | 5/1998 | Aucsmith et al. |
| 5,758,068 A | 5/1998 | Brandt et al. |
| 5,768,568 A | 6/1998 | Inui et al. |
| 5,771,347 A | 6/1998 | Grantz et al. |
| 5,787,169 A | 7/1998 | Eldridge et al. |
| 5,805,712 A | 9/1998 | Davis |
| 5,825,877 A | 10/1998 | Dan et al. |
| 5,825,892 A | 10/1998 | Braudaway et al. |
| 5,832,119 A | 11/1998 | Rhoads |
| 5,836,011 A | 11/1998 | Hambrick et al. |
| 5,845,281 A | 12/1998 | Benson et al. |
| 5,852,800 A | 12/1998 | Modeste et al. |
| 5,859,973 A | 1/1999 | Carpenter et al. |
| 5,862,325 A | 1/1999 | Reed et al. |
| 5,870,543 A | 2/1999 | Ronning |
| 5,875,249 A | 2/1999 | Mintzer et al. |
| 5,878,144 A | 3/1999 | Aucsmith et al. |
| 5,878,218 A | 3/1999 | Maddalozzo, Jr. et al. |
| 5,883,954 A | 3/1999 | Ronning |
| 5,883,955 A | 3/1999 | Ronning |
| 5,883,958 A | 3/1999 | Ishiguro et al. |
| 5,887,060 A | 3/1999 | Ronning |
| 5,892,900 A | 4/1999 | Ginter et al. |
| 5,903,647 A | 5/1999 | Ronning |
| 5,907,617 A | 5/1999 | Ronning |
| 5,910,987 A | 6/1999 | Ginter et al. |
| 5,915,018 A | 6/1999 | Aucsmith |
| 5,915,019 A | 6/1999 | Ginter et al. |
| 5,917,908 A | 6/1999 | Takenaka et al. |
| 5,917,910 A | 6/1999 | Ishiguro et al. |
| 5,917,912 A | 6/1999 | Ginter et al. |
| 5,920,861 A | 7/1999 | Hall et al. |
| 5,943,422 A | 8/1999 | Van Wie et al. |
| 5,949,876 A | 9/1999 | Ginter et al. |
| 5,949,877 A | 9/1999 | Traw et al. |
| 5,963,944 A | 10/1999 | Adams |
| 5,978,482 A | 11/1999 | Dwork et al. |
| 5,982,891 A | 11/1999 | Ginter et al. |
| 5,987,440 A | 11/1999 | O'Neil et al. |
| 5,991,399 A | 11/1999 | Graunke et al. |
| 5,991,499 A | 11/1999 | Yagasaki et al. |
| 6,003,135 A | 12/1999 | Bialick et al. |
| 6,005,643 A | 12/1999 | Morimoto et al. |
| 6,006,332 A | 12/1999 | Rabne et al. |
| 6,009,401 A | 12/1999 | Horstmann |
| 6,009,525 A | 12/1999 | Horstmann |
| 6,014,442 A | 1/2000 | Enari |
| 6,023,764 A | 2/2000 | Curtis |
| 6,028,541 A | 2/2000 | Levine |
| 6,038,316 A | 3/2000 | Dwork et al. |
| 6,043,763 A | 3/2000 | Levine |
| 6,044,205 A | 3/2000 | Reed et al. |
| 6,055,314 A | 4/2000 | Spies et al. |
| 6,055,503 A | 4/2000 | Horstmann |
| 6,075,971 A | 6/2000 | Williams et al. |
| 6,088,717 A | 7/2000 | Reed et al. |
| 6,088,802 A | 7/2000 | Bialick et al. |
| 6,112,181 A | 8/2000 | Shear et al. |
| 6,125,348 A | 9/2000 | Levine |
| 6,134,551 A | 10/2000 | Aucsmith |
| 6,135,646 A | 10/2000 | Kahn et al. |
| 6,167,093 A | 12/2000 | Tsutsui et al. |
| 6,175,626 B1 | 1/2001 | Aucsmith et al. |
| 6,182,218 B1 | 1/2001 | Saito |
| 6,185,684 B1 | 2/2001 | Pravetz et al. |
| 6,189,008 B1 | 2/2001 | Easty et al. |
| 6,189,097 B1 | 2/2001 | Tycksen, Jr. et al. |
| 6,202,056 B1 | 3/2001 | Nuttall |
| 6,205,549 B1 | 3/2001 | Pravetz |
| 6,209,103 B1 | 3/2001 | Schreiber et al. |
| 6,215,745 B1 | 4/2001 | Sato et al. |
| 6,219,692 B1 | 4/2001 | Stiles |
| 6,223,209 B1 | 4/2001 | Watson |
| 6,223,287 B1 | 4/2001 | Douglas et al. |
| 6,223,291 B1 | 4/2001 | Puhl et al. |
| 6,226,618 B1 | 5/2001 | Downs et al. |

| | | | |
|---|---|---|---|
| 6,233,684 B1 | 5/2001 | Stefik et al. | |
| 6,236,971 B1 | 5/2001 | Stefik et al. | |
| 6,266,654 B1 | 7/2001 | Schull | |
| 6,385,596 B1 | 5/2002 | Wiser et al. | |
| 6,389,402 B1 | 5/2002 | Ginter et al. | |
| 6,463,534 B1 | 10/2002 | Geiger et al. | |
| 6,792,113 B1* | 9/2004 | Ansell et al. | 380/284 |
| 6,954,738 B2* | 10/2005 | Wang et al. | 705/59 |
| 6,974,076 B1 | 12/2006 | Siegel | |
| 7,206,765 B2* | 4/2007 | Gilliam et al. | 705/51 |
| 2001/0056404 A1* | 12/2001 | Kuriya et al. | 705/51 |
| 2002/0049679 A1* | 4/2002 | Russell et al. | 705/52 |
| 2004/0059683 A1 | 3/2004 | Epstein et al. | |

FOREIGN PATENT DOCUMENTS

| | | |
|---|---|---|
| EP | 874299 | 10/1998 |
| EP | WO 99/48296 | 9/1999 |
| EP | 971350 | 1/2000 |
| EP | 975111 | 1/2000 |
| EP | 994404 | 4/2000 |
| EP | 1001330 | 5/2000 |
| EP | 1001419 | 5/2000 |
| EP | 1001625 | 5/2000 |
| EP | 1006730 | 6/2000 |
| EP | 1018733 | 7/2000 |
| EP | 1032205 | 8/2000 |
| EP | 1037131 | 9/2000 |
| EP | 1037460 | 9/2000 |
| EP | 1043729 | 10/2000 |
| EP | 1052850 | 11/2000 |
| EP | 1052853 | 11/2000 |
| EP | 1081575 | 3/2001 |
| EP | 1089241 | 4/2001 |
| EP | 1093104 | 4/2001 |
| EP | 1 104 973 | 6/2001 |
| EP | 1117053 | 7/2001 |
| EP | 1158417 | 11/2001 |
| JP | 2000-315170 | 11/2000 |
| JP | 2000-324096 | 11/2000 |
| JP | 2000-333141 | 11/2000 |
| JP | 2001-024990 | 1/2001 |
| JP | 2001-078154 | 3/2001 |
| JP | 02002140535 | 5/2002 |
| WO | WO 98/08344 | 2/1998 |
| WO | WO 98/10381 | 3/1998 |
| WO | WO 99/01815 | 1/1999 |
| WO | WO 99/36854 | 7/1999 |
| WO | WO 99/45491 | 9/1999 |
| WO | WO 99/63443 | 12/1999 |
| WO | WO 00/01111 | 1/2000 |
| WO | WO 00/04674 | 1/2000 |
| WO | WO 00/11827 | 3/2000 |
| WO | WO 00/16229 | 3/2000 |
| WO | WO 00/20950 | 4/2000 |
| WO | WO 00/21087 | 4/2000 |
| WO | WO 00/22495 | 4/2000 |
| WO | WO 00/22771 | 4/2000 |
| WO | WO 00/22772 | 4/2000 |
| WO | WO 00/34845 | 6/2000 |
| WO | WO 00/34856 | 6/2000 |
| WO | WO 00/52581 | 9/2000 |
| WO | WO 00/54127 | 9/2000 |
| WO | WO 00/57684 | 10/2000 |
| WO | WO 00/58810 | 10/2000 |
| WO | WO 00/58811 | 10/2000 |
| WO | WO 00/58859 | 10/2000 |
| WO | WO 00/58963 | 10/2000 |
| WO | WO 00/59150 | 10/2000 |
| WO | WO 00/59151 | 10/2000 |
| WO | WO 00/59152 | 10/2000 |
| WO | WO 00/59225 | 10/2000 |
| WO | WO 00/62292 | 10/2000 |
| WO | WO 00/62293 | 10/2000 |
| WO | WO 00/65426 | 11/2000 |
| WO | WO 00/65602 | 11/2000 |
| WO | WO 01/01224 | 1/2001 |
| WO | WO 01/06727 | 1/2001 |
| WO | WO 01/16672 | 3/2001 |
| WO | WO 01/16821 | 3/2001 |
| WO | WO 01/22320 | 3/2001 |
| WO | WO 01/22652 | 3/2001 |
| WO | WO 01/31461 | 5/2001 |
| WO | WO 01/35388 | 5/2001 |
| WO | WO 01/39143 | 5/2001 |
| WO | WO 02/10907 | 2/2002 |

OTHER PUBLICATIONS

Berners-Lee et al. "Uniform Resource Locators (URL)", Network Working Group, http://www.cis.ohio-state.edu/cgi-bin/rfc/rfc1738.html, Dec. 1994, pp. 1-22.

Bradner "Key Words for Use in RFCs to Indicate Requirement Levels", Network Working Group, http://.ietf.org/rfc/rf2119.txt, Harvard University, Mar. 1997, pp. 1-3.

Levinson "Content-ID and Message-ID Uniform Resource Locators", Network Working Group, http://www.cis.ohio-state.edu/cgi-bin/rfc/rfc2111.html, Mar. 1997, pp. 1-4.

Berners-Lee et al. "Uniform Resource Indentifiers (URI): Generic Syntax", Network Working Group, http://www.ietf.org/rfc/rfc2396.txt, Aug. 1998, pp. 1-36.

Wap Binary XML Content Format, http://www.w3.org/TR/wbxml, W3C Note Jun. 24, 1999, pp. 1-21.

Open Digital Rights Language (ODRL), IPR Systems Pty Ltd., Version 0.8, Nov. 21, 2000, pp. 1-31.

Brochure for "Nokia Connecting People", Nokia Networks 2000, pp. 1-2.

XRML: Extensible Rights Markup Language, ContentGuard, http://www.xrml.org, 2000, pp.1-113.

Bermers-Lee, Universal Resource Identifiers in www, http://www.w3.org/Adressing /URL/uri-spec.html, Jun. 13, 2001, pp. 1-23.

Stefik et al., "System for Controlling the Distribution and Use of Rendered Digital Works Through Watermaking", Published U.S. Appl. No. 20010008557, Jul. 19, 2001, pp. 1-26.

Stefik et al. "System for Controlling the Distribution and Use of Digital Works Using Digital Tickets", Published U.S. Appl. No. 20010010045, Jul. 26, 2001, pp. 1-57.

Derfler et al., "How Networks Work", 1993, Ziff-Davis Press, Bestseller Edition, Chapter 17.

* cited by examiner

Figure 3B

```xml
1   <?xml version="1.0" encoding="UTF-8"?>
2   <!DOCTYPE rights SYSTEM "C:\MRV1.0-subsetC.dtd">
3   <rights xmlns:xlink="MRV1.0.3" xmlns="MRV1.0.3">
4     <version>1.0.3</version>
5     <admin><uid>http://www.media-sampo.com/ScreenSaverService
6           </uid>
7     </admin>
8     <transaction>TID:3457345987-6789-9</transaction>
9     <usage>
10      <asset>
11        <uid>mid:tropicalsunset.345658347@digitalshop.com
12        </uid>
13        <!--<protection>
14            content protection would go here
15            </protection>-->
16      </asset>
17      <asset>
18        <uid>mid:underwaterdivert.345658347@digitalshop.com
19        </uid>
20        <!--<protection>
21            content protection would go here
22            </protection>-->
23      </asset>
24      <display></display>
25      <copy><constrain><datetime><end>20010830</end>
26                      </datetime>
27        </constrain>
28        <narrow>
29            <uid>mid:previewvoucher.343453344@digitalshop.com
30            </uid>
31        </narrow>
32      </copy>
33      <constrain><individual>
34                 <uid>IMEI:123456789123459</uid>
35                 </individual>
36      </constrain>
37    </usage>
38    <!--<protection>
39        The integrity would go here
40        </protection>-->
41  </rights>
```

Figure 4A

| Element | <!ELEMENT rights (version?, admin?, transaction?, usage+, protection?)> |
|---|---|
| Attributes | <!ATTLIST rights<br>    xmlns:xlink CDATA #IMPLIED<br>    xmlns CDATA #IMPLIED> |
| Purpose | The top-most XML element that starts the description of a Mobile Rights Voucher. |
| Description | At the top level declare:<br>· Zero or one version elements to indicate the Mobile Rights Voucher version number.<br>· Zero or one admin elements to specify addresses where additional vouchers can be found.<br>· Zero or one transaction information elements<br>· One or more usage elements to bind together an asset and its usage rights.<br>· Zero or one protection elements to serve as an integrity check for the voucher.<br>The attribute of this element MAY declare the namespace for the DTD as "mrv10". |
| Example | <rights xmlns="mrv1.0.3"><br>...<br></rights> |
| ODRL compliance | Additions: The transaction and protection elements.<br>Deletions: The rightsholder, name, and remark elements. |

Figure 4B

| Element | <!ELEMENT version (#PCDATA)> |
|---|---|
| Attributes | None |
| Purpose | Declares the version number of the specification used to define the Mobile Rights Voucher. |
| Description | The element type SHOULD be specified in the Mobile Rights Voucher format. If absent, then assumed to be "1.0". |
| Example | <version>1.0.0</version> |
| ODRL compliance | Does not exist in ODRL. |

Figure 4C

| Element | <!ELEMENT admin (uid+)> |
|---|---|
| Attributes | None |
| Purpose | Identifies Voucher Server references where a consumer can retrieve additional Mobile Rights Vouchers. |
| Description | The admin element MUST contain one or more uid. Each uid SHOULD point to a Voucher Service where additional vouchers may be purchased for the identified assets. It would be typical that the uid would be a uniform resource identifier ("URI"). |
| Example | <admin><br>  <uid>http://www.media-sampo.com/ringingtoneservice</uid><br></admin> |
| ODRL compliance | Deletions: The party, datetime, issuedate, name, and remark elements.<br>Modified: uid? -> uid+ |

Figure 4D

| Element | <!ELEMENT uid (#PCDATA)> |
|---|---|
| Attributes | None |
| Purpose | The uid is a reference to an entity that is located outside of the Voucher. This entity can be any type of object. |
| Description | The uid element MUST represent a generic identity that references an entity located outside the voucher. Such a reference MUST BE a uniform resource identifier ("URI"). An entity can be as simple as a uniform resource locator ("URL") to a Voucher Service (see element admin in Figure 4C). |
| Example | <uid><br>  http://www.media-sampo.com/ringingtoneservice<br></uid> |
| ODRL compliance | In the ODRL specification an attribute is used to capture the idscheme. This is removed and defaults to URI. |

Figure 4E

| Element | <!ELEMENT transaction (#PCDATA)> |
|---|---|
| Attributes | None |
| Purpose | Purchase transaction information SHOULD BE captured in this element. |
| Description | The transaction element is a container for meta-information for transaction related information that might be useful to deliver in the voucher. This is implementation specific. An example could be specific payment-transaction information. |
| Example | `<transaction>`<br>  `<transaction xmlns="visa-transaction">`<br>    ...<br>  `</transaction>`<br>`</transaction>` |
| ODRL compliance | Does not exist in ODRL. |

Figure 4F

| Element | <!ELEMENT protection (#PCDATA)> |
|---|---|
| Attributes | None |
| Purpose | Contains information about how an asset or voucher are protected and how they can be accessed (e.g., encryption algorithm and decryption keys). |
| Description | The protection element is a container for meta-information for protection related information that might be transmitted with the voucher. |
| Example | See the examples in the specification. |
| ODRL compliance | Does not exist in ODRL. |

Figure 4G

| Element | <!ELEMENT usage (asset+, print*, display*, play*, execute*, copy*, give*, constrain?)> |
|---|---|
| Attributes | None |
| Purpose | Declares the intents and constraints for an asset. |
| Description | A usage element MUST contain:<br>• One or more asset elements.<br>• Zero or more of each intent type (print, display, play, execute, copy and give).<br>• Zero or one constrain elements that should be applied to each intent.<br><br>NOTE: If there are multiple assets then the associated intent elements in a usage element are applied equally to all those assets. This is required by ODRL. ODRL supports the flexibility of being able to declare more than one instance of an intent in a usage element.<br><br>NOTE: If there are no intent elements included in a usage declaration, then it should be assumed that no rights are granted and the asset and content should not be made available for rendering or distribution by the user.<br><br>NOTE: If no asset elements are declared then an implicit reference MUST BE made to the associated content object. |
| Example | See the examples in the specification. |
| ODRL compliance | Deletions: The rightsholder, sell, lend, modify, annotate, name and remark elements.<br>Modified: asset* -> asset+,<br>         constrain* -> constrain?<br><br>ODRL specifies that the usage element can be linked to internally in a ODRL XML file by using xlink. This is not supported in the Mobile Rights Voucher. |

Figure 4H

| Element | <!ELEMENT asset (uid*, rightsholder*, protection?)> |
|---|---|
| Attributes | None |
| Purpose | Identifies a unit of content, its rights holder, and any protection information. |
| Description | An asset element contains:<br>    Zero or more uid's. An asset MAY reference one or more pieces of content. If more than one uid element is declared it is expected that the content is the same but in different formats. In the Mobile Rights Voucher a piece of content is considered to be an "asset". The assets are external to the NRV and are identified using one or more uid's. Multiple assets can be declared using multiple asset elements. If no uid is specified then the asset is implicitly referenced and is transported with the voucher (e.g., MIME). This is useful when trying to keep the voucher short such as when transmitting over SMS transport.<br>· The rightsholder element specifies the holder of the rights for the asset.<br>· The protection element associates a protection instrument (e.g., a decryption key) with the asset. |
| Example | `<asset>`<br>  `<uid>mid:donaldduck23457893457a77@2ndhead.com`<br>  `</uid>`<br>  `<rightsholder>`<br>    `<uid>http://www.media-sampo.com</uid>`<br>  `</rightsholder>`<br>`</asset>` |
| ODRL compliance | Deletions: The name and remark elements.<br><br>The Mobile Rights Voucher does not support an asset being linked to internally in an ODRL XML file using xlink.<br><br>The Mobile Rights Voucher associates the rightsholder element with the asset element, not the usage element as specified in ODRL. |

Figure 4I

| Element | <!ELEMENT rightsholder (uid)> |
|---|---|
| Attributes | None |
| Purpose | A reference to information about the holder of the rights to the asset. |
| Description | An informational element that MAY be required by law. |
| Example | <rightsholder><br>  <uid>http://www.media-sampo.com</uid><br></rightsholder> |
| ODRL compliance | Does not exist in ODRL. |

Figure 4J

| Element | <!ELEMENT print (constrain*)> |
|---|---|
| Attributes | None |
| Purpose | Indicates that the usage for the associated asset supports the print intent. |
| Description | Contains zero or more constrain elements. If zero and there is no constrain element in the usage element, then there is no restriction on the use of the specified assets for the intention of printing. If there is a constrain element then the use of the specified assets is restricted.<br><br>ODRL specifies an ability to declare more than one instance of a constrain element in a print element. To conform with the ODRL, the Mobile Rights Voucher supports this ability. |
| Example | ```<print>
  <constrain>
    <datetime>
      <start>20011705</start>
      <end>20011706</end>
    </datetime>
  </constrain>
</print>``` |
| ODRL compliance | Deletions: The name and remark elements. |

Figure 4K

| Element | <!ELEMENT display (constrain*)> |
|---|---|
| Attributes | None |
| Purpose | Indicates that the usage for the associated asset supports the display intent. |
| Description | Contains zero or more constrain elements. If zero and there is no constrain element in the usage element, then there is no restriction on the use of the specified assets for the intention of displaying. If there is a constrain element then the use of the specified assets is restricted.<br><br>ODRL specifies an ability to declare more than one instance of a constrain element in a display element. To conform with the ODRL, the Mobile Rights Voucher supports this ability. |
| Example | ```<br><display><br>  <constrain><br>    <datetime><br>      <start>20011705</start><br>      <end>20011706</end><br>    </datetime><br>  </constrain><br></display><br>``` |
| ODRL compliance | Deletions: The name and remark elements. |

Figure 4L

| Element | <!ELEMENT play (constrain*)> |
|---|---|
| Attributes | None |
| Purpose | Indicates that the usage for the associated asset supports the play intent. |
| Description | Contains zero or more constrain elements. If zero and there is no constrain element in the usage element, then there is no restriction on the use of the specified assets for the intention of playing. If there is a constrain element then the use of the specified assets is restricted.<br><br>ODRL specifies an ability to declare more than one instance of a constrain element in a play element. To conform with the ODRL, the Mobile Rights Voucher supports this ability. |
| Example | `<print>`<br> `<constrain>`<br>  `<datetime>`<br>   `<start>20011705</start>`<br>   `<end>20011706</end>`<br>  `</datetime>`<br> `</constrain>`<br>`</print>` |
| ODRL compliance | Deletions: The name and remark elements. |

Figure 4M

| Element | <!ELEMENT execute (constrain*)> |
|---|---|
| Attributes | None |
| Purpose | Indicates that the usage for the associated asset supports the execute intent. |
| Description | Contains zero or more constrain elements. If zero and there is no constrain element in the usage element, then there is no restriction on the use of the specified assets for the intention of executing. If there is a constrain element then the use of the specified assets is restricted.<br><br>ODRL specifies an ability to declare more than one instance of a constrain element in an execute element. To conform with the ODRL, the Mobile Rights Voucher supports this ability. |
| Example | ```<br><execute><br>  <constrain><br>    <datetime><br>      <start>20011705</start><br>      <end>20011706</end><br>    </datetime><br>  </constrain><br></execute><br>``` |
| ODRL compliance | Deletions: The name and remark elements. |

Figure 4N

| | |
|---|---|
| Element | <!ELEMENT copy (constrain*, narrow+)> |
| Attributes | None |
| Purpose | Indicates that the usage for the associated asset supports the copy intent. |
| Description | Contains zero or more constrain elements. If zero and there is no constrain element in the usage element, then there is no restriction on the use of the specified assets for the intention of copying. If there is a constrain element then the use of the specified assets is restricted.<br><br>When a copy intent is invoked the: a) specified assets at the usage level are duplicated; b) vouchers in the narrow elements are duplicated; c) duplicate assets and vouchers should be distributed to the specified receiver. It is an implementation recommendation that the vouchers listed in narrow should be local.<br><br>The Mobile Rights Voucher does not support partial copy. Invoking a copy intent results in a new voucher instance that contains all of the rights.<br><br>ODRL specifies an ability to declare more than one instance of a constrain element in a copy element. To conform with the ODRL, the Mobile Rights Voucher supports this ability. |
| Example | ```<br><copy><br>  <constrain><br>    <datetime><start>20011705</start><br>              <end>20011706</end><br>    </datetime><br>  </constrain><br>  <narrow><br>    <uid>mid:RTvoucher23457893457a77@2ndhead.com<br>    </uid><br>  </narrow><br></copy><br>``` |
| ODRL compliance | Additions: The narrow element.<br>Deletions: The name and remark elements. |

Figure 4O

| Element | `<!ELEMENT give (constrain*, narrow+)>` |
|---|---|
| Attributes | None |
| Purpose | Indicates that the usage for the associated asset supports the give intent. |
| Description | Contains zero or more constrain elements. If zero and there is no constrain element in the usage element, then there is no restriction on the use of the specified assets for the intention of giving. If there is a constrain element then the use of the specified assets is restricted.<br><br>When a give intent is invoked the: a) specified assets at the usage level are duplicated; b) vouchers in the narrow elements are duplicated; c) a new voucher with no usage rights for the assets MUST BE delivered to the "giver"; d) duplicate assets and vouchers should be distributed to the receiver.<br><br>ODRL specifies an ability to declare more than one instance of a constrain element in a give element. To conform with the ODRL, the Mobile Rights Voucher supports this ability. |
| Example | `<give>`<br> `<constrain>`<br>  `<datetime><start>20011705</start>`<br>        `<end>20011706</end>`<br>  `</datetime>`<br> `</constrain>`<br> `<narrow>`<br> `<uid>mid:RTvoucher23457893457a77@2ndhead.com`<br> `</uid>`<br> `</narrow>`<br>`</give>` |
| ODRL compliance | Additions: The narrow element.<br>Deletions: The name and remark elements. |

Figure 4P

| Element | <!ELEMENT narrow (uid*)> |
|---|---|
| Attributes | None |
| Purpose | Specifies a list of vouchers that can be duplicated or given away. |
| Description | Contains a list of uid's that refer to one or more vouchers.<br><br>NOTE: When the narrow is used in a give or a copy element the vouchers that the narrow element references SHOULD have the same list of assets as the current voucher. If a narrow element references its own voucher (i.e., a self reference), it is recommended that the voucher only contains one usage. Thus, rights for non-copied assets are not distributed unintentionally because after a copy or a give it is not recommended that copied vouchers contain rights for additional assets not under the control of the give or copy intent. |
| Example | `<give>`<br>  `<narrow>`<br>    `<uid>mid:voucher23762837@city.fi</uid>`<br>  `<narrow>`<br>`</give>` |
| ODRL compliance | The ODRL specification has an unclear meaning for the narrow element, therefore, the Mobile Rights Voucher definition overrides the ODRL definition. |

Figure 4Q

| Element | <!ELEMENT constrain (datetime*, count*, individual*)> |
|---|---|
| Attributes | None |
| Purpose | Constrains the usage of the enclosing intent element. |
| Description | Restricts the invocation of the enclosing intent element.<br><br>It is possible to specify:<br>• A count element limits the number of times an asset can be used.<br>• A datetime element limits the usage to a specific period of time.<br>• An individual element limits the usage to a specific "user", but the "user" may be a person or a device (e.g., a playing device).<br><br>ODRL specifies an ability to declare more than one instance of a constrain element. To conform with the ODRL, the Mobile Rights Voucher supports this ability. |
| Example | `<display>`<br> `<constrain>`<br>  `<count>5</count>`<br> `</constrain>`<br>`</display>` |
| ODRL compliance | Deletions: All elements are removed except for datetime, count, and individual. |

Figure 4R

| Element | `<!ELEMENT count (#PCDATA)>` |
|---|---|
| Attributes | None |
| Purpose | Specifies a metered usage for the associated asset in terms of a count. |
| Description | The count element is intended to restrict the number of times an intent element can be invoked on an associated asset. |
| Example | `<display>`<br>  `<constrain>`<br>    `<count>5</count>`<br>  `</constrain>`<br>`</display>` |
| ODRL compliance | An attribute in the ODRL specification is used to capture the start and end data. This is moved into an additional element in the Mobile Rights Voucher for terseness of expression. |

Figure 4S

| Element | <!ELEMENT start (#PCDATA)> |
|---|---|
| Attributes | None |
| Purpose | Specifies a start value for a datetime element. |
| Description | The values of the start element depend upon the implementation system. It is up to the implementing system to ensure that the values for start and end are valid. |
| Example | <datetime><br>  <start>20011705</start><br>  <end>20011706</end><br></datetime> |
| ODRL compliance | An attribute in the ODRL specification is used to capture the start and end data. This is moved into an additional element in the Mobile Rights Voucher for terseness of expression. |

Figure 4T

| Element | <!ELEMENT end (#PCDATA)> |
|---|---|
| Attributes | None |
| Purpose | Specifies an end value for a datetime element. |
| Description | The values of the end element depend upon the implementation system. It is up to the implementing system to ensure that the values for start and end are valid. |
| Example | <datetime><br>  <start>20011705</start><br>  <end>20011706</end><br></datetime> |
| ODRL compliance | An attribute in the ODRL specification is used to capture the start and end data. This is moved into an additional element in the Mobile Rights Voucher for terseness of expression. |

Figure 4U

| Element | <!ELEMENT datetime (start?, end?)> |
|---|---|
| Attributes | None |
| Purpose | Specifies a metered usage of the specified assets in terms of a time period. |
| Description | Restricts the period of time an intent element can be invoked on an associated asset. It is up to the implementing system to ensure that the specified values are logically correct and that there is programmatic logic to implement the count. It is recommended that UTC time is used. |
| Example | ```
<give>
  <constrain>
    <datetime>
      <start>20011705</start>
      <end>20011706</end>
    </datetime>
  </constrain>
</give>
``` |
| ODRL compliance | An attribute in the ODRL specification is used to capture the start and end data. This is moved into an additional element in the Mobile Rights Voucher for terseness of expression. |

Figure 4V

| Element | `<!ELEMENT individual (uid+)>` |
|---|---|
| Attributes | None |
| Purpose | Binds the enclosing asset to the declared entity. |
| Description | Identifies one or more entities that are bound to the enclosing asset. An entity could be an IMEI code for a phone, an Ethernet address for a local NIC, a device ID, or a WIM certificate. The name "individual" is more restrictive than the actual intended usage. It actually refers to any binding information that binds the use of a voucher with a the holder of that information. |
| Example | ```<br><give><br> <constrain><br>  <individual><br>   <uid>IMEI:350903301387634</uid><br>  </individual><br> </constrain><br></give><br>``` |
| ODRL compliance | Deletions: The name and remark elements. |

Figure 5A

```
1   <?xml version="1.0" encoding="UTF-8"?>
2   <!-- This DTD defines a subset of a Mobile Digital Rights
3   Management (DRM) Voucher DTD.  This DTD is to be identified
4   by the URI string "MRV1.0.1" (Mobile Rights Voucher, Release
5   1, Revision 0, Subset A). -->
6   <!ELEMENT rights (admin?, usage)>
7   <!ATTLIST rights
8        xmlns:xlink CDATA #IMPLIED
9        xmlns CDATA #IMPLIED>
10  <!ELEMENT admin (uid)>
11  <!ELEMENT usage (asset)>
12  <!ELEMENT asset (uid?)>
13  <!ELEMENT uid (#PCDATA)>
```

Figure 5B

```
1   <?xml version="1.0" encoding="UTF-8"?>
2   <!-- This DTD defines a subset of a Mobile Digital Rights
3   Management (DRM) Voucher DTD.  This DTD is to be identified
4   by the URI string "MRV1.0.2" (Mobile Rights Voucher, Release
5   1, Revision 0, Subset B). -->
6   <!ELEMENT rights (version?, admin?, transaction?, usage+)>
7   <!ATTLIST rights
8       xmlns:xlink CDATA #IMPLIED
9       xmlns CDATA #IMPLIED>
10  <!ELEMENT version (#PCDATA)>
11  <!ELEMENT admin (uid)>
12  <!ELEMENT uid (#PCDATA)>
13  <!ELEMENT transaction (#PCDATA)>
14  <!ELEMENT usage (asset, display?, play?, execute?, copy?)>
15  <!ELEMENT asset (uid*)>
16  <!ELEMENT display (constrain?)>
17  <!ELEMENT play (constrain?)>
18  <!ELEMENT execute (constrain?)>
19  <!ELEMENT copy (constrain?)>
20  <!ELEMENT constrain (count?, datetime?)>
21  <!ELEMENT count (#PCDATA)>
22  <!ELEMENT datetime (start?, end?)>
23  <!ELEMENT start (#PCDATA)>
24  <!ELEMENT end (#PCDATA)>
```

Figure 5C

```
1   <?xml version="1.0" encoding="UTF-8"?>
2   <!-- This DTD defines a subset of a Mobile Digital Rights
3   Management (DRM) Voucher DTD.  This DTD is to be identified
4   by the URI string "MRV1.0.3" (Mobile Rights Voucher, Release
5   1, Revision 0, Subset C). -->
6   <!ELEMENT rights (version?, admin?, transaction?, usage+,
7   protection?)>
8   <!ATTLIST rights
9        xmlns:xlink CDATA #IMPLIED
10       xmlns CDATA #IMPLIED>
11  <!ELEMENT version (#PCDATA)>
12  <!ELEMENT admin (uid+)>
13  <!ELEMENT uid (#PCDATA)>
14  <!ELEMENT transaction (#PCDATA)>
15  <!ELEMENT protection (#PCDATA)>
16  <!ELEMENT usage (asset+, print*, display*, play*, execute*,
17  copy*, constrain?)>
18  <!ELEMENT asset (uid*, rightsholder*, protection?)>
19  <!ELEMENT rightsholder (uid)>
20  <!ELEMENT print (constrain?)>
21  <!ELEMENT display (constrain?)>
22  <!ELEMENT play (constrain?)>
23  <!ELEMENT execute (constrain?)>
24  <!ELEMENT copy (constrain?, narrow+)>
25  <!ELEMENT narrow (uid*)>
26  <!ELEMENT constrain (datetime?, count?, individual*)>
27  <!ELEMENT datetime (start?, end?)>
28  <!ELEMENT start (#PCDATA)>
29  <!ELEMENT end (#PCDATA)>
30  <!ELEMENT count (#PCDATA)>
31  <!ELEMENT individual (uid+)>
```

Figure 5D

```
1   <?xml version="1.0" encoding="UTF-8"?>
2   <!-- This DTD defines a Mobile Digital Rights Management
3   (DRM) Voucher DTD.  This DTD defines a common format for
4   representing a container for multimedia digital rights.  This
5   DTD is to be identified by the URI string "MRV1.0" (Mobile
6   Rights Voucher, Release 1.0). -->
7   <!ELEMENT rights (version?, admin?, transaction?, usage+,
8   protection?)>
9   <!ATTLIST rights
10      xmlns:xlink CDATA #IMPLIED
11      xmlns CDATA #IMPLIED>
12  <!ELEMENT version (#PCDATA)>
13  <!ELEMENT admin (uid+)>
14  <!ELEMENT uid (#PCDATA)>
15  <!ELEMENT transaction (#PCDATA)>
16  <!ELEMENT protection (#PCDATA)>
17  <!ELEMENT usage (asset+, print*, display*, play*, execute*,
18  copy*, give*, constrain?)>
19  <!ELEMENT asset (uid*, rightsholder*, protection?)>
20  <!ELEMENT rightsholder (uid)>
21  <!ELEMENT print (constrain*)>
22  <!ELEMENT display (constrain*)>
23  <!ELEMENT play (constrain*)>
24  <!ELEMENT execute (constrain*)>
25  <!ELEMENT copy (constrain*, narrow+)>
26  <!ELEMENT give (constrain*, narrow+)>
27  <!ELEMENT narrow (uid*)>
28  <!ELEMENT constrain (datetime*, count*, individual*)>
29  <!ELEMENT datetime (start?, end?)>
30  <!ELEMENT start (#PCDATA)>
31  <!ELEMENT end (#PCDATA)>
32  <!ELEMENT count (#PCDATA)>
33  <!ELEMENT individual (uid+)>
```

DIGITAL RIGHTS MANAGEMENT IN A MOBILE COMMUNICATIONS ENVIRONMENT

CROSS-REFERENCE TO A RELATED APPLICATION

This application for letters patent incorporates by reference the provisional application for letters patent Ser. No. 60/303,157 titled "A Method, System, and Computer Program Product for Controlling the Distribution of a Digital Asset in a Mobile Environment" and filed in the United States Patent and Trademark Office on Jul. 6, 2001. This application for letters patent also is related to and incorporates by reference provisional application for letters patent Ser. No. 60/303,686 titled "Smart Content Object" and filed in the United States Patent and Trademark Office on Jul. 6, 2001.

FIELD OF THE INVENTION

A method, system, and computer program product are disclosed for controlling the distribution of digital assets in communications networks. In particular, the method, system, and computer program product manages the lifecycle of a digital asset and the property rights held by the creator and owner of the digital asset in a mobile, wireless environment.

BACKGROUND OF THE INVENTION

Digital technology dramatically impacts the creation, distribution, sale, marketing, and consumption of copyrighted digital content. Recent developments indicate that producers of digital content are under pressure and have a desire to profit from these new developments and reduce their vulnerability to the risk. The risks are more obvious to content producers than the potential benefits of the new technologies.

Copyright protection systems of the pre-digital age consisted of legal mechanisms to prosecute individuals and groups that ran large-scale illegal reproduction facilities for profit. Since intellectual property pirates in the pre-digital age needed physical assets to reproduce the physical media of the books, music, or video, they were subject to traditional law enforcement techniques. The added complications imposed by distribution of these contraband copies made these pirates even more vulnerable to detection. From the consumer's perspective, the illegal copies produced by these pirates were less interesting because quality suffered and the copies were not always promptly available as legitimate copies.

The digital age introduced new risks because flawless copies are now infinitely reproducible and may be transmitted instantly anywhere in the world. There has been a shift from a paradigm where a large number of individuals made a few copies to one where relatively few individuals can make many copies.

When cassette tapes were first introduced, record companies had similar concerns as demonstrated by the record jackets printed in the early 1980s including the slogan "Home Taping Is Killing Music". Eventually this lead to cassette tape manufacturers paying mandatory licensing fees to the holder of the property rights to the work.

Content producers are rightfully concerned with this new capacity to cheat them of a fair return on their intellectual property and, therefore, have been reluctant to take advantage of digital commerce opportunities. Yet digital commerce offers the potential to increase earnings while cutting the high overhead costs of production, distribution, warehousing their goods while presenting new business opportunities. It is believed that if content producers were sufficiently confident in their ability to protect their assets in digital form, they would gladly take part in such a system.

Legal and regulatory means exist to protect digital content, however a deterrent is necessary to make the illegal copying and distribution of copyrighted content difficult and traceable. For this reason, the deployment of a trusted end-to-end solution for the management of digital rights is a necessary precursor to digital production, dissemination and consumption of copyrighted content.

Digital Rights Management (DRM) involves the description, layering, analysis, valuation, trading, and monitoring of an owner's property rights to an asset. DRM covers the management of the digital rights to the physical manifestation of a work (e.g., a textbook) or the digital manifestation of a work (e.g., a Web page). DRM also covers the management of an asset whether the asset has a tangible or an intangible value. Current DRM technologies include languages for describing the terms and conditions for an asset, tracking asset usage by enforcing controlled environments or encoded asset manifestations, and closed architectures for the overall management of the digital rights.

The Open Digital Rights Language (ODRL) provides the semantics for implementing a DRM architecture in an open or trusted computing environment. ODRL defines a standard vocabulary for expressing the terms and conditions over an asset. ODRL covers a core set of semantics for these purposes including the identification of the property rights to the work and the expression of permissible uses for manifestations of a protected asset. Rights can be specified for a specific asset manifestation or format or could be applied to a range of manifestations of the asset. ODRL does not enforce or mandate any policy for DRM, but provides the mechanisms to express such a policy. ODRL does not, however, assume the existence of mechanisms to achieve a secure architecture. ODRL complements existing rights management standards by providing digital equivalents and supports an expandable range of new services that can be afforded by the digital nature of the assets in the Web environment. In the physical environment, ODRL can be used to enable machine-based processing for DRM. The web site "http://odrl.net" contains electronic ODRL resources including the ODRL Specification Format version 1.0, ODRL Expression Language version 1.0, and ODRL Data Dictionary version 1.0.

The Extensible Markup Language (XML) is a standard for exchanging data and metadata electronically. Metadata is data that describes data. For example, the term "author" is metadata that describes the data "William Shakespeare". XML is an outgrowth of the Standard Generalized Markup Language (SGML) that allows the author of an XML document to separate the logical content of the document from the presentation of the content. An author of an XML document adds metadata to a document as hypertext transfer protocol (HTTP) tags in the document. A document type definitions (DTD) file is the mechanism that adds shared content to the XML document. The web site "http://www.w3.org/XML/1999/XML-in-10-points" provides an overview of XML.

Extensible Rights Markup Language (XrML) is an XML conforming language definition that specifies rights, fees, and conditions for using digital content. XrML also describes message integrity and entity authentication rules. XrML supports commerce in digital content such as publishing and selling electronic books, digital movies, digital music, interactive games, and computer software. In addition, XrML supports the specification of access and use controls for secure digital documents in cases where financial exchange is not part of the terms of use. The web site "http://www.xrml.org/faq.asp" provides an overview of XrML.

Digital communications networks can be categorized in terms of their geographic coverage, their transmission media, their protocols, their transmission speeds, the types of equipment that they interconnect, and other criteria. An example of geographic coverage categories includes wide area networks (WANs), metropolitan area networks (MANs), local area networks (LANs), and personal area networks (PANs). An example of transmission media categories includes fixed station wireline networks, mobile wireless networks, and hybrid combinations of fixed station wireline networks communicating through wireless access points with wireless networks. There are many digital wireless, wide area network architectures. Most of them are connected to the public switched telephone network (PSTN) to provide access to wireline telephones and digital computers. A short list includes Global System for Mobile Communication (GSM), IS-136 TDMA-based Digital Advanced Mobile Phone Service (DAMPS), Personal Digital Cellular (PDC), IS-95 CDMA-based cdmaOne System, General Packet Radio Service (GPRS) and broadband wireless systems such as W-CDMA, and Broadband GPRS. For more information on these digital wireless, wide area network architectures, see the book by Yi-Bing Lin, et al. entitled *Wireless and Mobile Network Architectures*, John Wiley & Sons, 2001.

Wide area networks can include communications satellite links that interconnect nation-wide digital networks located on different continents. Nation-wide digital networks typically include backbone networks, regional distribution hubs, and routers, which interconnect access subnetworks serving local routers, servers, and service providers. The Internet is a familiar example of a wide area network. For more information on the Internet as a wide area network, see the book by Daniel Minoli, et al. entitled Internet Architectures, John Wiley & Sons, 1999.

At the other end of the range for geographic coverage are short-range wireless systems. Short-range wireless systems have a typical range of one hundred meters or less. They often combine with systems wired to the Internet to provide communication over long distances. The category of short-range wireless systems include both a wireless personal area network (PAN) and a wireless local area network (LAN). Both of these networks have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of from 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band. For more information on wireless LANs, see the book by Jim Geier entitled Wireless LANs, Macmillan Technical Publishing, 1999.

An ad hoc network is a short range wireless system composed primarily of mobile wireless devices, which associate together for a relatively short time to carry out a common purpose. A temporary network such as this is called a "piconet" in the Bluetooth Standard, an "independent basic service set" (IBSS) in the IEEE 802.11 Wireless LAN Standard, a "subnet" in the HIPERLAN Standard, and generally a radio cell or a "micro-cell" in other wireless LAN technologies. Ad hoc networks have the common property of being an arbitrary collection of wireless devices, which are physically close enough to be able to communicate and which are exchanging information on a regular basis. The networks can be constructed quickly and without much planning. Members of the ad hoc network join and leave as they move into and out of the range of each other. Most ad hoc networks operate over unlicensed radio frequencies at speeds of from one to fifty-four Mbps using carrier sense protocols to share the radio spectrum. The distance over which they can communicate ranges from ten meters for Bluetooth piconets to over one hundred meters for wireless LAN micro-cells in an open environment. Ad hoc networks consist primarily of mobile wireless devices, but can also include one or more access points, which are stationary wireless devices operating as a stand-alone server or connected as gateways to other networks.

Bluetooth is a short-range radio network, originally intended as a cable replacement. It can be used to create ad hoc networks of up to eight devices operating together. The Bluetooth Special Interest Group, "Specification Of The Bluetooth System", Version 1.0B, Volumes 1 and 2, December 1999, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a message packet containing the responding device's Bluetooth Device Address (BD_ADDR). A Bluetooth device address is a unique, 48-bit IEEE address that is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the access code and timing information acquired from the inquiry response packet. The responding device must be in the page scan state to allow the inquiring device to connect with it. Once in the page scan state, the responding device will acknowledge the initial paging messages and the inquiring device will send a paging packet that provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network piconet.

Each piconet has one master device and up to seven slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. A piconet supports distributed activities, such as collaborative work projects, collaborative games, multi-user gateways to the Internet, and the like. A user's device that joins a particular piconet does so to enable its user to participate in the currently running collaborative activity.

A Bluetooth-enabled laptop computer can send information to a Bluetooth-enabled printer in the next room. A Bluetooth-enabled microwave oven can send a message to a Bluetooth-enabled mobile phone announcing that the meal is ready. Bluetooth will become the standard in mobile phones, PCs, laptops and other electronic devices, enabling users to share information, synchronize data, access the Internet, integrate with LANs or actuate electro-mechanical devices, such as unlocking a car. A passenger can use a laptop or handheld computer to compose an electronic mail message while flying in an airplane and then, after landing, the messages can be automatically forwarded to the Internet by Bluetooth devices that are ubiquitously located around the airport terminal. In another example, while waiting in an airport lounge, the passenger can receive interesting duty-free offers directly on the laptop or handheld computer or play multi-player games with friends.

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 ad hoc networks have an independent configuration where the mobile stations communicate directly with one another, without support from a fixed access point. The IEEE 802.11 standard provides wireless devices with service inquiry features similar to the Bluetooth inquiry and scanning features. IEEE 802.11 ad hoc networks support distributed activities similar those of a Bluetooth piconet, except that they have ten times the communications range.

In order for an IEEE 802.11 mobile station to communicate with other mobile stations in an ad hoc network, it must first find the stations. The process of finding another station is by inquiring. Active inquiry requires the inquiring station to transmit queries and invoke responses from other wireless stations in an ad hoc network. In an active inquiry, the mobile station will transmit a probe request frame. If there is an ad hoc network on the same channel that matches the service set identity (SSID) in the probe request frame, a station in that ad hoc network will respond by sending a probe response frame to the inquiring station. The probe response includes the information necessary for the inquiring station to access a description of the ad hoc network. The inquiring station will also process any other received probe response and Beacon frames. Once the inquiring station has processed any responses, or has decided there will be no responses, it may change to another channel and repeat the process. At the conclusion of the inquiry, the station has accumulated information about the ad hoc networks in its vicinity. Once a station has performed an inquiry that results in one or more ad hoc network descriptions, the station may choose to join one of the ad hoc networks. The IEEE 802.11 Wireless LAN Standard is published in three parts as "IEEE 802.11-1999", "IEEE 802.11a-1999", and "IEEE 802.11b-1999". All three of these publications are available from the IEEE, Inc. web site at http://grouper.ieee.org/groups/802/11.

The HIPERLAN standard provides a wireless LAN with a high data rate of up to 54 Mbps and a medium-range of 50 meters. HIPERLAN wireless LANs provide multimedia distribution with video quality of service (QoS), reserved spectrum, and good in-building propagation. There are two HIPERLAN standards. HIPERLAN Type 1 is a dynamic, priority driven channel access protocol similar to wireless Ethernet. HIPERLAN Type 2 is a reserved channel access protocol similar to a wireless version of asynchronous transfer mode (ATM). Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using orthogonal frequency division multiplex (OFDM) and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using binary phase shift keying (BPSK), quadrature phase shift keying (QPSK), or quadrature amplitude modulation (QAM) formats of 16-QAM or 64-QAM to provide different data rates. The modulation schemes chosen for the higher bit rates achieve throughput in the range 30-50 Mbps.

The HIPERLAN Type 1 is a dynamic, priority driven channel access protocol that can form ad hoc networks of wireless devices. HIPERLAN Type 1 ad hoc networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication "HIPERLAN Type 1 Standard", ETSI ETS 300 652, WA2 December 1997.

HIPERLAN Type 2 is a reserved channel access protocol that forms ad hoc networks. HIPERLAN Type 2 ad hoc networks support distributed activities similar to those of the HIPERLAN Type 1 ad hoc networks, Bluetooth piconets and IEEE 802.11 independent basic service sets (IBSS). HIPERLAN Type 2 provides high speed radio communication with typical data rates from 6 MHz to 54 Mbps. It connects portable devices with broadband networks that are based on IP, ATM and other technologies. Centralized mode is used to operate HIPERLAN Type 2 as an access network via a fixed access point. In addition a capability for direct link communication is provided. This mode is used to operate HIPERLAN Type 2 as an ad hoc network without relying on a cellular network infrastructure. In this case a central controller (CC), which is dynamically selected among the portable devices, provides the same level of QoS support as the fixed access point. Restricted user mobility is supported within the local service area. Wide area roaming mobility can also be supported. An overview of the HIPERLAN Type 2 principles of operation is provided in the Broadband Radio Access Networks (BRAN), "HIPERLAN Type 2; System Overview", ETSI TR 101 683 VI.I.1 (2000-02) and a more detailed specification of its ad hoc network architecture is described in "HIPERLAN Type 2, Data Link Control (DLC) Layer; Part 4. Extension for Home Environment", ETSI TS 101 761-4 V1.2.1 (2000-12).

Other wireless standards support ad hoc networks. Examples include the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

Thus, there is a need for a method, system, and computer program product for integrating digital rights management into a mobile computing environment. The mobile computing environment can include any wireless wide area network such as a cellular network or short range wireless system such as a wireless LAN or a wireless personal area network. The method, system, and computer program product disclosed herein would provide a light-weight and efficient DRM architecture that can promote the growth of electronic commerce in the mobile computing environment.

SUMMARY OF THE INVENTION

A method, system, and computer program product for enabling a wireless device in a mobile communication environment to obtain fights to protected content of a digital asset. The digital asset is downloaded to the wireless device from any one of a plurality of content servers or other wireless devices. The digital asset compfising a content ID, content encrypted with a content key, and information on obtaining fights to the content being expressed in a voucher generated by a voucher server in the network. The method, system, and computer program product sends a request for a voucher for the said content to a DRM agent, receives an offer of consideration from the DRM agent, sends an acceptance of the consideration to the DRM agent, receives the voucher from the DRM agent, and enables the wireless device to decrypt said encrypted content with said content key. The voucher having metadata including identification information of the content associated with the voucher, use information specifying the type of use intended for the content, restfiction information limiting usage of the content, and transaction information including said content key.

The method, system, and computer program product also creates the digital asset for downloading to a wireless device from one of a plurality of content servers in a network. The creation includes storing a piece of digital content at one of the plurality of content servers, sending the digital content to a voucher server in the network, sending information associated with the content, receiving the digital content with the associated information at the voucher server, creating at the voucher server a content ID for the content, encapsulating the digital content into a protected format by encrypting it with a key, creating at least one voucher template for the digital content, the voucher template having metadata including received information associated with the content, the voucher template being used for generating a voucher for the content, storing at the voucher server the content ID and the created voucher template associated with the content, sending the digital asset, and registering the digital asset at the content server.

The method, system, and computer program product also generates a voucher at the voucher server. The generation includes receiving a request for a voucher from a DRM agent, sending an offer of consideration to the DRM agent, receiving from the DRM agent acceptance of the consideration, generating a voucher corresponding to the acceptance of consideration, and sending the voucher to the DRM agent. The method, system, and computer program product may receive in the request for a voucher identification information comprising at least one of an ID of a voucher requesting wireless device, an ID of a voucher requesting user, and an ID of the voucher requesting DRM agent. The method, system, and computer program product may also associate the generated voucher with received identification information comprising at least one of an ID of a voucher requesting wireless device, an ID of a voucher requesting user, an ID of the voucher requesting DRM agent, and a voucher generating date and time. The method, system, and computer program product may also store the generated voucher at the voucher server together with the associated identification information.

BRIEF DESCRIPTION OF THE DRAWINGS

The accompanying figures best illustrate the details of the method, system, and apparatus for controlling the distribution of a digital asset in a mobile communication environment, both as to its structure and operation. Like reference numbers and designations in these figures refer to like elements.

FIG. 3B is an illustration of an XML embodiment of the Mobile Rights Voucher shown in FIG. 3A.

FIGS. 4A through 4V illustrate the DTD declarations for the XML embodiment of the Mobile Rights Voucher shown in FIG. 3A.

FIGS. 5A through 5D illustrate, respectively, an exemplary DTD for subset A, subset B, subset C, and a baseline DTD for the XML embodiment of the Mobile Rights Voucher shown in FIG. 3A.

DETAILED DESCRIPTION OF THE INVENTION

Mobile Rights Voucher

Figure 1:
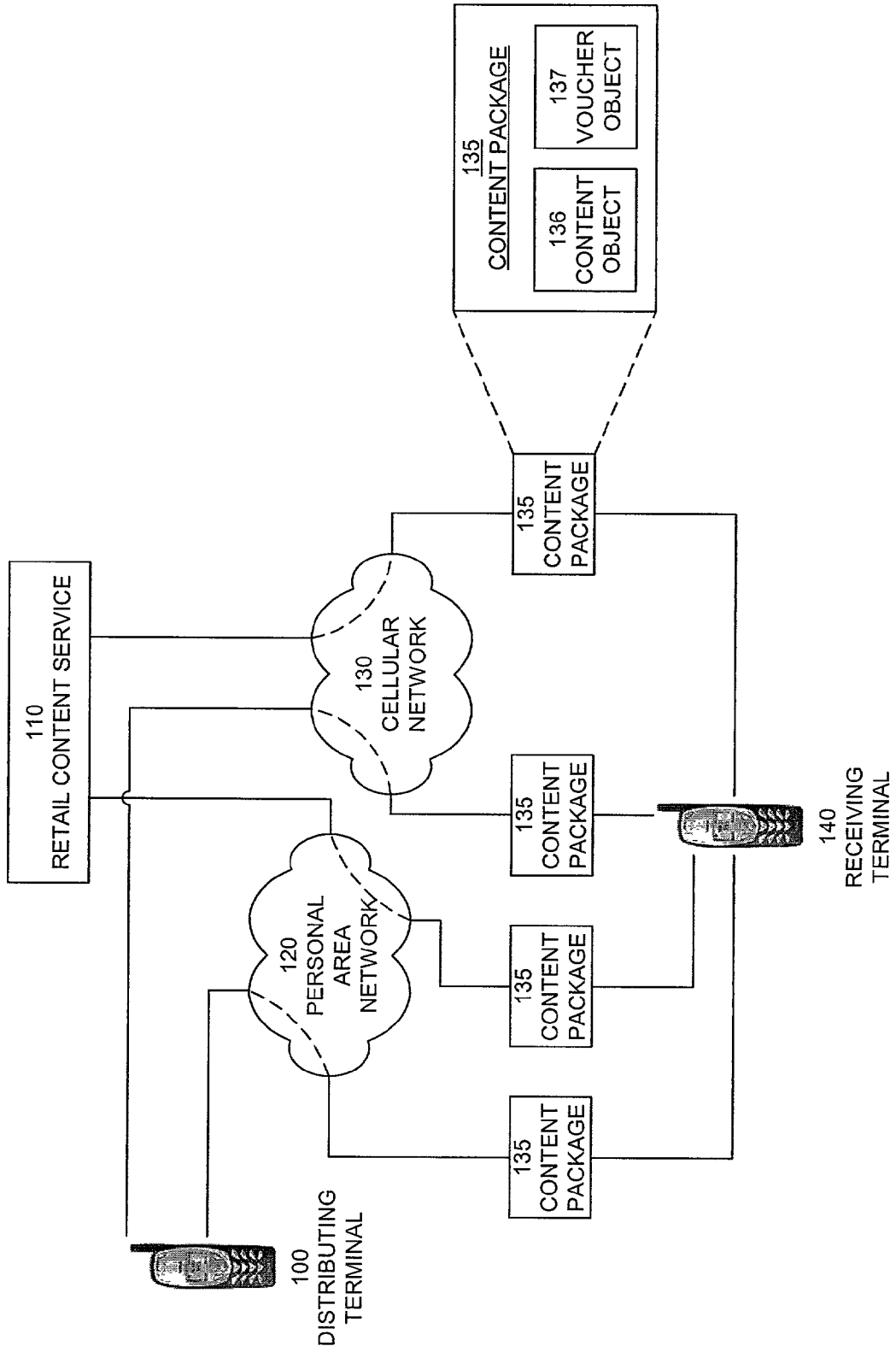
FIG. 1 is a network diagram that depicts the delivery of a Mobile Rights Voucher content package to a receiving terminal from either a distributing terminal or a network service.

The Mobile Rights Voucher disclosed herein manages the lifecycle of a piece of content and the associated property rights held by the creator or agent of the digital content. In addition, the Mobile Rights Voucher can facilitate flexible payment for content and can deliver the content separate from the voucher. The Mobile Rights Voucher is a message that can be sent by electronic mail, a Multimedia Messaging Service (MMS), or a Short Messaging Service (SMS). Alternatively, the Mobile Rights Voucher can be downloaded using a Wireless Application Protocol (WAP) or a Hypertext Transfer Protocol (HTTP).

Smart Content Object is a content encapsulation architecture that includes smart routing capabilities for content and can be useful for application routing. The Mobile Rights Voucher can use the Smart Content Object for expressing rights information. The Smart Content Object and Mobile Rights Voucher are both implemented on memory-limited devices such as a mobile phone or a personal digital assistant. The Mobile Rights Voucher is not bound in any way to the Smart Content Object and can be used in other transport architectures such as MMS and Hypertext Transfer Protocol/Multipurpose Internet Mail Extensions (HTTP/MIME).

The Mobile Rights Voucher is a "light-weight" DRM that can benefit a mobile environment. Additionally, the Mobile Rights Voucher can express usage rights for "low value" content such as cellular telephone ringing tones, operator logos, and additional levels for cellular telephone games.

In one embodiment, the Mobile Rights Voucher is sent over the air and can allow devices that implement this specification to interoperate. Due to constraints of implementation and industry-wide adoption, this specification does not attempt to deliver on all of the promise of DRM in a single step. Thus, the Mobile Rights Voucher full baseline specification is split three subsets. Subset A of the baseline specification supports no rights for a piece of content. Subset A relies upon another entity such as a service provider who supplies the mobile device to implement the Mobile Rights Voucher as a "stub" and take care of the implementation of specific DRM tasks. Subset B of the baseline specification supports the preview of digital content and allows for the specification of transaction and administrative information. Subset C of the baseline specification supports many intents and constraints with full distribution capabilities. Subsets B and C provide increased functional DRM capabilities for a mobile device such as a cellular telephone. The full baseline specification will provide a completely functional light-weight DRM architecture.

Compatibility with a publicly specified voucher system such as ODRL or XrML can improve the integration of the Mobile Rights Voucher with existing systems. Unfortunately, XrML is disqualified due of unclear licensing terms. Thus, the Mobile Rights Voucher is based upon a non-valid version of ODRL and is extended slightly in appropriate places to allow for the envisioned use cases.

FIG. 1 is a network diagram that depicts the delivery of content package 135 from either distributing terminal 100 or retail content service 110 to receiving terminal 140. Distributing terminal 100 is coupled to either personal area network 120 or cellular network 130. Personal area network 120 is a short-range network that implements an architecture specification such as Infrared data association (IrDA), Bluetooth, or object exchange architecture. Cellular network 130 is a communication network such as an analog signal, global system for mobile (GSM) communications, general packet radio service (GPRS), time-division multiple access (TDMA), or code-division multiple access (CDMA). In addition, cellular network 130 can accommodate Enhanced Data Rates for GSM Evolution (EDGE), an evolution of GSM and TDMA systems that increases network capacity and data rates up to 473 K-bits per second to enable Mobile Multimedia services, and Digital Video Broadcasting (DVB) technology. The delivery of content package 135 can use a single technology to receive the rights and the content or can mix technologies. A user may choose to receive the rights and the content using Bluetooth on personal area network 120 or, instead, receive the rights using Bluetooth on personal area network 120 and receive the content using DVB on cellular network 130. In one embodiment, distributing terminal 100, retail content service 110, and receiving terminal 140 are Bluetooth devices that use a radio frequency signal that includes data adhering to the Bluetooth protocol and specification to communicate data among the devices. However, the architecture disclosed herein and shown in FIG. 1 will apply to any appropriate wireless environment.

The first content delivery scenario shown in FIG. 1 involves personal area network 120 coupling distributing terminal 100 and receiving terminal 140. A user (not shown) coupled to distributing terminal 100 selects to transmit content package 135 to receiving terminal 140 using personal area network 120. Content package 135 includes content object 136 and voucher object 137.

The second content delivery scenario shown in FIG. 1 involves cellular network 130 coupling distributing terminal 100 and receiving terminal 140. A user (not shown) coupled to distributing terminal 100 selects to transmit content package 135 to receiving terminal 140 using cellular network 130. Content package 135 is the same as in the first delivery scenario and includes content object 136 and voucher object 137.

The third content delivery scenario shown in FIG. 1 involves personal area network 120 coupling retail content service 110 and receiving terminal 140. An owner (not shown) coupled to retail content service 110 selects to transmit content package 135 to receiving terminal 140 using personal area network 120. Content package 135 is the same as in the first delivery scenario and includes content object 136 and voucher object 137.

The fourth content delivery scenario shown in FIG. 1 involves cellular network 130 coupling retail content service 110 and receiving terminal 140. An owner (not shown) coupled to retail content service 110 selects to transmit content package 135 to receiving terminal 140 using cellular network 130. Content package 135 is the same as in the first delivery scenario and includes content object 136 and voucher object 137.

Figure 2:
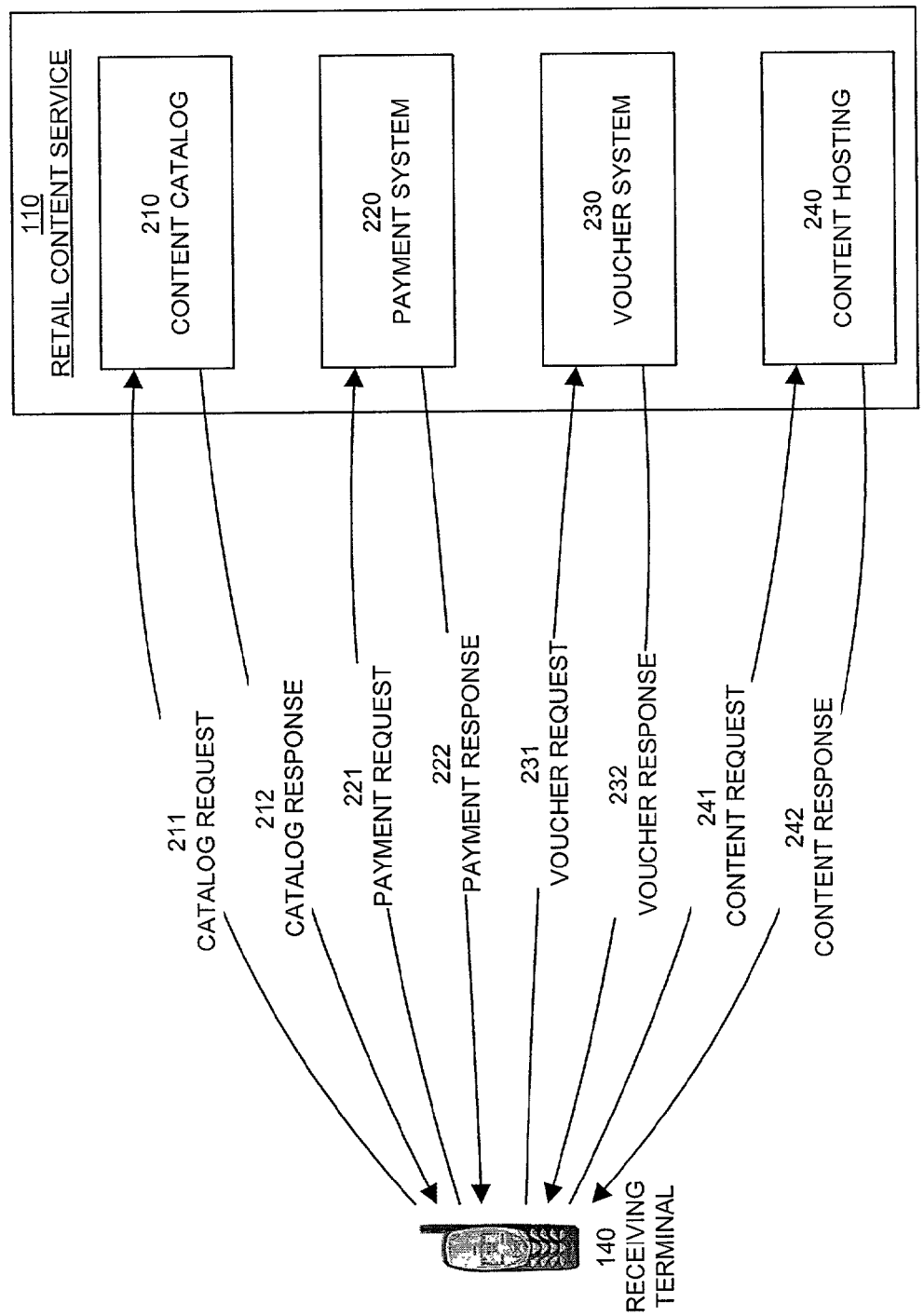
FIG. 2 is a network diagram that expands the system shown in FIG. 1 by illustrating an exemplary communication between the receiving terminal and the network service.

FIG. 2 is a network diagram that expands the system shown in FIG. 1 by illustrating the communication between retail content service 110 and receiving terminal 140. A user (not shown) is coupled to receiving terminal 140. Receiving device 140 communicates with retail content service 110 that includes content catalog 210, payment system 220, voucher system 230, and content hosting 240.

When the user carries receiving terminal 140 into the communication range of retail content service 110, the user can browse the content of retail content service 110 by sending catalog request 211 to content catalog 210 and receiving catalog response 212 from content catalog 210. In one embodiment, the format of catalog request 211 and catalog response 212 complies with either wireless access protocol (WAP) or hypertext transfer protocol (HTTP).

If the user decides to purchase content from retail content service 110, the user sends payment request 221 to payment system 220 and receives payment response 222 from payment system 220. The payment mechanism includes subscription-based, micro, and pre-paid payment systems. The payment is realized by sending an SMS message to a predetermined number maintained by an operator. The receipt of the message generates a charge to the bill the user gets from the service operator and the user can pay the fee using a typical telephone bill payment method. In one embodiment, the format of payment request 221 and payment response 222 complies with either WAP or HTTP.

The user receives either a Mobile Rights Voucher or a reference to the Mobile Rights Voucher from retail content service 110 as part of payment response 222. If the user receives the reference to the Mobile Rights Voucher, receiving terminal 140 retrieves the Mobile Rights Voucher by sending voucher request 231 to voucher system 230 and receiving voucher response 232 from voucher system 230. In one embodiment, the format of voucher request 231 and voucher response 232 complies with either a short messaging system (SMS), a multimedia messaging system (MMS), or an object download architecture. In addition, the Mobile Rights Voucher can contain a pictorial cover of a multimedia message related to the content that the user wants to retrieve.

The user either receives the content bundled with the Mobile Rights Voucher or downloads the content as an additional step. The user can download the content from retail content service 110 by sending content request 241 to content hosting 240 and receiving content response 242 from content hosting 240. In one embodiment, the format of content request 241 and content response 242 complies with either an SMS, an MMS, or an object download architecture.

There are many ways to model and implement a digital rights management (DRM) system to control the lifecycle of a piece of digital content. The voucher-based model of the system disclosed herein is flexible and provides a migration path to a more sophisticated system for managing digital commerce applications and private information. One embodiment of the system disclosed herein captures the usage rules, rights, and business rules in a Mobile Rights Voucher and stores the digital content (i.e., asset) and Mobile Rights Voucher as distinct objects in a content package. Since the content and the Mobile Rights Voucher are distinct objects, the consuming device can receive each piece separately.

Figure 3A:
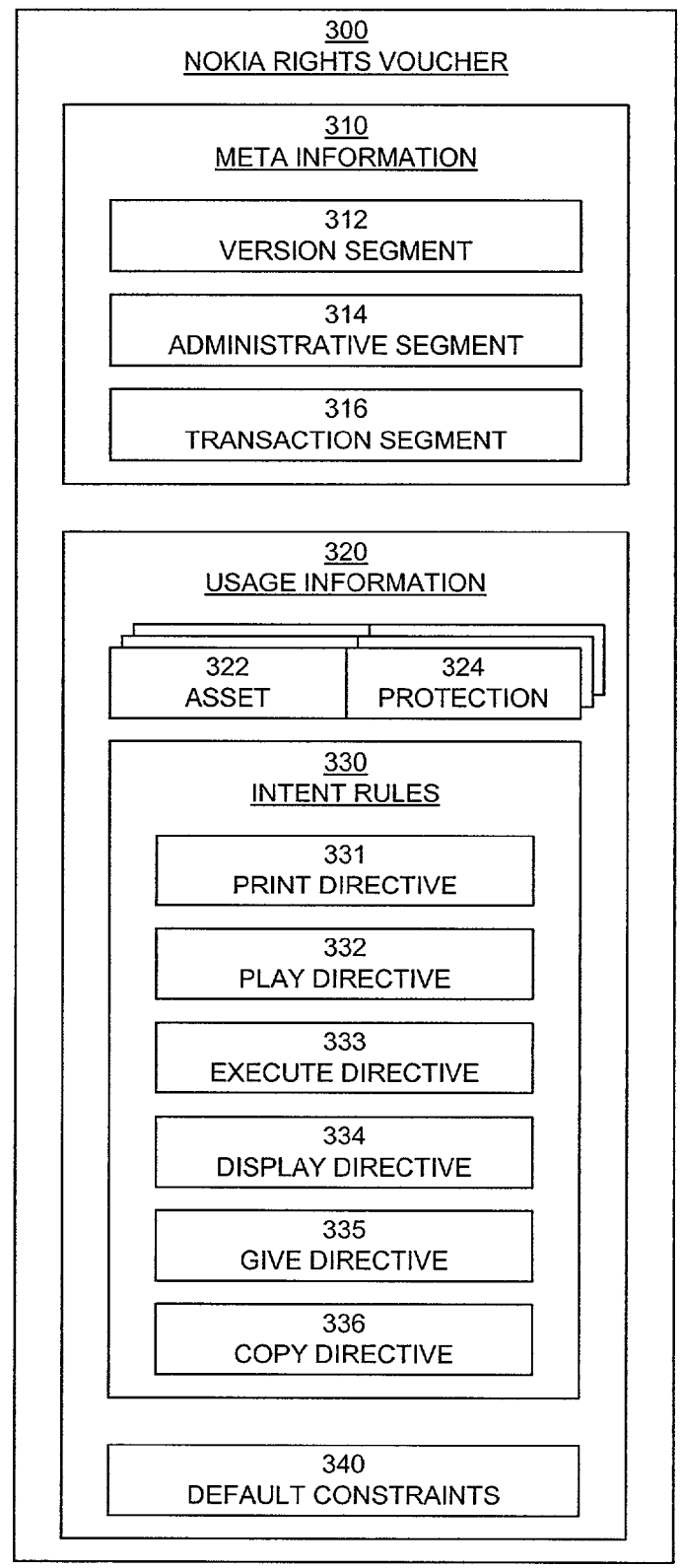
FIG. 3A is an abstract representation of an embodiment of a Mobile Rights Voucher.

FIG. 3A illustrates an abstract representation of a Mobile Rights Voucher based on the ODRL specification. A voucher is a representation of the usage rights for an item of digital content. The voucher identifies an asset, lists the usage and associated constraints for the asset, includes meta-information to identify a voucher service, the asset, and a payment transaction method, and provides a mechanism to unlock the asset if protection is used.

As shown in FIG. 3A, Nokia Rights Voucher 300 is a Mobile Rights Voucher that includes meta-information 310 and usage information 320. Meta-information 310 further comprises version segment 312, administrative segment 314, and transaction segment 316. Usage information 320 further comprises a list of asset 322 and protection 324 pairs, intent rules 330, and default constraints 340. Intent rules 330 include print directive 331, play directive 332, execute directive 333, display directive 334, give directive 335, and copy directive 336.

Nokia Rights Voucher 300 is a representation of the usage rights for a piece of digital content. The purpose of Nokia Rights Voucher 300 is to identify the assets that require protection, define possible usage constraints for each asset, define meta-information for the voucher service, the assets, and the transaction, and provide a mechanism to unlock the content if protection is used. A device that processes a voucher and it's content are inherently trusted to respect the rights and usage constraints for the voucher and to disallow access to the content if the rights or usage constraints are ignored.

FIG. 3B is an embodiment of Nokia Rights Voucher 300, the abstract Mobile Rights Voucher shown in FIG. 3A, which adheres to the XML specification. Line 1 defines the version and encoding scheme for the XML shown in FIG. 3B. Line 2 specifies the location of the document type definition (DTD) file that defines the interpretation of the XML markup tags shown in FIG. 3B. Lines 3 through 41 define the entire structure of Nokia Rights Voucher 300. Lines 4 through 8 define the entire structure of meta-information 310 and lines 9 through 40 define the entire structure of usage information 320. Line 4 illustrates version segment 312 of meta-information 310 as an XML tag that specifies Nokia Rights Voucher 300 version 1.0.3. Lines 5 through 7 illustrate administrative segment 314 of meta-information 310 as an XML tag that specifies the user identification (UID) as the URL "http://www.media-sampo.com/ScreenSaverService". Line 8 illustrates transaction segment 316 of meta-information 310 as an XML tag that specifies the transaction identifier (TID) "3457345987-6789-9". Lines 10 through 23 illustrate a list that includes two pairs of asset 322 and protection 324 for usage information 320, respectively, lines 10 through 16 and lines 17 through 23. Each pair specifies a UID for the asset and the protection associated with the UID. Lines 24 through 32 illustrate intent rules 330 of usage information 320. Line 24 illustrates display directive 334 of intent rules 330 that specifies that the recipient of Nokia Rights Voucher 300 has the right to display the content. Lines 25 through 32 illustrate the copy directive 336 of intent rules 330 that specifies that the recipient of Nokia Rights Voucher 300 has the right to copy "previewvoucher.343453344@digitalshop.com" until Aug. 30, 2001. Lines 33 through 36 illustrate default constraints 340 of usage information 320. Default constraints 340 specifies the individual UID "IMEI:123456789123459" as the constraint. Lines 38 through 40 illustrate the integrity protection constraints for Nokia Rights Voucher 300.

The XML embodiment of Nokia Rights Voucher 300 requires a document type definitions (DTD) file, such as the file "C:MRV1.0-subsetC.dtd" specified on line 2 in FIG. 3B, to specify the allowable order, structure, and attributes of XML markup tags for Nokia Rights Voucher 300. FIGS. 4A through 4V specify the DTD declarations and attributes for each element of the XML embodiment of the Mobile Rights Voucher shown in FIG. 3B. In addition, FIGS. 4A through 4V describe a purpose and a description for each element, as well as an example that uses the element in a DTD file, and an interoperability description that maps the XML embodiment of Nokia Rights Voucher 300 to a pure ODRL specification.

A Mobile Rights Voucher includes a unique identifier that does not change for any instance of the voucher. The Mobile Rights Voucher is a universal resource identifier (URI) such as a uniform resource locator (URL) and should include an absolute address path. In addition, the Mobile Rights Voucher should support at least the hypertext transfer protocol (HTTP), the international mobile equipment identity (IMEI) standard, the international subscriber identity (IMSI) standard, and the URL content identifier (CID) and message identifier (MID) schemes.

A Mobile Rights Voucher that results from a copy request by a user (i.e., using the "copy" intent rule associated with the voucher) will receive a new unique identifier. In addition, any self-referential links in the duplicated voucher (i.e., links defined in a "narrow" DTD element) will receive a new unique identifier.

The XML embodiment of the Mobile Rights Voucher supports a phased release of a digital rights management (DRM) system for a mobile environment. Thus, the full baseline Mobile Rights Voucher based on XML will result from a three-phased release of the Mobile Rights Voucher DTD specification.

Subset A of the Mobile Rights Voucher DTD specification is capable of expressing "no-rights" for a specific piece of digital content, that is, the user cannot use the digital content on the device. Subset A is intended for use with Smart Content Object and DRM packaging formats to express that the enclosed digital content is delivered without any rights and that a Mobile Rights Voucher is needed to access the content. The capabilities for Mobile Rights Voucher Subset A include:

| | |
|---|---|
| Download control | Not Available |
| Peer-to-peer control | Not Available |
| Usage controls | Not Available |
| Encapsulation | MIME multi-part/Smart Content Object |
| Application routing | MIME multi-part/Smart Content Object |
| Transport | Browsing (e.g., HTTP, WAP). |
| Voucher technology | Mobile Rights Voucher, Release 1, Subset A (ODRL-based) |
| Protection | Not Available |
| IMPACT | None |

Subset B of the Mobile Rights Voucher DTD specification supports the first phase of the Light DRM implementation. The capabilities for Mobile Rights Voucher Subset B include:

| | |
|---|---|
| Download control | Voucher server authorizing content download |
| Peer-to-peer control | Simple distribution |
| Usage controls | Preview (count and time) |
| Encapsulation | MIME multi-part/Smart Content Object |
| Application routing | MIME multi-part/Smart Content Object |
| Transport | Browsing (HTTP, WAP). Voucher and content can be transported independently. |
| Voucher technology | Mobile Rights Voucher, Release 1, Subset A (ODRL-based) |
| Protection | Not Available |
| IMPACT | Minimal impact on phone client. Legacy phones will be able to use content download. Need for voucher server (and related payment). Prepares for Phase Two service model. |

Subset C of the Mobile Rights Voucher DTD specification supports the second phase of the Light DRM implementation. The capabilities for Mobile Rights Voucher Subset B include:

| | |
|---|---|
| Download control | Voucher server authorizing content usage |
| Peer-to-Peer Control | Super distribution (person-to-person) possible |
| Usage Controls | Preview, Play, (not Give), Copy, Display, Print, and Execute |
| Encapsulation | MIME multi-part/Smart Content Object |
| Application Routing | MIME multi-part/Smart Content Object |
| Transport | Browsing (HTTP, WAP), MMS, and OBEX. Voucher and content can be transported independent of Smart Content Object. |
| Voucher Technology | Mobile Rights Voucher Release 1 (ODRL-based) |
| Protection | Content and voucher encryption and integrity protection |
| IMPACT | Medium impact on phone design (framework for usage rights and content storage). Opens up new super distribution-based business models. |

Backward compatibility is supported in every phase of the Mobile Rights Voucher DTD specification development. Thus, a voucher conforming to Mobile Rights Voucher subset A will be fully understood on a terminal that implements Mobile Rights Voucher subset A, B, or C. Similarly, a voucher conforming to Mobile Rights Voucher subset B will be fully understood in a terminal that implements Mobile Rights Voucher subset B or C.

Forward compatibility, on the other hand, is not guaranteed because some new elements may not be understood. This is a potentially dangerous situation regarding the protection of the expressed rights. If a device receives a piece of content that contains a constraint type (e.g., count, datetime, or individual elements) that the DTD cannot interpret, the entire constrain element is deemed to have failed. This ensures that no rights are lost. Thus, a voucher that conforms to Mobile Rights Voucher subset C cannot be guaranteed to be understood on a terminal that implements Mobile Rights Voucher subset B. The voucher may be used, however, if all constrain type in relevant constrain elements are understood by the subset B conforming device.

FIG. 5A illustrates an exemplary DTD for subset A of the Mobile Rights Voucher. The DTD defines the minimum and optional requirements for representing a container for multimedia digital assets that can expresses "no-right" or "full-right" for each asset. The quality "no-right" means that the associated asset is not to be used on the device at all, whereas the quality "full-right" means that the associated asset can be used on any device. Line 1 defines the version and encoding scheme for the DTD shown in FIG. 5A. Lines 2 through 5 are a comment. The DTD requires the presence of the "rights" element on lines 6 through 9 because the "rights" element is the root element for the Mobile Rights Voucher object. The "rights" includes zero or one "admin" elements and exactly one "usage" element. The DTD also requires the presence of the "admin" element on line 10 because the "admin" element describes the entity for identifying resource of vouchers. The "admin" element includes exactly one "uid" element. The DTD requires the presence of the "usage" element on line 11 because the "usage" element defines the usage rights for an asset. The "usage" element includes exactly one "asset" element. The "no-rights" usage is assigned to restrict access to the asset and the "full-rights" usage is assigned to use the asset. The absence of an asset declaration means that the voucher is associated with the enclosing content package. The DTD requires the presence of the "asset" element on line 12 because the "asset" element creates a reference to each asset associated with this voucher. The "asset" element includes zero or one "uid" element. The DTD requires the presence of the "uid" element on line 13 because the "uid" element represents a URI string. The "uid" element includes parsed character data.

FIG. 5B illustrates an exemplary DTD for subset B of the Mobile Rights Voucher. The DTD is intended to deliver a small and concise rights expression voucher by supporting content preview by count for multiple content types (i.e., multiple intents) and transaction and administrative (i.e., retail server URL) information. Line 1 defines the version and encoding scheme for the DTD shown in FIG. 5B. Lines 2 through 5 are a comment. The DTD requires the presence of the "rights" element on lines 6 through 9 because the "rights" element is the root element for the Mobile Rights Voucher object. The "rights" element includes zero or one "version" element, zero or one "admin" element, zero or one "transaction" element, and one or more "usage" elements. The "version" element on line 10 is an optional requirement that is set to the version number for the DTD (e.g., "1.0"). The "version" element includes parsed character data. The DTD requires the presence of the "admin" element on line 11 because the "admin" element describes the entity for identifying resource of vouchers. The "admin" element includes exactly one "uid" element. The DTD requires the presence of the "uid" element on line 12 because the "uid" element represents a URI string. The "uid" element includes parsed character data. The DTD requires the presence of the "transaction" element on line 13 because the "transaction" element specifies payment-related information in a format that is defined by the type of payment chosen. The "transaction" element includes parsed character data. The DTD requires the presence of the "usage" element on line 14 because the "usage" element defines the usage rights for an asset. The "usage" element includes exactly one "asset" element, zero or one "display" element, zero or one "play" element, zero or one "execute" element, and zero or one "copy" element. Subset B provides support for preview related rights such as "display", "play", "execute", and "copy" that are only used once, but does not support any super-distribution rights such as "copy" or "give". The DTD requires the "asset" element on line 15 because the "asset" element creates a reference to each asset associated with this voucher. The "asset" element includes zero or more "uid" elements. The DTD requires the "display" element on line 16 because the "display" element defines the rights to visually render an asset on a display device. The "display" element includes zero or one "constrain" elements. For subset B, "display" is a preview element and only allows rendering of an asset one time. The DTD requires the presence of the "play" element on line 17 because the "play" element defines the rights to render an asset into audio or video form. A visual asset that does not change over time can be regarded as a "still video" and rendered using the "play" element as opposed to the "display" element. The "play" element includes zero or one "constrain" elements. For subset B, "play" is a preview element and only allows rendering of an asset one time. The DTD requires the presence of the "execute" element on line 18 because the "execute" element defines the rights to render an asset into machine-readable form. The "execute" element includes zero or one "constrain" elements. For subset B, "execute" is a preview element and only allows rendering of an asset one time. The DTD requires the presence of the "copy" element on line 19 because the "copy" element defines the rights to forward a copy of an asset to another user's terminal. The "copy" element includes zero or one "constrain" elements. For subset B, "copy" is a preview element and only allows forwarding a preview copy of an asset.

The DTD requires the presence of the "constrain" element on line 20 because the "constrain" element is used to ensure there is only one usage of the intent. The "constrain" element includes zero or one "count" elements and zero or one "datetime" elements. The DTD requires the presence of the "count" element on line 21 because the "count" element holds the one usage restriction. The "count" element includes parsed character data. The DTD requires the presence of the "datetime" element on line 22 because the "datetime" element restricts usage based on time. The "datetime" element includes zero or one "start" element and zero or one "end" element. The DTD requires the presence of the "start" element on line 23 because the "start" element sets a starting count or a starting date. The "start" element includes parsed character data. The DTD requires the presence of the "end" element on line 24 because the "end" element sets an ending count or an ending date. The "end" element includes parsed character data.

FIG. 5C illustrates an exemplary DTD for subset C of the Mobile Rights Voucher. The DTD is intended to deliver additional rights to the subset B voucher by supporting content usage controlled by the voucher system, super-distribution business models, possible binding to device IMEI, and possible protection. Line 1 defines the version and encoding scheme for the DTD shown in FIG. 5C. Lines 2 through 5 are a comment. The DTD requires the presence of the "rights" element on lines 6 through 10 because the "rights" element is the root element for the Mobile Rights Voucher object. The "rights" element includes zero or one "version" element, zero or one "admin" element, zero or one "transaction" element, one or more "usage" elements, and zero or one "protection" elements. The "version" element on line 11 is an optional requirement that is set to the version number for the DTD (e.g., "1.0"). The "version" element includes parsed character data. The DTD requires the presence of the "admin" element on line 12 because the "admin" element describes the entity for identifying resource of vouchers. The "admin" element includes one or more "uid" elements. The DTD requires the presence of the "uid" element on line 13 because the "uid" element represents a URI string. The "uid" element includes parsed character data. The DTD requires the presence of the "transaction" element on line 14 because the "transaction" element specifies payment-related information in a format that is defined by the type of payment chosen. The "transaction" element includes parsed character data. The "protection" element on line 15 is an optional requirement that stores protection information for the content package. The "protection" element includes parsed character data. The DTD requires the presence of the "usage" element on lines 16 and 17 because the "usage" element defines the usage rights for an asset. Subset C provides full support including super-distribution rights for intents such as "print", "display", "play", "execute", and "copy", but does not support the super-distribution rights for the "give" intent. The "usage" element includes one or more "asset" elements, zero or more "print" elements, zero or more "display" elements, zero or more "play" elements, zero or more "execute" elements, zero or more "copy" elements, and zero or one "constrain" elements. The DTD requires the presence of the "asset" element on line 18 because the "asset" element creates a reference to each asset, the rights-holder, and any protection associated with this voucher. The "asset" element includes zero or more "uid" elements, zero or more "rightsholder" elements, and zero or one "protection" element. The DTD requires the presence of the "rightsholder" element on line 19 because the "rightsholder" element enables the association of a rights-holder with a specified asset. The "rightsholder" element includes exactly one "uid" element. The DTD requires the presence of the "print" element on line 20 because the "print" element defines the rights to visually render an asset on a display device. The "print" element includes zero or one "constrain" element. For subset C, "print" is a preview element and only allows rendering of an asset one time. The DTD requires the presence of the "display" element on line 21 because the "display" element defines the rights to visually render an asset on a display device. The "display" element includes zero or one "constrain" element. For subset C, "display" is a preview element and only allows rendering of an asset one time. The DTD requires the presence of the "play" element on line 22 because the "play" element defines the rights to render an asset into audio or video form. A visual asset that does not change over time can be regarded as a "still video" and rendered using the "play" element as opposed to the "display" element. The "play" element includes zero or one "constrain" element. For subset C, "play" is a preview element and only allows rendering of an asset one time. The DTD requires the presence of the "execute" element on line 23 because the "execute" element defines the rights to render an asset into machine-readable form. The "execute" element includes zero or one "constrain" element. For subset C, "execute" is a preview element and only allows rendering of an asset one time. The DTD requires the presence of the "copy" element on line 24 because the "copy" element provides support for super-distribution of assets and the ability to duplicate narrowed vouchers. The "copy" element includes zero or one "constrain" element and one or more "narrow" elements. The DTD requires the presence of the "narrow" element on line 25 because the "narrow" element provides a list of vouchers that will be duplicated with the content. The "narrow" element includes zero or more "uid" elements. The DTD requires the presence of the "constrain" element on line 26 because the "constrain" element is used to ensure there is only one usage of the intent. The "constrain" element includes zero or one "datetime" element, zero or one "count" element, and zero or more "individual" elements. The DTD requires the presence of the "datetime" element on line 27 because the "datetime" element restricts usage based on time. The "datetime" element includes zero or one "start" element and zero or one "end" element. The DTD requires the presence of the "start" element on line 28 because the "start" element sets a starting count or a starting date. The "start" element includes parsed character data. The DTD requires the presence of the "end" element on line 29 because the "end" element sets an ending count or an ending date. The "end" element includes parsed character data. The DTD requires the presence of the "count" element on line 30 because the "count" element holds the one usage restriction. The "count" element includes parsed character data. The "individual" element on line 31 is an optional requirement that provides the capability to associate the defined rights with a specified device or user. The "individual" element includes one or more "uid" elements.

FIG. 5D illustrates an exemplary baseline DTD for the Mobile Rights Voucher. The baseline DTD provides capabilities in addition to the capabilities provided in subset C. Line 1 defines the version and encoding scheme for the DTD shown in FIG. 5D. Lines 2 through 6 are a comment. The DTD requires the presence of the "rights" element on lines 7 through 11 because the "rights" element is the root element for the Mobile Rights Voucher object. The "rights" element includes zero or one "version" element, zero or one "admin" element, zero or one "transaction" element, one or more "usage" elements, and zero or one "protection" elements. The "version" element on line 12 is a should requirement that is set to the version number for the DTD (e.g., "1.0"). The "version" element includes parsed character data. The DTD requires the presence of the "admin" element on line 13 because the "admin" element describes the entity for identifying resource of vouchers. The "admin" element includes one or more "uid" elements. The DTD requires the presence of the "uid" element on line 14 because the "uid" element represents a URI string. The "uid" element includes parsed character data. The DTD requires the presence of the "transaction" element on line 15 because the "transaction" element specifies payment-related information in a format that is defined by the type of payment chosen. The "transaction" element includes parsed character data. The "protection" element on line 16 is a should requirement that stores protection information for the content package. The "protection" element includes parsed character data. The DTD requires the presence of the "usage" element on lines 17 and 18 because the "usage" element defines the usage rights for an asset. The baseline DTD provides full support including super-distribution rights for intents such as "print", "display", "play", "execute", "copy", and "give". The "usage" element includes one or more "asset" elements, zero or more "print" elements, zero or more "display" elements, zero or more "play" elements, zero or more "execute" elements, zero or more "copy" elements, zero or more "give" elements, and zero or one "constrain" elements. The DTD requires the presence of the "asset" element on line 19 because the "asset" element creates a reference to each asset, the rights-holder, and any protection associated with this voucher. The "asset" element includes zero or more "uid" elements, zero or more "rightsholder" elements, and zero or one "protection" element. The DTD requires the presence of the "rightsholder" element on line 20 because the "rightsholder" element enables the association of a rights-holder with a specified asset. The "rightsholder" element includes exactly one "uid" element. The DTD requires the presence of the "print" element on line 21 because the "print" element defines the rights to visually render an asset on a display device. The "print" element includes zero or more "constrain" elements. The DTD requires the presence of the "display" element on line 22 because the "display" element defines the rights to visually render an asset on a display device. The "display" element includes zero or more "constrain" elements. The DTD requires the presence of the "play" element on line 23 because the "play" element defines the rights to render an asset into audio or video form. A visual asset that does not change over time can be regarded as a "still video" and rendered using the "play" element as opposed to the "display" element. The "play" element includes zero or more "constrain" elements. The DTD requires the presence of the "execute" element on line 24 because the "execute" element defines the rights to render an asset into machine-readable form. The "execute" element includes zero or more "constrain" elements. The DTD requires the presence of the "copy" element on line 25 because the "copy" element provides support for super-distribution of assets and the ability to duplicate narrowed vouchers. The "copy" element includes zero or more "constrain" elements and one or more "narrow" elements. The DTD requires the presence of the "give" element on line 26 because the "give" element provides support for transfer of an asset to another terminal or user. The "give" element includes zero or more "constrain" elements and one or more "narrow" elements. The DTD requires the presence of the "narrow" element on line 27 because the "narrow" element provides a list of vouchers that will be duplicated with the content. The "narrow" element includes zero or more "uid" elements. The DTD requires the presence of the "constrain" element on line 28 because the "constrain" element is used to ensure there is only one usage of the intent. The "constrain" element includes zero or more "datetime" elements, zero or more "count" elements, and zero or more "individual" elements. The DTD requires the presence of the "datetime" element on line 29 because the "datetime" element restricts usage based on time. The "datetime" element includes zero or one "start" element and zero or one "end" element. The DTD requires the presence of the "start" element on line 30 because the "start" element sets a starting count or a starting date. The "start" element includes parsed character data. The DTD requires the presence of the "end" element on line 31 because the "end" element sets an ending count or an ending date. The "end" element includes parsed character data. The DTD requires the presence of the "count" element on line 32 because the "count" element holds the one usage restriction. The "count" element includes parsed character data. The "individual" element on line 33 is an optional requirement that provides the capability to associate the defined rights with a specified device or user. The "individual" element includes one or more "uid" elements.

The XML embodiment of the Mobile Rights Voucher requires strict conformance with the implementation requirements described below. The requirements disclosed herein apply to every subset of Mobile Rights Voucher unless otherwise stated.

A voucher is an atomic unit and cannot be specified in part or divided into parts. When a voucher is delivered to a terminal it is associated with an identifier. The identifier is a valid URI, is delivered with the voucher in the delivery package, and is stored with the voucher on the terminal. Examples of the delivery packaging include multipurpose Internet mail extensions (MIME), multimedia messaging system (MMS) and NSC. Valid URI schemes include URL and MSG-ID. This supports voucher identification which is necessary for distribution.

An asset (i.e., an item of digital content) is associated with an identifier. The identifier is a valid URI. The identifier is delivered with the asset in the delivery package and is stored with the asset on the terminal. Examples of the delivery packaging include MIME, MMS and NSC. Valid URI schemes include URL and MSG-ID. This supports asset identification and is critical for the expression of rights in the voucher.

A piece of digital content delivered as part of the Light DRM system has an associated rights voucher that contains the usage rights controlling access to the content. All access is governed through the voucher and the rights expressed within the voucher.

A system that implements the Mobile Rights Voucher architecture disclosed herein must respect the rights expressed in the voucher. If a device receives a piece of content that includes a constrain element that contains a constraint type (e.g., count, datetime, or individual) that it cannot interpret, the entire constrain element is deemed to have failed and the device returns boolean "false". This ensures that no rights are lost. Thus, a voucher conforming to Mobile Rights Voucher Subset C which cannot be guaranteed to be understood on a terminal implementing Mobile Rights Voucher Subset B may be used if all constrain types in relevant constrain elements are understood by the Subset B conformant device.

In addition, the implementation is able to associate each digital asset (i.e., piece of content) with the associated Mobile Rights Voucher. This is accomplished by linking the identifier references under the asset tag declaration in the Mobile Rights Voucher and the identifier reference delivered with each digital asset or piece of content. This supports the independent delivery of the voucher and the associated content.

The intent elements specified in the XML DTD support current content types. The implementing applications should use the most appropriate intent elements for their content. If an intent element is not declared then that intent element must not be invoked on the specified asset(s). An intent may contain several constrain elements that evaluate to a boolean value. For example:

```
intent_result
    = evaluation if an intent can be invoked or not
    = (true AND intent_constrain_result AND usage_constrain_result)
```

When the result of the evaluation is "false" the intent has failed and the intent must not be invoked. For example:

```
intent_constrain_result
    = evaluation of ALL constrain elements expressed under an intent
    = (true AND constrain_element_1 AND constrain_element_2
        AND ... AND constrain_element_N)
```

When the result of the evaluation is "false" the intent constrain has failed and the result is used as part of the greater expression evaluation. The English description of the boolean expression is that both the constrain elements attached to an intent AND the usage (default) constrain element must all be satisfied (i.e., evaluate to "true) before the intent can be invoked.

A constraint element can be associated with either a usage element or an intent element. A constraint can have several types of constraints. The implementation is pessimistic. Thus, if any constraint for an intent element fails then that intent must not be invoked on the content. This supports combinations of individual and time expiry of content. This is a boolean expression evaluating to either true or false. For example:

```
constrain_element
    = evaluation of all constrain-types under a constrain element.
    = (true AND constrain_type_1 AND constrain_type_2 AND ...
        AND constrain_type_N)
```

When the result is boolean "false" the constrain element has failed and this result is used as part of the greater expression evaluation.

The constrain element that can be declared at the usage element level is a default constraint that is applied to all intent elements under that usage element.

```
usage_constrain_result
    = (true AND constrain_type_1 AND constrain_type_2 AND ...
        AND constrain_type_N)
```

When the result is boolean false the usage constrain has failed and this result is used as part of the greater expression evaluation.

If an intent element contains no constrain elements then the asset can be used without restriction for that intent.

If there are no intent elements declared, then the asset must not be used for any reason. This is a special case that is used to express "no-rights" to the specified assets.

The count constraint indicates the number of times an intent element can be invoked on an asset. The count element is a non-negative integer number and can include zero. The implementing system must maintain outside the voucher the current count for that voucher-usage-intent constrain element. Each count has its own variable and is updated separately. When the running total is equal to the count value in the voucher, the count is considered expended. Thus, the content must not be used for that intent after the count is expended. This is referred to a "remaining rights". Invocation of an intent element that has multiple count constraints will cause each associated variable to be incremented upon the invocation of the intent element.

The datetime constraint indicates a period of time when an intent element can be invoked on an asset. The datetime element may include an end element indicating the expiration date beyond which the content must not be used. If there is a start element then the asset must not be used before that point. If the start element is missing then the start time is the current time. The format for the value type is expressed as the complete representation, basic format for a calendar date. The textual format specifies a four-digit year, two-digit month, and two-digit day of the month. There are no textual separator characters between the year, month, and day of the month. The implementing system must ensure that vouchers are created consistently such that the start time is less than the end time. For release 1 (subsets A, B, and C) of the Mobile Rights Voucher the datetime element only support calendar dates. In addition, there are not remaining rights with the datetime element. Release 2 of the Mobile Rights Voucher will provide support for relative datetime periods and will include the time of day in addition to the calendar date. For release 2 of the Mobile Rights Voucher, the universal time constant (UTC) format will be used for the time of day.

The individual constraint requires that the consuming terminal be able to match a locally stored unique identifier to the unique identifier included in the voucher. It is recommended that the unique identity is securely associated with to the terminal using either as an International Mobile Equipment Identity (IMEI) number or an identifier from a Wireless Identity Module (WIM). If this identity is not present in the terminal then the intent must not be used. The identity in the voucher is expressed as a URI.

Distribution by copying the content is accomplished by a digital voucher stored at a user's node in the network. The user's node is the distributing terminal and can include the user's mobile or wireless device. The digital voucher authorizes the distributing terminal to cause the duplication of the specified primary or secondary content that may be located in the distributing terminal or elsewhere in the network. The receiving terminal can then download the duplicated copy of the content, based on the terms specified in the voucher.

Figure 6:
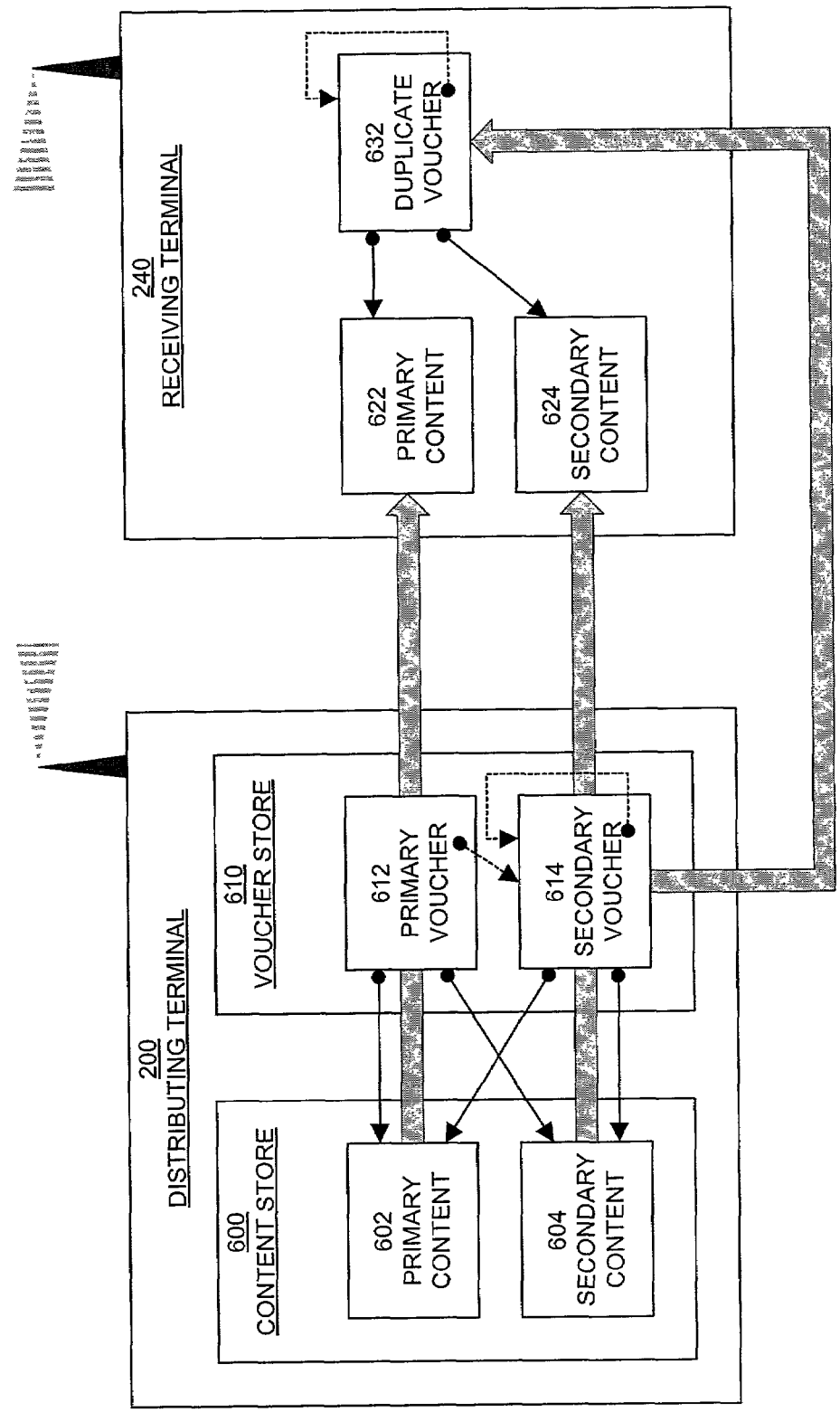
FIG. 6 is a functional block diagram that illustrates the interaction of a distribution terminal and a receiving terminal in the distribution of a primary and a secondary content in the Mobile Rights Voucher copy intent process.

As shown in FIG. 6, the Mobile Rights Voucher includes support for the distribution of content using a "copy" intent and a "give" intent. These are only two of the building blocks used in the creation of a content super distribution business.

The "copy" intent has the semantics to make a faithful duplicate of the content resulting in a new instance with the same specified rights (the "duplicate" here refers to the new instance). The copier does not lose any rights to the content. The copied assets may have to be regenerated if the voucher is "personalized" (this will be discussed later). If a voucher does not contain a "copy" intent element then the specified assets and vouchers cannot be copied (or given). The copy operation is achieved using the Mobile Rights Voucher format, the user agent behavior, and some protocol elements. An understanding of copy will require reading each of these sections.

The "copy" intent element specifies that the asset(s) defined in the enclosing usage are to be duplicated in preparation for forwarding. The forwarding is a feature supported by the application. Associated with a "copy" intent element are the usual constraints that have been discussed above and the "copy" intent must only be invoked if there is no satisfied constraint.

Also included with the "copy" intent is the narrow element. In the narrow element one must either specify the references for the vouchers that are to be duplicated in addition to the assets and then associated with those assets for forwarding, or if no voucher is specified the enclosing voucher is assumed to be implicitly specified. This perpetuated the requirement for voucher identifiers. The additional vouchers are external to the original voucher and could even be located on a separate system although this would greatly affect implementation.

FIG. 6 illustrates the distribution of content in a mobile environment using the Mobile Rights Voucher copy intent. In FIG. 6, a user (not shown) coupled to distributing terminal 200 purchases some digital content and is copying or forwarding the digital content to receiving terminal 240. Resident in the memory of distributing terminal 200 is content store 600 and voucher store 610. Content store 600 includes two pieces of digital content, primary content 602 and secondary content 604. Voucher store 610 includes two vouchers, primary voucher 612 and secondary voucher 614. Primary voucher 612 is a "full rights" voucher that allows the user to render the content as many times as necessary, but eliminates the fear of leaking rights by not allowing the duplication of the content. Primary voucher 612 includes pointers to primary content 602 and secondary content 604. Secondary voucher 614 is a "preview" voucher that distributes a preview or one-time copy of the content to another user. Secondary voucher 614 includes pointers to primary content 602 and secondary content 604. Primary voucher 612 includes a reference, in the narrow element, to secondary voucher 614. Secondary voucher 614 includes a reference, in the narrow element, to secondary voucher 614 to itself that allows secondary voucher 614 to create a duplicate of itself.

If an application supports the Mobile Rights Voucher copy or forwarding feature, the user can invoke a forwarding operation to copy the content to another user coupled to receiving terminal 240. The "copy" intent associated with primary voucher 612 duplicates primary content 602 as primary content 622, and signals secondary voucher 614 to duplicate secondary content 604 as secondary content 624 and duplicate secondary voucher 614 as duplicate voucher 632. When the forwarding operation is complete, primary content 622, secondary content 624, and duplicate voucher 632 are resident in the memory of receiving terminal 240. Furthermore, duplicate voucher 632 includes pointers to primary content 622, secondary content 624, and a reference, in the narrow element, to itself that allows duplicate voucher 632 to create a duplicate of itself.

A "personalized" voucher is a voucher that contains information that is specific to the terminal to which it is being sent. The "personalized" voucher includes individual and protection elements and sometimes includes admin and transaction elements. For any of these elements, but especially individual and protection, it will be necessary to regenerate the copied voucher before it can be forwarded to another user. This is performed either on the terminal itself or on the network. Terminals must not modify vouchers for Mobile Rights Voucher release 1 except for identifier regeneration during copy. There are significant side affects that make sufficient implementation very difficult. Any regeneration of a voucher must take place at a Voucher server on the network. There is a protocol for this that is explained later.

The "give" intent has the semantics that one gives away rights to another party. Thus, after invoking the "give" intent, the giver may be left with no rights to the given content. The give operation is very similar to the copy operation described above with the following key differences.

The content is duplicated similar to the copy operation, however, the given usage rights are removed from the givers voucher. In fact, the vouchers are queued for delivery to the target terminal. The giver creates a "no-rights" voucher in the place of the given voucher. This is achieved by duplicating the original voucher and then removing the intents from the usage block. It is useful for giver to maintain the admin and transaction information from the original voucher.

Again there is an issue of "personalized" vouchers such that the give would have to involve a regeneration process of the given voucher. The issues are the same as with copy. Thus, give is performed with the aid of an intermediary voucher server rather than performing the give from one terminal to another.

The remaining rights differ from the "copy" intent. When a voucher is given to another party only the remaining rights from that voucher can be given. In this scenario, the giver uses an intermediary voucher server rather than performing the give from one terminal to another.

Usage rights may be defined as unlimited or limited. In the case of unlimited rights, remaining rights are always equal to original rights.

Limited rights fall into one of two categories, rights that are unaffected by actual usage, and rights that are reduced by usage.

Limited rights that are unaffected by usage include "the right to use an asset until a specified datetime". The remaining rights of the asset is "until that date and time".

Limited rights that are affected by usage include "use the asset COUNT number of times" and "use the asset for INTERVAL number of seconds" (not in Mobile Rights Voucher, Release 1). The remaining rights of the asset are the COUNT or INTERVAL currently unused. Use is defined as either PLAY/DISPLAY/etc. or GIVE.

Copy must not take account of remaining rights. When copy is invoked on a voucher it must make an exact duplicate of the expressed rights.

End-to-end solutions are required to protect content and the vouchers that authorize use of that content. There are three areas in which content may be attacked by hackers within a closed-distribution mobile environment. If a closed environment is undesirable or is too expensive to achieve, the only alternative is to ensure that the content is protected. This will require that parts of the voucher also be protected.

First, content is subject to attack by hackers in a closed-distribution mobile environment on the Service Provider server. Protection on the server is achieved by implementing proper secure environments and premises combined with appropriate mechanisms to guarantee that only paying customers have access to the content. Since the compromise of a server will result in theft of all content, similarly strong security is assumed for server for all categories of time value of content.

Second, content is subject to attack by hackers in a closed-distribution mobile environment while in transit from the Service Provider to the device. Technologies for securing content in transit include secure socket layer (SSL) or wireless transport layer security (WTLS) for session-based protection and encrypted content and vouchers that do not depend upon encrypted communication lines.

Third, content is subject to attack by hackers in a closed-distribution mobile environment while stored on the device. It is important to note that even if content is protected while in transit, once it is stored in the device it is vulnerable to attack. Solutions include hardware and tamper resistance techniques, persistently protecting the content using encryption techniques such as RSA or Diffie-Hellman encryption, and a combination of tamper resistance and encryption. The protection strategy depends on features of the device and the time-sensitive nature of the content.

The Mobile Rights Voucher can be used in solutions where the content is of a very low value but is distributed in a very large volume. In this environment, distribution costs are very low. In addition, the need for protection is balanced with the content value, cost of protection (terminal and network infrastructure) and the consumer usability issues.

If the Mobile Rights Voucher protects the operating environment, it is not possible for content with associated Mobile Rights Voucher vouchers to be distributed outside the operating environment. This is termed a "closed system" approach. The major cost in this solution is to engineer terminals that will respect this restriction for content with vouchers and to ensure that inter-operating terminals (developed by other vendors) will also respect the closed system requirement. On the other hand, if the Mobile Rights Voucher protects the content, even if content is leaked it is unusable due to the protection. Encryption is the typical mechanism used to achieve this. The major cost in this solution is the creation of a terminal key for each terminal and protecting those keys and the associated key infrastructure required for managing the system.

Mobile Rights Voucher will support basic protection facilities. It is possible that the assets referenced in the voucher are protected (e.g. using encryption). If the assets are protected, a protection instrument (e.g. decryption key) would be necessary to open the asset. This protection instrument could arrive to the consuming device prior to the purchase, with the purchase, or as part of a separate transaction. If the protection instrument arrives prior to the purchase, an instrument can be manufactured into the device or provisioned to the device. If the protection instrument arrives with the purchase, the instrument can be delivered to the device in a voucher as part of the asset purchase transaction. If the protection instrument arrives as part of a separate transaction, the instrument can be delivered to the device by means other than a voucher as part of the asset purchase transaction.

The Mobile Rights Voucher accounts for the protection instrument arriving with the purchase. The Mobile Rights Voucher supports this with a protection element that can carry the protection instrument (e.g. a decryption key) that can open the protected asset(s). Since protecting assets without protecting the protection instrument that can open the asset provides little additional security, it is reasonable to expect that the protection instrument will itself be protected (e.g. by encryption). If the protection instrument is secured in some way there is a system external to the voucher system which enable access to the secured protection instrument. This part of the protection scenario is outside the scope of Mobile Rights Voucher.

The Mobile Rights Voucher protection element is a container for meta-information for protection related information that might be transmitted with the voucher. Since ODRL does not support any protection features, the Mobile Rights Voucher is adding these protection features to the ODRL specification.

The XML embodiment of the Mobile Rights Voucher defines the following headers for use with either an HTTP header or a MIME header. These headers have been defined for the purpose of exchanging vouchers between entities. For different transport systems the following are replicated. These are needed to support content distribution where the voucher requires regeneration from a Voucher Server.

| | |
|---|---|
| x-mrv-giveVoucherSend | Used to indicate to a voucher server that the associated voucher is to be handed to another entity. The final receiving entity will identify itself using the x-mrv-drv-voucherIndex header. The element can take the parameters "req" and "resp". |
| x-mrv-voucherIndex | Used to indicate to the receiver that the attached voucher should be used to automatically retrieve a new voucher from the location defined by the ADMIN element definition. It is possible that the Voucher Server would attempt to authenticate the receiver at this point. |
| Accept-content | Takes a list of accepted media types as parameters. If the device indicates that it supports the Mobile Rights Voucher media type it also must adhere to the roles of at least the MIN profile. |
| x-mrv-mode | Indicates to the receiver which versions of Mobile Rights Voucher are supported by the client. |

The source terminal of the copy operation can send the voucher to be copied, as well as the asset, to the destination or target terminal of the copy operation. The voucher may be defined using a narrow attribute.

Figure 7:
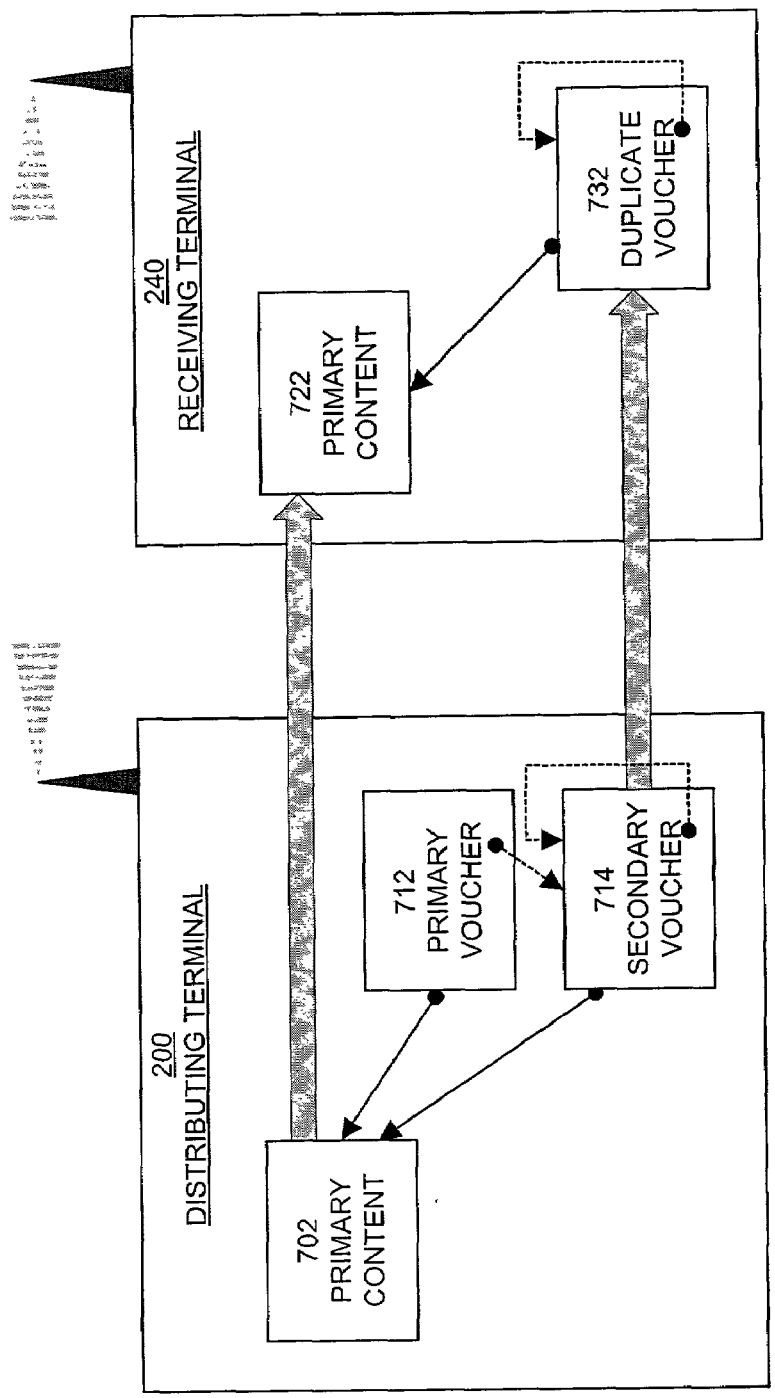
FIG. 7 is a functional block diagram that illustrates the interaction of a distribution terminal and a receiving terminal in the non-personalized Mobile Rights Voucher copy intent process for sending a preview copy of protected digital content.

FIG. 7 illustrates the Mobile Rights Voucher non-personalized copy process for sending a preview copy of protected digital content. In FIG. 7, a user (not shown) coupled to distributing terminal 200 purchases some digital content and wants to send an unedited preview copy of the digital content to receiving terminal 240. Primary content 702, primary voucher 712, and secondary voucher 714 are resident in the memory of distributing terminal 200. Primary voucher 712 is a "full rights" voucher that allows the user to render the content as many times as necessary, but eliminates the fear of leaking rights by not allowing the duplication of the content. Primary voucher 712 includes pointers to primary content 702 and a reference, in the narrow element, to secondary voucher 714. Secondary voucher 714 is a "preview" voucher that distributes a preview or one-time copy of the content to another user. Secondary voucher 714 includes pointers to primary content 702, and a reference, in the narrow element, to itself that allows secondary voucher 714 to create a duplicate of itself.

If an application supports the Mobile Rights Voucher non-personalized copy feature, the user can invoke a forwarding operation to copy the content to another user coupled to receiving terminal 240. When the user selects to send a preview voucher to receiving terminal 240, the distributing terminal 200 retains the rights to primary content 702 and continues to maintain primary voucher 712 and secondary voucher 714. The "copy" intent associated with secondary voucher 714 duplicates secondary voucher 714 as duplicate voucher 732 and duplicates primary content 702 as primary content 722. Distributing terminal 200 may transfer primary content 722 and duplicate voucher 732 to receiving terminal 240 separately or as a single unit. When the non-personalized copy is complete, primary content 722 and duplicate voucher 732 are resident in the memory of receiving terminal 240. Furthermore, duplicate voucher 732 includes a pointer to primary content 722, and a reference, in the narrow element, to itself that allows duplicate voucher 732 to create a duplicate of itself.

The protocol for a personalized give covers the case when a regeneration of a voucher is necessary such as changing the protection, removing personal information in an admin or transaction, and updating individual constraints. A "give" intent require attention to the remaining rights because the receiver must not receive more rights than there are remaining on the giver's terminal.

The client knows when a voucher regeneration is required if it is to give a voucher to a target and his own voucher is personalized, or if the usage rights defined by the narrow attribute indicate that the voucher is personalized for himself rather than the intended receiver.

The client sends a copy of his voucher to the voucher server using an HTTP POST operation. The voucher server recognizes the give intent semantics by the header "x-mrv-giveVoucherSend" with the parameter "req". The voucher server responds with a "given voucher reference" when the giving entity receives this reference he has logically performed the give operation, and lost usage rights. The given voucher reference is a voucher that includes the administrative information, that includes the reference index, and no rights to the asset. The response message includes the header "x-mrv-giveVoucherSend" with the parameter "resp".

The reference index is formatted as a parameter to the administrative URI. The format of this parameter is up to the voucher server. The mechanism to transport the "given voucher reference" can be done by any peer-to-peer transport mechanism that both entities are known to support and should be identified in the header with a "x-mrv-voucherIndex" element.

The target client receives the reference voucher, potentially in combination with the asset, and contacts the voucher server defined by the administrative element, and the parameters that identify the particular voucher. The voucher server recognizes the give semantics by the unique administrative URI that is used by the client. The voucher server responds with a new personalized or protected voucher.

The giving entity does not at any point know the identity of the receiving device. This makes the "give" process lightweight, and even anonymous between the two parties of the transaction, with only reasonable compromise to security. The giving entity does only need to know the "messaging address" of the intended give receiver.

The "give" mechanism and the transactions between clients and voucher server are fully automatic. User interactions should not be inserted in the client-server interaction. The mechanism above can be described as "I want to give this content to someone to whom I will give the index created by the voucher server".

Distribution by giving the content is accomplished by a digital voucher stored at a user's node in the network. The user's node is the distributing terminal and can include the user's mobile or wireless device. For example, the digital voucher can authorize the distributing terminal to cause the giving of a preview copy of a digital asset to a receiving terminal. The digital asset may be located in the distributing terminal or elsewhere in the network. The user invokes a give operation in the distributing terminal, to send a copy of a secondary voucher specifying the preview rights, to a voucher server. The voucher server recognizes the give operation and responds with a reference voucher that includes an indication of no rights to the primary content. The distributing terminal receives the reference voucher from the voucher server. The distributing terminal then sends the reference voucher to the receiving terminal. The receiving terminal can then send a request to the voucher server, requesting a new secondary voucher. The new secondary voucher confers the same preview rights onto the receiving terminal as are available to the distributing terminal. Later, the receiving terminal can purchase a primary voucher from the voucher server, to obtain the same rights to the primary content as are possessed by the distributing terminal.

Figure 8:
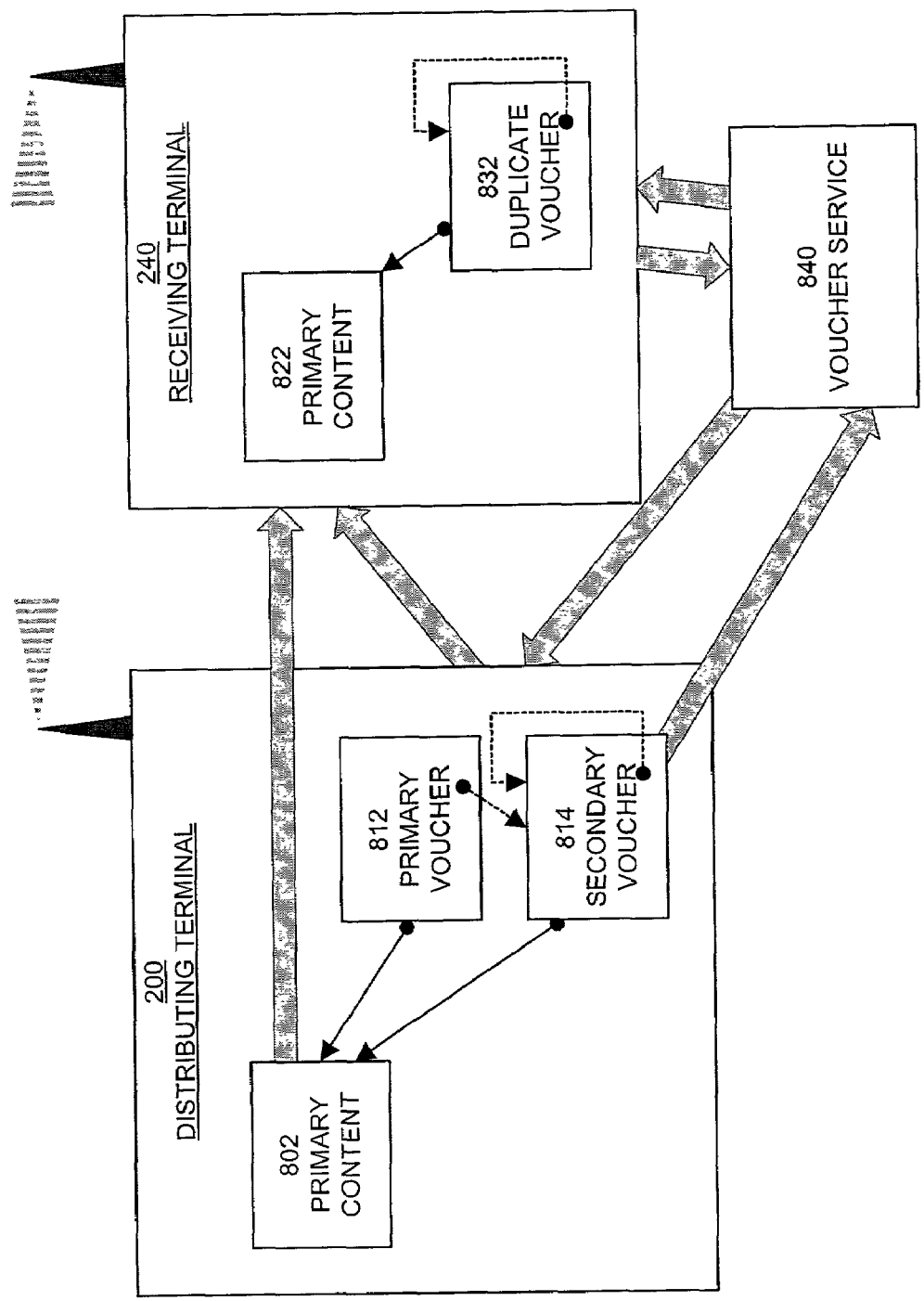
FIG. 8 is a functional block diagram that illustrates the interaction of a distribution terminal, a receiving terminal, and a voucher server in the personalized Mobile Rights Voucher give intent process for sending a preview copy of protected digital content.

FIG. 8 illustrates the protocol for the Mobile Rights Voucher personalized give process for sending a preview copy of protected digital content. In FIG. 8, a user coupled to distributing terminal 200 purchases some digital content and wants to send an unedited preview copy of the digital content to receiving terminal 240. Primary content 802, primary voucher 812, and secondary voucher 814 are resident in the memory of distributing terminal 200. Primary voucher 812 is a "full rights" voucher that allows the user to render the content as many times as necessary, but eliminates the fear of leaking rights by not allowing the duplication of the content. Primary voucher 812 includes pointers to primary content 802 and a reference, in the narrow element, to secondary voucher 814. Secondary voucher 814 is a "preview" voucher that distributes a preview or one-time copy of the content to another user. Secondary voucher 814 includes pointers to primary content 802, and a reference, in the narrow element, to itself that allows secondary voucher 814 to create a duplicate of itself.

If an application supports the Mobile Rights Voucher personalized give feature, the user can invoke a forwarding operation to copy the content to another user coupled to receiving terminal 240. When the user selects to send a preview voucher to receiving terminal 240, a copy of secondary voucher 814 is sent to voucher service 840 using the "x-mrv-giveVoucherSend" HTTP POST header. Voucher server 840 responds to distributing terminal 200 with a "given voucher reference". Distributing terminal 200 forwards the "given voucher reference" to receiving terminal 240, the target of the give operation. The asset may also be sent during this transmission with a "no-rights" voucher. At this point, distributing terminal 200 deletes primary voucher 812, leaving only secondary voucher 814, a "no rights" voucher. Receiving terminal 240 sends a message to voucher service 840 requesting the regenerated voucher on presentation of the "given voucher reference". Voucher service 840 responds to receiving terminal 240 with the regenerated voucher such that it only contains the remaining rights and the personalized information is changed for the new target.

If digital content is meant to have rights associated with it, and those rights will be delivered independent of the content and possibly after content distribution to the terminal, there is a need to express concisely that the user 'currently' has no rights to the content. Thus, the main requirement for Mobile Rights Voucher Subset A is the expression of "no-rights".

The following is an exemplary voucher that demonstrates the minimal "no-rights" voucher with an assumed asset:

```
<rights>
    <usage>
        <asset></asset>
    </usage>
</rights>
```

The above example is the minimum because the usage contains no asset declaration. This implies that this voucher is associated with the content in the same package whether a MIME multi-part or an MMS package.

The following is an exemplary voucher that demonstrates the minimal "no-rights" voucher with a declared asset:

```
<rights>
    <usage>
        <asset>
            <uid>mid:batmanlogo345684567@city.fi</uid>
        </asset>
    </usage>
</rights>
```

The above example declares the asset to allow for independent delivery of the asset and content. This voucher supports automatic content delivery and user initiate content request.

The following is an exemplary voucher that demonstrates a "no-rights" voucher with a declared asset and an administrative identifier:

```
<rights>
    <admin>
        <uid>http://www.media-sampo.com/</uid>
    </admin>
    <usage>
        <asset>
            <uid>mid:batmanlogo345684567@city.fi</uid>
        </asset>
    </usage>
</rights>
```

The above example declares the asset to allow for independent delivery of the asset and content. This voucher supports automatic content delivery and user initiate content request. The addition of the "admin" tag enables the user to contact the voucher service or a retail service to buy a voucher with rights for the specified content.

The Mobile Rights Voucher Subset B requirements are to support content preview, content save, and simple forwarding enabled or disabled. The content types that Mobile Rights Voucher Subset B supports include ringing tones, operator logos and command line interface (CLI) graphics, screen savers, and Java applications.

The following is an exemplary voucher that demonstrates the independent content preview capability with forwarding disabled (i.e., no copy intent):

```
<rights>
    <usage>
        <asset></asset>
        <display>
            <constrain>
                <count>1</count>
            </constrain>
        </display>
    </usage>
</rights>
```

Since the usage tag in the above example does not contain an asset declaration, it has an implicit reference relationship with the content object. The asset is visual because the intent is to display. The intent is further constrained to display the content only one time. This means it is a preview and one may not want it saved on the device, but note that even if the content is saved the count will be used up after one. When the usage count decreases to zero, it is safe to leave the content in the device because the preview voucher will indicate that no usage rights exist for the preview voucher. Finally, as there is no copy clause in the voucher the asset is forwarding disabled. This happened by default when copy elements are not present.

The following is an exemplary voucher that demonstrates the independent content preview capability with forwarding enabled (i.e., a copy intent):

```
<rights>
    <usage>
        <asset></asset>
        <display>
            <constrain><count>1</count></constrain>
        </display>
        <copy></copy>      <!- this will enable forwarding -->
    </usage>
</rights>
```

The above example is similar to the previous example with the addition that the implicit reference to the asset and the implicit voucher itself can be copied for distribution (i.e., forwarding is enabled).

The following is an exemplary voucher that demonstrates the independent content save or full rendering rights capability and including forwarding disabled (i.e., no copy intent):

```
<rights>
    <usage>
        <asset></asset>
        <display></display>
    </usage>
</rights>
```

Since the usage tag in the above example does not contain an asset declaration, the voucher is associated with the content in the same package whether a MIME multi-part, a MMS or a generic XML package. The asset is visual because the intent is to display. Since the intent is not constrained, the content can be saved to the terminal as there are remaining rights and the content is likely to be used repeatedly.

The following is an exemplary voucher that demonstrates the voucher when it is embedded into a generic XML package:

```
<Generic XML Container>
    <Version>1.0</Version>
    <Content>
        <Meta>
            <rights>
                <usage xmlns="MRVsubsetb1.0">
                    <asset></asset>
                    <display></display>
                </usage>
            </rights>
        </Meta>
        <Type>vnd.nok.screensaver</Type>
        <Format>b64</Format>
        <Data>
            <!--Base64 encoded content information--
            --Base64 encoded content information--
            --Base64 encoded content information--
            --Base64 encoded content information--
            --Base64 encoded content information--
            --Base64 encoded content information-->
        </Data>
    </Content>
</Generic XML Container>
```

In the above example, the full display rights are embedded into a Smart Content Object package and associated with the content element of the parent of the Smart Content Object. The voucher is very small.

The following is an exemplary voucher that demonstrates the voucher when it is embedded into a MIME multi-part package:

```
MIME-Version: 1.0
Content-type: multipart/mixed; boundary="simple boundary"
--simple boundary
Content-type: text/MRV;
    <rights>
        <usage>
            <asset>mid:1@a.b</asset>
            <display></display>
        </usage>
    </rights>
--simple boundary
Content-type: vnd.nok.screensaver; Content-transfer-encoding: base64
Message-ID: <1@a.b>
    --base64 encoded content information
    --base64 encoded content information
    --base64 encoded content information
    --base64 encoded content information
    --base64 encoded content information
--simple boundary--
```

In the above example, the full display rights are embedded into a MIME multi-part package and associated with the content element of the parent voucher. Thus, the voucher is very small.

Figure 9:
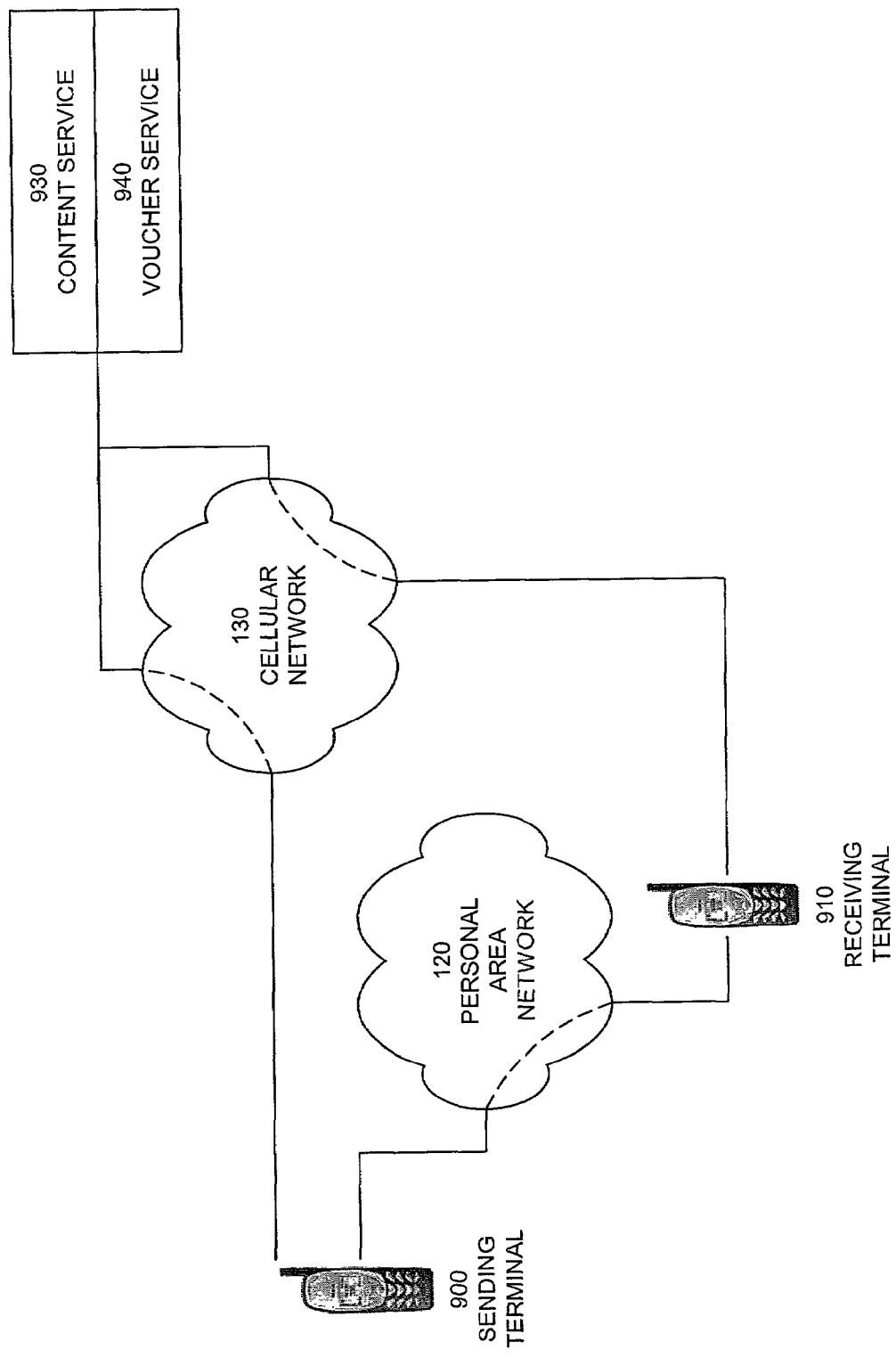
FIG. 9 is a functional block diagram that depicts a network environment for distributing a Mobile Rights Voucher by illustrating a use case scenario in which a sending terminal accesses a content service and a voucher service via a cellular network to purchase two screen savers.

FIG. 9 depicts a network environment for distributing a Mobile Rights Voucher that presents voucher related issues and example vouchers. In the use case scenario shown in FIG. 9, a sending user (not shown) coupled to sending terminal 900 accesses content service 930 and voucher service 940 via cellular network 130 to purchase two screen savers. Since the sending user is happy with the purchase, sending terminal 900 forwards a preview copy of the screen savers to receiving terminal 910 via personal area network 120. A receiving user (not shown) views the preview copy of the screen savers to evaluate the screen savers. If the receiving user is happy with the screen savers, receiving terminal 910 can purchase a full-right version of the screen savers from content service 930 and voucher service 940 via cellular network 130.

In the first step in the use case scenario, when sending terminal 900 purchases two screen savers, his terminal receives an MMS message that contains two assets, one for each screen saver. The MMS message also contains a full rights voucher and a preview voucher. The full-right voucher is personalized for sending terminal 900 and supports forwarding a preview copy to another user for a limited period of time. The preview voucher allows a one-time preview of the assets and supports forwarding of the preview voucher to another user for a limited period of time and contains a reference to a service where another user can purchase a full voucher.

An exemplary full voucher for sending terminal 900 may appear as follows:

```xml
<?xml version="1.0" encoding="UTF-8"?>
<!DOCTYPE rights SYSTEM "C:\MRV1.0-subsetC.dtd">
<rights xmlns:xlink="MRV1.0.3" xmlns="MRV1.0.3">
    <version>1.0.3</version>
    <admin>
       <uid>http://www.media-sampo.com/ScreenSaverService</uid>
    </admin>
    <transaction>TID:3457345987-6789-9</transaction>
    <usage>
       <asset>
          <uid>mid:tropicalsunset.345658347@digitalshop.com</uid>
          <!--<protection>content protection would go here</protection>-->
       </asset>
       <asset>
          <uid>mid:underwaterdivert.345658347@digitalshop.com</uid>
          <!--<protection>content protection would go here</protection>-->
       </asset>
       <display></display>
       <copy>
          <constrain>
             <datetime>
                <end>20010830</end>
             </datetime>
          </constrain>
          <narrow>
             <uid>mid:previewvoucher.343453344@digitalshop.com</uid>
          </narrow>
       </copy>
       <constrain>
          <individual><uid>IMEI:123456789123459</uid></individual>
       </constrain>
    </usage>
    <!--<protection>The integrity would go here</protection>-->
</rights>
```

In the exemplary full voucher shown above, the "admin" element points to the service where the voucher was purchased. Some personal transaction information is delivered for sending terminal 900. Assets are declared. There is a full rights voucher for display of the screen savers. There is a time limited copy intent that can copy the content and only the preview voucher. Finally, the individual constraint at the usage level locks this voucher to the sending terminal 900 terminal for all intents, therefore, it is not necessary to declare it multiple times.

The preview voucher for sending terminal 900 would appear as follows:

```xml
<?xml version="1.0" encoding="UTF-8"?>
<!DOCTYPE rights SYSTEM "C:\MRV1.0-subsetC.dtd">
<rights xmlns:xlink="MRV1.0.3" xmlns="MRV1.0.3">
    <version>1.0.3</version>
    <admin><uid>http://www.media-sampo.com/ScreenSaverService
    </uid></admin>
    <usage>
       <asset>
          <uid>mid:tropicalsunset.345658347@digitalshop.com</uid>
          <!--<protection>content protection would go here</protection>-->
       </asset>
       <asset>
          <uid>mid:underwaterdivert.345658347@digitalshop.com</uid>
          <!--<protection>content protection would go here</protection>-->
       </asset>
       <display>
          <constrain>
             <count>1</count>
          </constrain>
       </display>
       <copy>
          <constrain>
             <datetime>
                <end>20010830</end>
             </datetime>
          </constrain>
          <narrow>
             <uid>mid:previewvoucher.343453344@digitalshop.com</uid>
          </narrow>
       </copy>
    </usage>
    <!--<protection>The integrity would go here</protection>-->
</rights>
```

Note that the above preview voucher does not contain any transaction information, the preview is not locked to any terminal by use of individual, the preview is limited to a single viewing, and the voucher allows itself to be forwarded for a limited period of time.

In the second step in the use case scenario, when sending terminal 900 forwards a preview voucher to receiving terminal 910, receiving terminal 910 receives an MMS message that contains two assets, one for each screen saver. The MMS message also contains a preview voucher that allows a one-time preview of the assets and supports forwarding of the preview voucher to another user for a limited period of time and contains a reference to a service where another user can purchase a full voucher.

The preview voucher for receiving terminal 910 is the same as the preview voucher for sending terminal 900. Receiving terminal 910 can preview the screen savers with the preview voucher. Receiving terminal 910 will preview the screen savers and decide if he wants to purchase his own full rights copy of the screen savers. If he decides to purchase the screen savers he would select this option on his terminal. The preview contains a reference in the "admin" tag to a Voucher Service that retains a full right voucher that receiving terminal 910 can purchase. As a response to the request to purchase a full rights voucher, receiving terminal 910 will receive the following voucher that will give him the same rights as sending terminal 900.

```xml
<?xml version="1.0" encoding="UTF-8"?>
<!DOCTYPE rights SYSTEM "C:\MRV1.0-subsetC.dtd">
<rights xmlns:xlink="MRV1.0.3" xmlns="MRV1.0.3">
    <version>1.0.3</version>
    <admin>
       <uid>http://www.media-sampo.com/ScreenSaverService</uid>
    </admin>
    <transaction>TID:3647589987-5677-9</transaction>
    <usage>
       <asset>
          <uid>mid:tropicalsunset.345658347@digitalshop.com</uid>
          <!--<protection>content protection would go here</protection>-->
       </asset>
       <asset>
          <uid>mid:underwaterdivert.345658347@digitalshop.com</uid>
          <!--<protection>content protection would go here</protection>-->
       </asset>
       <display></display>
       <copy>
          <constrain>
             <datetime>
                <end>20010830</end>
             </datetime>
          </constrain>
          <narrow>
             <uid>mid:previewvoucher.343453344@digitalshop.com</uid>
          </narrow>
```

-continued

```
    </copy>
    <constrain>
        <individual>
            <uid>IMEI:343586722223454</uid>
        </individual>
    </constrain>
</usage>
<!--<protection>The integrity would go here</protection>-->
</rights>
```

In the third and final step in the use case scenario, when receiving terminal 910 decides to purchase a full-rights version of the screen savers, receiving terminal 910 receives an MMS message that contains two assets, one for each screen saver. The MMS message also contains a preview voucher that allows a one-time preview of the assets and supports forwarding of the preview voucher to another user for a limited period of time and contains a reference to a service where another user can purchase a full voucher.

Another embodiment of the Mobile Rights Voucher maps the Mobile Rights Voucher DTD into a single Wireless Application Protocol (WAP) Binary XML (WBXML) code space. WBXML is a binary representation of XML that is designed to reduce the transmission size of XML documents and allows more effective use of XML data on narrowband communication channels. The Mobile Rights Voucher DTD is assigned the WBXML document public identifier associated with the Formal Public Identifier (FPI) such as "-//NOKIA//DTD Mobile Rights Voucher 1.0//EN". The Mobile Rights Voucher format DTD is mapped into tokens from a single code page, "00", associated with the FPI "-//NOKIA//DTD Mobile Rights Voucher 1.0//EN". The following WBXML token codes represent elements (i.e., tags) from the code page x00 (zero) of the Mobile Rights Voucher DTD. The WBXML encoding of the XML elements is shown in Table 1.

TABLE 1

| XML Type Name | WBXML Tag Token (Hexadecimal Value) |
| --- | --- |
| Rights | 05 |
| Version | 06 |
| Admin | 07 |
| Uid | 08 |
| Transaction | 09 |
| Protection | 0A |
| Usage | 0B |
| Asset | 0C |
| Rightsholder | 0D |
| Print | 0E |
| Display | 0F |
| Play | 10 |
| Execute | 11 |
| Copy | 12 |
| Give | 13 |
| Narrow | 14 |
| Constrain | 15 |
| Count | 16 |
| Start | 17 |
| End | 18 |
| Datetime | 19 |
| Individual | 1A |

Using Independent Clearinghouses for Monitoring Digital Rights Transfer Transactions An important aspect of digital rights management is the design of mechanisms that can enable various types of revenue sharing among the players involved (e.g., publishers, resellers, etc.). This invention proposes a flexible and scalable mechanism.

New copies of digital content can be created effortlessly. This enables large-scale distribution and super-distribution of the content. To share revenue effectively, the creation of new copies needs to be accurately monitored. Typically, a clearinghouse monitors the copies and may be tightly integrated with the DRM system (e.g., a single global clearinghouse, or a single network of clearinghouses).

The described scheme for reporting new copies is extremely flexible. In the most general case, this scheme allows anyone to run a clearinghouse. The device manufacturer may also choose to limit the clearinghouse functionality only to clearinghouses certified (directly or indirectly) by the manufacturer. Our scheme also specifies the clearinghouse on a per-content basis (rather than assuming a single global clearinghouse, or a single clearinghouse network). This allows several independent clearinghouse networks to exist in parallel. Further, the method provides for dormant rights.

We assume that the rights for a copy of some content are encoded in a voucher in such a way that only the intended compliant device will be able to use that copy. This does not prevent the device from giving away its rights to another device, by creating a new voucher and deleting its own. A voucher contains information about the clearinghouse responsible for that content and may include the name of the clearinghouse, its public signature verification key, and a network address (e.g., URL) where the creation of new copies of this content can be reported. The voucher also specifies whether the device importing the voucher needs to report the existence of the copy to the clearinghouse.

When a voucher is imported to a compliant device, the device will perform the following checks:

1. Whether this copy should be reported?
2. If the copy should be reported, does the device have a way of reporting to the clearinghouse specified by the voucher? If not, mark the voucher as disabled in this device.
3. If the copy does not need to be report, import the voucher and mark it as enabled in this device, subject to any other restrictions.
4. After the copy is reported, the voucher will be marked as reported, so that it need not be reported again.

When a compliant device makes a new copy for another device (e.g., during super-distribution), it may either report the copy to the clearinghouse by itself, or set a flag in the new voucher so that the receiving device will report it. Note that if the receiving device cannot report the copy, the voucher will be marked as disabled in that device. But the receiving device may still either give the right away, or make new copies for other devices. Effectively, this allows devices to act as a vector that carries a dormant right. Super-distribution of receiver-reported copies is even allowed when the super-distributor does not have the right to use the content. Dormant rights will become active if and when the rights arrive at a device that can report them to the clearinghouse. This may increase the scope and speed of super-distribution, just as biological vectors increase the scope and speed of infection.

Independent mechanisms may be used to control how the reporting is to be done (e.g., on-line or off-line, whether reporting may be delayed until network connectivity is obtained, how to limit use while report is pending etc.). These independent mechanisms require the registration of devices with one or more clearinghouses. But the devices could still import and use vouchers referring to other clearinghouses if the device can find a suitable trust chain (starting from the clearinghouses mentioned in the voucher and ending in a clearinghouse with which the device is registered). If not, step 2 above will fail.

A manufacturer may configure its devices so that it will only agree to report to clearinghouses that are certified by the manufacturer. In this case, when a voucher is imported, the device will check whether a manufacturer (directly or indirectly) certifies the specified clearinghouse. If not, step 2 above will fail. Certifying clearinghouses may allow the manufacturer to charge the certified clearinghouses. But technically, such a certificate is not necessary. A compliant device may enforce vouchers for any clearinghouse. This may enable widespread grass-roots level publishing of content.

Charging-Independent Method for Containing Off-Line Super-Distribution of Material with a Monetary Value in a DRM Environment One of the bigger hindrances of off-line (ad-hoc) super-distribution is the collection of rights and other charges. This invention formulates a method for partially guaranteeing that all players in a DRM transaction eventually get their dues. The solution has been developed with a mobile music player in mind, but applies as well to any kind of digital content in a DRM scheme.

DRM infrastructures generally enforce protected distribution and presentation of digital content so that digital rights can be protected and necessary charges collected for the rights owners. Payment or charging solutions, with the exception of some electronic payment solutions, normally require network interaction with a charging server of some sort. In an ideal DRM model, users should be able to spread or move content between themselves in various manners defined by the rights associated with the content. One model allows content distribution to be charged for between users outside of network coverage (only peer-to-peer connection between users). This model usually either assumes the existence of a payment scheme that is integrated with the DRM or that the selling user has purchased additional rights in the first place that he then can sell forward in the off-line case. Related problems usually involve currency conversions, taxation requirements and distribution of monetary value to all involved partners in the distribution chain.

Previously, this problem was solved by:
1. Enforcing a network connection through a ubiquitous network connection (e.g. distribute content over infrared);
2. Including a payment scheme in the DRM infrastructure; and
3. Requiring the purchasing user to purchase "additional" rights in advance, in the form of a "season ticket" or equivalent.

This solution is:
1. Independent of the payment or charging mechanism; and
2. Makes ad-hoc or "spur of the moment" distribution of content available while still restricting the monetary risk for the involved rights owners.

Thus, the problem involves how to support off-line super-distribution, that is, if you give me a copy, so that the recipient can use the content right away without having to contact some voucher server. One solution is to rely on tamper-resistance and delayed reporting. Another solution is to use "season tickets". Each user registers with a clearinghouse and receives a certificate of his signing key. This certificate is the "season ticket" (it may be valid for a short time, and will have limits on the number of transactions it can perform). For user A to super-distribute a copy of the season ticket to user B, user B gives user A a signed statement for the amount. User A can verify this signature against the certificate or season ticket issued to user B by the clearinghouse. When user B receives the voucher, he can use the content immediately. All of these steps happen off-line. The next time user A is on-line, user A can submit the signed statement to the clearinghouse. The clearinghouse can then either bill user B or deduct the amount from a pre-paid account. The clearinghouse can also give user A credit for the sale (e.g., a payback, bonus, or loyalty points) as an incentive to report the signature. The "season ticket" scenario does not require tamper-resistance for payments and will work is only one party is honest. The risk of dishonesty or collusion by both parties is slight and can be mitigated by integrating tamper-resistance as a second-line of defense.

Most users behave more or less rationally. In this scheme we let the users or devices acquire a certain amount of debt (unrelated to any charging/payment mechanism) off-line, and tie this debt to the DRM device. The debt is tied based on the rule that the total value of the debt that can be run up by a device is limited by the number of debt-increasing transactions so that the total amount of debt will always be significantly less than the perceived value of the device. So the user of the device is motivated to clear the debt of the device the next time when he is connected to the network by the fact that he again has the "whole spending limit" to use in upcoming off-line situations.

Off-line transactions that can increase the debt of device come in two forms. First, user A sells content to user B and collects money immediately. In this case the debt will be tied to the device associated with user A. No debt is tied to the buying user. Second, user A "sells or distributes" content to user B and the buyer "promises" to pay later (when he comes into network coverage again). In this case the debt will be tied to the device associated with user B. No debt is tied to the selling user.

Since we want, at least in one case, to keep the system unrelated to monetary complications like currency conversions, the debt is limited to the number of debt-increasing trasactions rather than the actual monetary value involved. This can be included as a separate "counter" with the additional overhead of handling currencies.

This system should be suitable for all involved partners. System users will get the additional freedom of (to a certain degree) distributing content among themselves, and the rights owners will (eventually) get additional revenue streams from the super-distribution.

The described system combines the generation of sample playback copies and the purchase status of a certain content copy. This means that when a copy of the content is purchased, a certain number of distributable preview copies are "included in the price". These may be given out or super-distributed to friends, who in this scheme can receive a copy from the owner of the content and playback the content one time. If a content is resold (B1 or B2 scheme), the newly generated copy will have the full number of preview copies included whereas the copy count of the original may or may not be upgraded to the full amount after a resell.

This invention describes and strives to protect a method for limited super-distribution that can benefit a system that incorporates the method. A more detailed description of the protocols and security features involved (which are not relevant to the idea itself) can be found in the TranSec protocol descriptions.

Controlling the Downloading of Content in Digital Rights Management Systems

Most of the Digital Rights Management (DRM) work so far has focused on PCs or other special-purpose devices as the client terminals. DRM for a portable device is of particular interest to the mobile computing environment. An inherent limitation of a portable device is lack of storage or memory.

Due to the lack of storage on portable devices, a user cannot keep copies of all the content for which he bought rights. He should be able to pay for the content once, use it, delete it to use the storage space for some other purpose, but later download the same content without having to pay again.

One approach is to assume that all copies of a given piece of content are encrypted with the same key and that the encrypted content is freely available for downloading from public sources (e.g., public web-sites). This approach is implied (although not explicitly stated), e.g., by the EBX E-book specifications.

Content files may be large. If anyone is allowed to freely download the content files from public servers, an attacker may be able to overwhelm the server by issuing bogus requests.

This will prevent legitimate users from downloading content.

This bandwidth exhaustion problem is especially severe in public access wireless networks (e.g., a kiosk serving content via Wireless LAN in a public hotspot).

This invention introduces methods to control access to encrypted content files so that such a denial-of-service attack is difficult to mount. In one embodiment, the invention also allows the possibility of metering downloads.

Allowing anyone to download encrypted content may be undesirable, for example, during peak hours. This requires a way to perform controlled content transfers. One solution is to charge for content downloads. Another solution is to require that the receiving device prove its knowledge of the content encryption key by constructing a download token in the form of a Message Authentication Code (MAC). A third solution is to issue a download certificate that certifies the receiving device at the time of rights transfer and is useful to construct a download ticket later.

Figure 10:
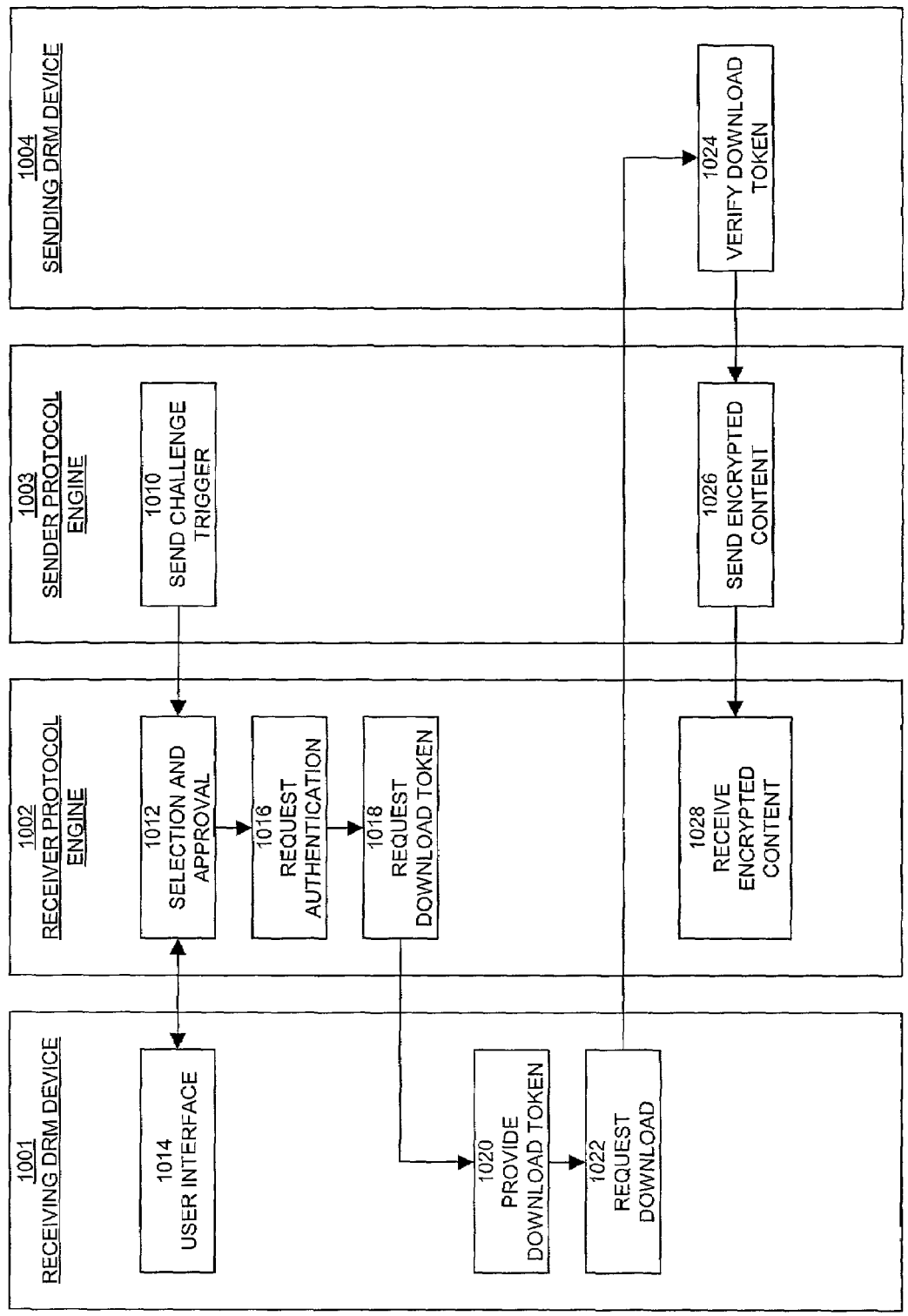
FIG. 10 is a network process diagram illustrating the basic controlled download protocol between a receiving DRM device, the receiver protocol engine, the sender protocol engine, and the sending DRM device.

Regardless of how the download token is constructed, the basic controlled download protocol is as shown in FIG. 10. Sender_challenge is a random challenge sent by the sender (e.g., content server). If a MAC is used, the Download_Token is derived by the function:

"MAC(K, sender_challenge|CID)"

where MAC is a suitable MAC function (e.g., HMAC-SHA1), CID is a unique identifier for the content and K is the universal encryption key used for CID. The function createDownloadToken( ) takes CID as input and produces the Download_Token as output. A device will be able to do this only if K is known, that is, it has the rights for CID. The function verifyDownloadToken( ) takes CID and the Download token and computes the MAC and compares it with the Download_token.

If Signatures are used, a Download_Certificate is issued to the device at the time the right for CID is acquired for the device. This certificate is issued by the entity that grants the rights. For example, a public kiosk K could issue the Download_Certificate of the form:

$Sig(S_K, V_D|CID| \ldots \text{other info} \ldots)$ where $S_K$ is the signature key of the kiosk (with corresponding verification key $V_K$), $V_D$ is the signature verification key of the device (with corresponding signing key $S_D$). "Other info" may include limitations like an expiry date. The certificate asserts that the owner of $V_D$ has purchased the rights for CID and is eligible for downloading the actual content. The Download_Ticket is of the form:

$Sig(S_D, \text{sender\_challenge, CID})), \text{Download\_Certificate}$

Any download server that knows the public key VK can verify the Download_Certificate, and then the signature, and hence limit download requests.

The features of the MAC-based approach are:
1. It is simple; and
2. Since the content key is universal, a requestor will be able to produce a Download_Token that can be verified by any server for that encrypted content. However, a server may want to distribute the content to someone who got the rights from a different server (or a server in a different domain). This could be achieved by server-specific (or domain-specific) content keys rather than global content keys.

The advantages of the Signature based scheme are:
1. It is flexible in that additional constraints (such as an expiry date for free downloads) may be encoded in the Download Certificate; and
2. Since signatures cannot be forged, the download tokens can serve as a way to accurately measure the number of downloads for a given content. For example, advertisers are interested in obtaining metering information that is not forged.

Methods to generate and evaluate message authentication codes to insure the integrity of data are described in the book by Stephen Thomas entitled SSL and TLS, published by John Wiley and Sons, 2000. The RSA Message Digest (MD5) and the Secure Hash Algorithm (SHA) are two example algorithms for message authentication that are described in the book by Stephen Thomas. Another reference that goes into greater detail in its discussion of data integrity methods is the book by Bruce Schneier entitled *Applied Cryptography—2nd Edition* published by John Wiley and Sons, 1996. Methods to generate and evaluate digital signatures to insure the source of the digital program are described in the book by Richard E. Smith entitled *Internet Cryptography*, published by Addison Wesley, 1997. To insure that the source of the data cannot be repudiated, a digital signature can be appended to the data, as described in the book by Richard E. Smith.

Lending Rights to DRM Protected Content

The content is transferred from one consumer to another by means of portable media such as compact disk or floppy disk. Prior to transferring the content, the sender opens a transaction with a clearinghouse and informs it about the transfer of rights. The sender opens the existing license and then encrypts it with the receiver's public key. The receiver can then use the loaned content based on the business rules in the license. The content is returned to the original sender in the same way as it was sent in the first place.

Another way to transfer content is to send a reference to the receiving consumer, which indicates where to get the new license for the content. The receiving consumer then contacts the clearinghouse and receives the new license via this connection. This way the receiving consumer does not need to send it's public key to the sender.

When the content is DRM protected, it cannot be lent to another persons use in a traditional way because the license is tied to one device at a time.

Many different implementations are possible and feasible. The inventor suggests that the best implementation for GSM mobile terminals could be SMS communication between the terminal and the clearinghouse.

Flexible Content Binding Scheme

To prevent the widespread infringement of the copyright of digital content such as movies, music, or electronic books, different content protection and digital rights management systems have emerged. There is a common requirement for all those systems; they need to bind the content to something. There have been many arguments over whether the right thing to do is to bind the content to a piece of equipment (such as a certain PC, for instance), the media on which the content is stored (memory card or hard disk, for instance) or to the user. This invention makes this no longer an "either-or" situation by allowing content to be bound to a multitude of identities. The presence of even one of those identities will enable the usage of the content.

When a file containing a piece of content is originally purchased (e.g. downloaded from the Web), it is encrypted with a randomly chosen Content Key. The Content Key is then encrypted with a multitude of different IDs such as Device ID, Media ID and User ID. All those encrypted versions of the Content Key are then attached to the content. The content can then be freely moved around in the encrypted format. When it is time to use the content, the player software then tries the Device ID, the Media ID and the User ID as keys for decrypting the Encrypted Content Key. As long as even one of those identities matches, the correct Content Key is recovered and the content can be decrypted.

Alternatively, in an environment where it is not possible to keep the Device ID, Media ID or User ID secret, for instance because the binding is done in a remote server, the Content Key may be encrypted with a public key associated with or derived from such IDs instead of the ID itself. When the content is to be decrypted, the private keys corresponding to the Device ID, Media ID or User ID can be tried in sequence, whether they correctly decrypt the Content Key. This invention also contemplates the use of various combinations of IDs or related pairs of public keys and private keys. This is just a matter of which IDs can be used without exposing them.

The invention solves the "what to bind content to" issue by allowing content to be bound to a number of different identities. The problems with the existing binding methods that are related only to a single identity are numerous. Binding to equipment can be a problem in case the equipment breaks down or is lost for some reason, or, for instance, replaced with a later model. Binding with media does not permit backup copies, so if the media is destroyed, the content is lost. Binding with a user might be most convenient, but it often causes privacy concerns. It also prevents lending or giving the content to a friend even if it is on the original media.

In the past, there have been suggestions to use a database to group different identities together to indicate that they are all authorized to use the content. The invention disclosed herein provides a simpler solution because there is no need for a special database, and therefore no administrative overhead.

Implementation is pretty straightforward as part of a content protection or DRM solution. They usually have already solved the issue of binding content to a single ID. This invention simply takes that idea a step further by allowing binding to a multitude of different IDs.

Media IDs already exist for some memory cards and hard disks. Device IDs are typically also an existing requirement for devices that are used for DRM. They can be implemented using unique serial numbers or pseudo-unique random numbers on the system chip or related FLASH memory etc. On PCs existing IDs such as Ethernet MAC addresses can also be considered. The User ID is probably the most challenging ID to assign, as the privacy concerns remain an issue. One possibility would be to assign a non-unique (but statistically close enough to unique) random number to each user at the time for signing up for a service, for instance. This would probably alleviate those concerns because it would be impossible to positively identify the user (several users may get the same ID).

Distributed Rights Gateway System in a Mobile Environment

This invention relates to distributed rights management in the context of mobility. This invention also utilizes a distributed payment mechanism. Scenarios of right updating and super-distribution are considered. Storage of rights remotely is considered for device portability.

This invention is a model of highly distributed systems suitable for mobile environments. Rights of ownership and usage of a content for a mobile user is achieved through mutable and mobile metadata associated with content. Distributed payment nodes control the mutation of metadata. This metadata is solely responsible for decision to let the user use content. This metadata is replicated to a server near the user. If the device moves to a location closer to another server, the user's rights in the form of Metadata is transferred to this new server.

The invention aims to solve the problem of network latency in acquiring rights to use content in a mobile device. This invention also backs up rights in a server that is more reliable than a mobile device and solves the problem of super-distribution through rights portability.

Earlier solutions required generation or updating of rights for a content from a remote retail site. Since there is only one place where rights can be obtained, it is not the best solution for mobile environments keeping network latency and fault tolerance in mind.

By storing the rights in a decentralized fashion and also updating them in a decentralized fashion through appropriate payment nodes, this invention will minimize the network latency to update rights for any content. The decentralization of rights storage will help in their backup that is an important use case for mobile devices. This invention emphasizes that only the payment nodes are sufficient to update the rights. Earlier solutions do not take payments into account when updating rights.

Figure 11:
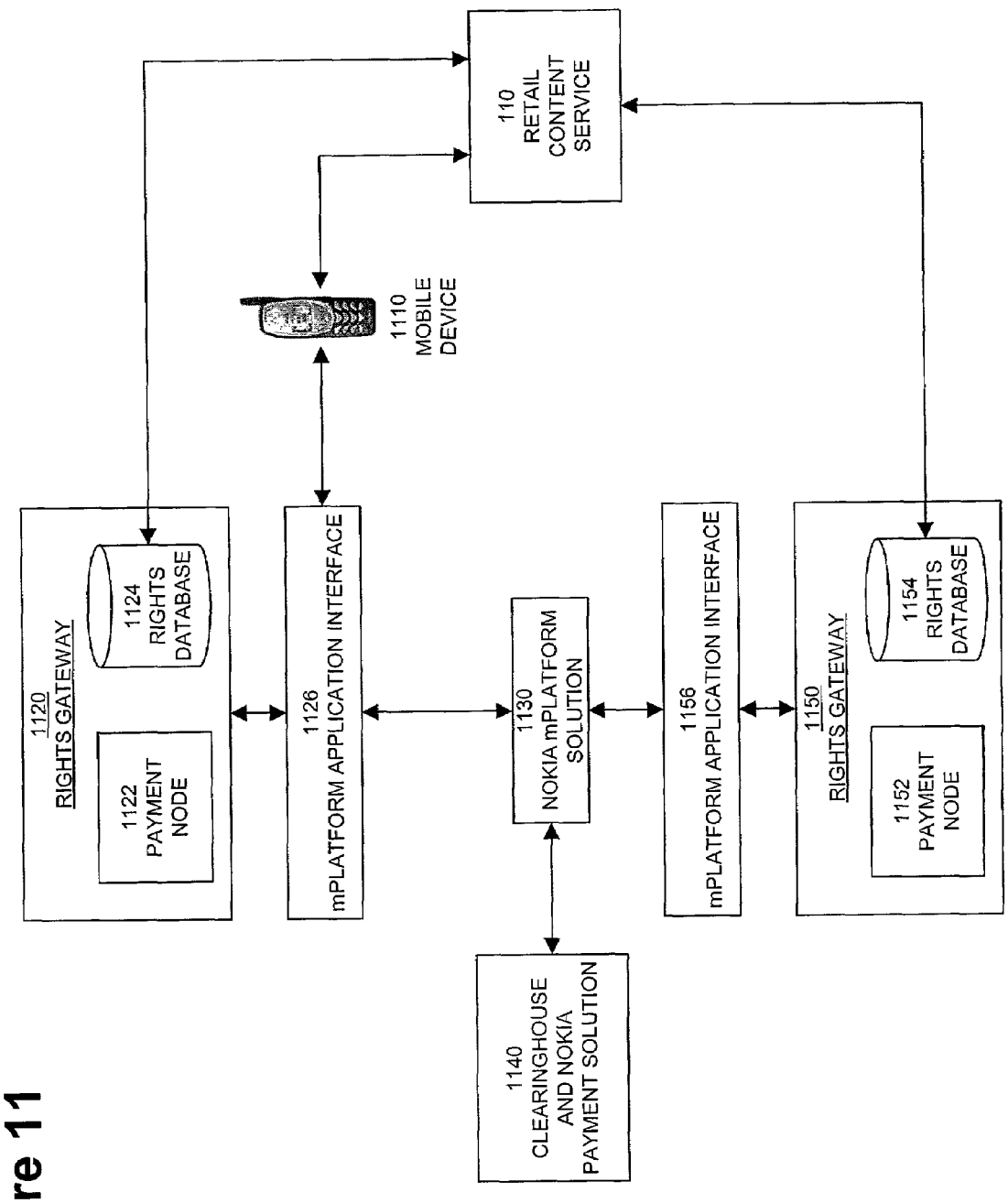
FIG. 11 is a functional block diagram illustrating the interaction of a mobile device, a rights gateway, a retail content service, and a clearinghouse in the process of the mobile device purchasing rights from the retail content service.

FIG. 11 depicts the architecture of the system and the interrelationship between the different entities within the system. A user (not shown) coupled to mobile device 1110 can purchase rights from retail content service 110 using mobile device 1110. The user would download content from the retail content service 110 through a secure channel. The content and Metadata will be downloaded to mobile device 1110. A copy of this metadata is kept in rights database 1124 associated with rights gateway 1120. When the user wants to update his rights for content, he contacts rights gateway 1120 through an agent on mobile device 1110. Rights gateway 1120 will use payment node 1122 to update the metadata associated with the digital content. The metadata is available in an encrypted form and can only be updated by rights gateway 1120 after approval by payment node 1122. The user will then download this metadata with updated rights. The user is then free to continue using the digital content. If the user wants to use the content in another device, he can transfer the content to the other device. The device that plays the digital content will look at the metadata to identify if the user has adequate rights to use the content. If the user wants to distribute the content to another user (recipient), he will transfer the metadata associated with the content to the recipient's rights gateway, rights gateway 1150. This gateway will change the fields within the metadata such that it belongs to the recipient and also contacts payment node 1152 to purchase the rights. Once the rights are purchased, the recipient is free to download content and its associated rights to his device for usage.

A rights gateway such as rights gateway 1120 can perform the following operations on the metadata:
1. Mutate the metadata to reflect changes to rights and rules associated with content and user;
2. Obtain payment authorization to change the rights portion of metadata;
3. Send the payment data capture information to clearinghouse 1140;
4. Send the authorization reversal request message to the backend payment system and change the rights associated with the metadata accordingly;
5. Handle an error returned by backend payment system;
6. Handle super-distribution by exposing a method that accepts a metadata and recipient ID, then changes the relevant field of the metadata; and
7. Interface with a terminal WIM card to authenticate a user and change the metadata to establish ownership of the content.

This invention can be best implemented using a DRM technology that provides a trusted environment for the various components of the system. It is important that all the software entities like payment nodes, rights gateway, and players are trusted. The Nokia mPlatform standard, a comprehensive answer to the challenge of setting up portals throughout national and international networks, can be used as an interoperability standard for payment nodes and rights gateway.

Voucher-Based Mobile DRM Architecture

Digital Rights Management is a technology providing mechanisms for controlling consumption of digital content. DRM is already being used to some extent in the wireline Internet domain, but there is currently no wide-spread DRM system that is used in the mobile domain. Today copy protection is done in the mobile domain with so called forward-lock method in which the terminal disables the ability to forward the piece of content (e.g. ringing-tone) to another terminal.

One of the attractive features of DRM is super-distribution, that is, the ability to forward content from peer-to-peer and still enabling that the content owner gets paid for each copy. The forward-lock method effectively kills super-distribution and thus we need to discover other DRM mechanisms. The problem with super-distribution is that once it is enabled, it is really difficult to control the bits that are distributed from peer-to-peer. That is a natural law of the digital world, bits are inherently easy to copy and modify. Cryptography is the only practical technology that can be used to control the content consumption if super-distribution is used. That means that the content is encrypted and the decryption key is delivered to those terminals that have paid to consume the content.

In other words, DRM enables the paid content model, that is, the content is paid for when it is consumed. Thus, payment is an important function in any DRM system, although it can be considered as separate to DRM.

The invention is the architectural model of the voucher server based Mobile DRM system that enables one to utilize cost-efficient mobile operator payment systems.

The novelty value of this invention comes from the utilization of the mobile payment service provisioning also to manage digital rights-related payment collection. In effect, this means mobile optimizing the DRM system. The most obvious benefits of this approach are the ability to utilize mobile network operator payment systems, related agreements, and user interaction, and minimization of the over-the-air information exchange between mobile terminal and network.

The Internet-optimized DRM systems assume that payment is done with some mechanism in the retail site but do not describe how. That may be due to the lack of effective micropayment and mini-payment methods on the Internet (as compared with operator billing in the mobile Internet). Thus, the common approach is to separate the payment to be handled as, for example, Internet credit card transaction.

We made the same error in our earlier thinking. Our original architecture was similar to the others, but after reviewing that with our mobile payment people we ended up turning the architecture upside-down. We believe that this new model has novelty value and is a practical way to implement Mobile DRM.

The following assumptions are made:
1. Voucher-based DRM model is used, where a voucher enables a terminal to access a specific piece of content;
2. Super-distribution is enabled;
3. Content can be separate from the voucher;
4. Content can be unambiguously identified (Content ID);
5. Voucher contains the content decryption key that is encrypted for each terminal separately;
6. Each terminal has a secret/private key that is specific for that device;
7. Each terminal has a DRM ID that can be used to discover the terminal's public (if asymmetric algorithms are used) or secret key (if symmetric algorithms are used);
8. Payment Service Provider model is used for handling payments;
9. The end user has configured at least one Payment Service Provider into his mobile terminal; and
10. Payment server handles the user interface during voucher acquisition.

The invention is one way to solve the generic problem that all DRM solutions try to solve, that is, to enable the paid content model where content owners get paid each and every time someone consumes their content. The voucher model with content encryption solves the copy protection part of the DRM, that is, it protects the content owner from losing revenue due to end users illegally copying and consuming the content.

The difficult problem in such a DRM system is to implement a cost-efficient payment mechanism. Digital content for the mobile domain is cheap (a few euros or less). In addition, it is likely that the end user will buy vouchers from multiple Voucher Servers (voucher retailers)—this is by design of the general voucher model. And further on, super-distribution of digital content from user to user via messaging implies that the content flows easily over, for example, operator domains implying that an end user needs to access Voucher Servers that are not located in his own operator's domain. This is in line with our intention to reward the top-quality content creators with a possibility that their content can populate the whole mobile domain. Further, the content originators can use a relatively limited number of mobile payment service providers (e.g., deals with all leading operators in a given market) to conveniently to reach almost the whole market.

This all sums up to the fact that each end user will have to pay a small amount of money to a large number of retailers throughout the world. It is not cost-efficient for those retailers to send invoices for small payments. It is also inconvenient for the end user as well.

Our invention introduces the Payment Service Provider (PSP) model into DRM. The Payment Server is run by an entity that has a close relationship with the end user such as the mobile operator. The PSP information (access point etc.) is configured into the terminal by the end user. In most likely cases the PSP will be the end user's own mobile operator—but this is not mandated in our architecture. The PSP could be any party that has a flexible billing mechanism based on a user friendly authentication mechanism. Mobile operators have access to the operator billing system that is the most convenient payment mechanism for small payments. And that can be based on user-friendly MSISDN authentication (i.e., authentication that employs the mobile identity number of the mobile device), which can be done securely in the domain of a single mobile operator (MSISDN authentication is not very secure across operator domains). Further, the ease of authentication as a part of phone signaling clearly is superior to usernames/passwords that Internet-based systems have to rely on. Even though prior art DRM systems exist, a widespread and "light-weight" mobile DRM is novel.

Our invention enables one to use operator billing for all DRM related payments by introducing the Mobile Payment Service Provider model into DRM. The Mobile Rights Voucher architecture has mobile optimizations and makes the Payment Service Provider the "user interaction agent" instead of the retail site.

The disadvantage of this solution is the fact that Mobile Payment Service Provider (mPSP) controls the user interaction with the consumer. This principle is quite mobile-usage centric and not as flexible as the Web model. However, the advantage of ease authentication and consistent user experience by the mPSP overweight this in mobile use.

Figure 12:
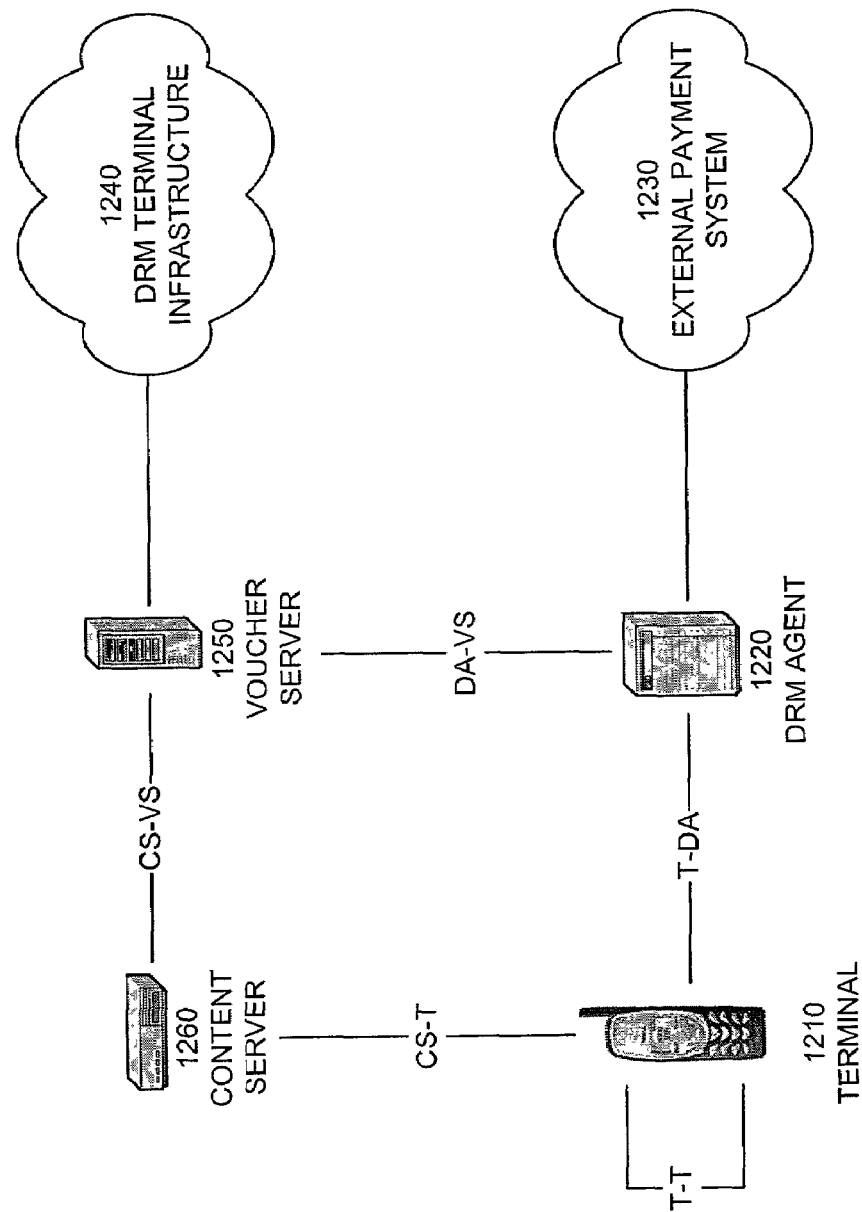
FIG. 12 is a functional block diagram illustrating the interaction of the architectural elements of the Mobile DRM system.

FIG. 12 is an illustration that shows the interaction of the architectural elements of the Mobile DRM system. The architectural elements that comprise the Mobile DRM system include content server 1260, voucher server 1250, payment server or DRM Agent 1220, and terminal 1210. Content server 1260 is a web server that is used to distribute content to end users and content pieces with a Voucher Server. Voucher server 1250 handles content registration requests from Content Servers (price, optionally content encryption key generation, optionally content ID generation) and handles also voucher generation requests from Payment Servers (receives content ID and terminal's DRM ID and generates in return a voucher for that specific terminal and piece of content). Payment server or DRM Agent 1220 handles user interface during voucher acquisition, communicates with a back-end payment mechanism (e.g. operator billing, credit card system) and requests vouchers from the Voucher Servers for end users. Terminal 1210 downloads content from Content Servers, acquires via Payment Server vouchers that enable the terminal to access content. Content may be distributed from terminal to terminal (super-distribution).

Figure 15:
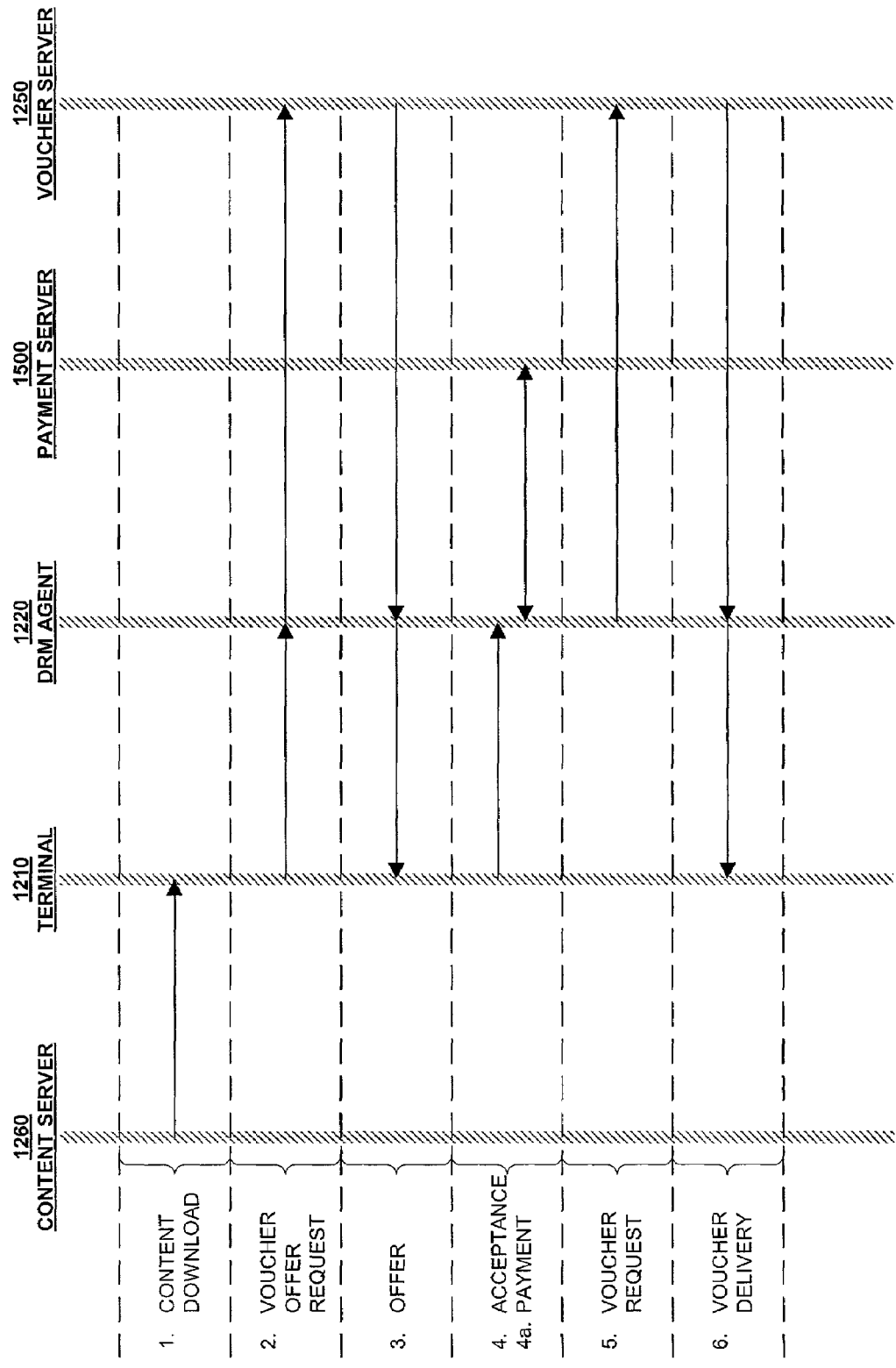
FIG. 15 is a flow diagram that demonstrates the message flows among the elements shown in FIG. 12.

FIG. 15 is a flow diagram that demonstrates the message flows among the elements shown in FIG. 12. During message flow "1. CONTENT DOWNLOAD", terminal 1210 downloads a protected content package from Content Server 1260. The content package comprises a content ID, encrypted digital content, and an address (e.g. an URL) of Voucher Server 1250 which is associated with the content. During message flow "2. VOUCHER OFFER REQUEST", terminal 1210 requests a voucher for the downloaded content through DRM Agent 1220 by giving the content ID and address (URL) of Voucher Server 1250 and a terminal DRM ID. DRM Agent 1220 forwards the request to Voucher Server 1250. Terminal ID can be wireless device ID, user ID, or other ID. During message flow "3. OFFER", Voucher Server 1250 sends an offer to Terminal 1210 through the DRM Agent 1220. During message flow "4. ACCEPTANCE", Terminal 1210 sends a message accepting the received offer. During message flow "4a. PAYMENT", DRM Agent 1220 handles the payment transaction with the Payment Server 1500. During message flow "5. VOUCHER REQUEST", DRM Agent 1220 requests Voucher Server 1250 to generate the voucher. During message flow "6. VOUCHER DELIVERY", Voucher Server 1250 delivers the voucher to Terminal 1210 via DRM Agent 1220. The voucher comprises Content ID, Content Encryption Key, transaction ID, usage rules, and usage limitations for the content.

The following discussion of content server 1260, terminal 1210, DRM agent 1220, payment server 1500, and voucher server 1250 shown in FIG. 12 and FIG. 15, as well as the relationships CS-VS, DA-VS, T-DA, CS-T, and T-T shown in FIG. 12 demonstrate the message flows shown in FIG. 15.

Content Server-Voucher Server Interface CS-VS—The Content Server (CS) registers content with the Voucher Server (VS) and passes registration information including Digital content, Price for the content, and Potentially a template for the DRM usage rules for that content (different rules may have different prices). VS prepares the digital content (generates potentially a content ID) and encapsulates it into protected DRM format (content encryption) and returns the protected content to the CS for distribution to end users. After registration process the VS is able to handle voucher requests (for that specific content) from Payment Servers.

DRM Agent-Voucher Server Interface DA-VS—The DRM Agent (DA) requests information from VS about a piece of content (identified with a content ID) that the terminal is about to purchase a voucher for. That is used to generate an offer for the end user. If the offer is accepted, DA requests VS to generate a voucher for that specific content (content ID) and for that specific terminal (terminal DRM ID).

Terminal-DRM Agent Interface T-DA—A terminal initiates a voucher acquisition transaction with the DA if the end user wants to consume unpaid content. Terminal passes information about the content (content ID, Voucher Server URL (carried with the content) to its own Payment Service Provider (PSP) that operates the DA. DA sends an offer to the Terminal and the terminal accepts or rejects it. If the offer is accepted, DA handles the payment transaction (e.g. operator billing) and requests a voucher from the VS through DA-VS interface and delivers that voucher to the terminal.

Terminal-Content Server Interface CS-T—The terminal downloads protected content from the CS.

Terminal-Terminal Interface T-T—The terminal super-distributes content to another terminal.

DRM is a technology that provides us with a promise that we are able to control the consumption of digital content. This can be accomplished with two steps:
1. Associate usage rules with digital content; and
2. Enforce that the rules are followed.

The tricky part is the rule enforcement. How to make sure that each and every entity that consumes the bits also follows the attached usage rules? How to make sure that the rules are not detached from the content? Once the bits get lost they're gone for good.

Bits are very easy to copy. And further on, every copy is perfect, as good as the original one—this is a natural law in cyberspace. If we want to make copying bits difficult, we must use technology to contradict that natural law. DRM systems include such technology.

On the other hand, the ability to control the bits and prevent them from being illegally copied is not enough. Actually the content owner wants quite the opposite, he wants to make sure that his bits get copied as much as possible—as long as he gets paid for each copy (this is called the paid content model). This results in three major requirements for the DRM system:

a) The DRM system must be able to control the consumption of content (i.e. copy protection);
b) The DRM system must enforce the paid content model (i.e. a convenient and cost-efficient payment mechanism must be supported); and
c) The DRM system must enable multiple easy content distribution mechanisms (i.e. peer-to-peer super-distribution, content distribution via browsing or downloading, service originated messaging).

Even though requirements (a) and (c) seem to conflict, they can be fulfilled if the protection mechanisms and content distribution mechanisms are orthogonal, that is, the DRM system is content transport agnostic. This implies that piggy-backing transport layer security mechanisms for content protection purposes may result in a system that severely restricts the content distribution possibilities.

Super-distribution is a great opportunity for content owners. Each piece of content has a possibility to get distributed from peer-to-peer to a large population. Whether that happens for a particular piece of content or not depends on end user's subjective perception of the quality and price of the content. People vote with their forward-buttons. We want to encourage these kind of dynamics that reward content owners with great content.

The main operative functions of the DRM system are:
1. Content registration to the DRM system;
2. Content distribution to end users (from network to terminal and terminal to terminal);
3. Voucher acquisition process that enables the end user to consume the content. This includes the payment process; and
4. Money settlement process during which each value chain participant gets his share of the money collected from the end user.

Figure 13:
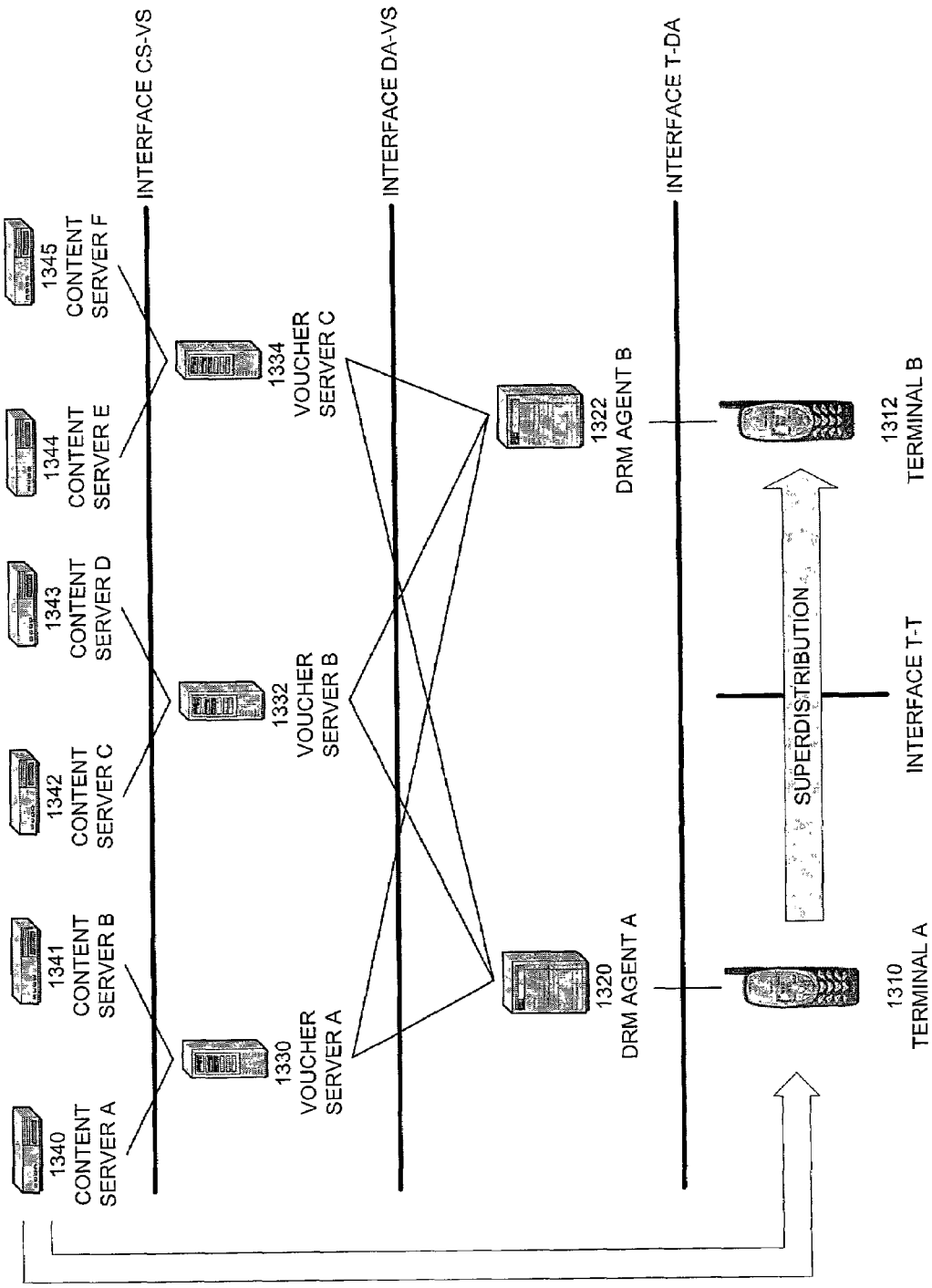
FIG. 13 is a functional block diagram that expands upon the architecture shown in FIG. 12 to illustrate the interaction of a more complex Mobile DRM system to illustrate the relationships between the participating entities.
Figure 14:
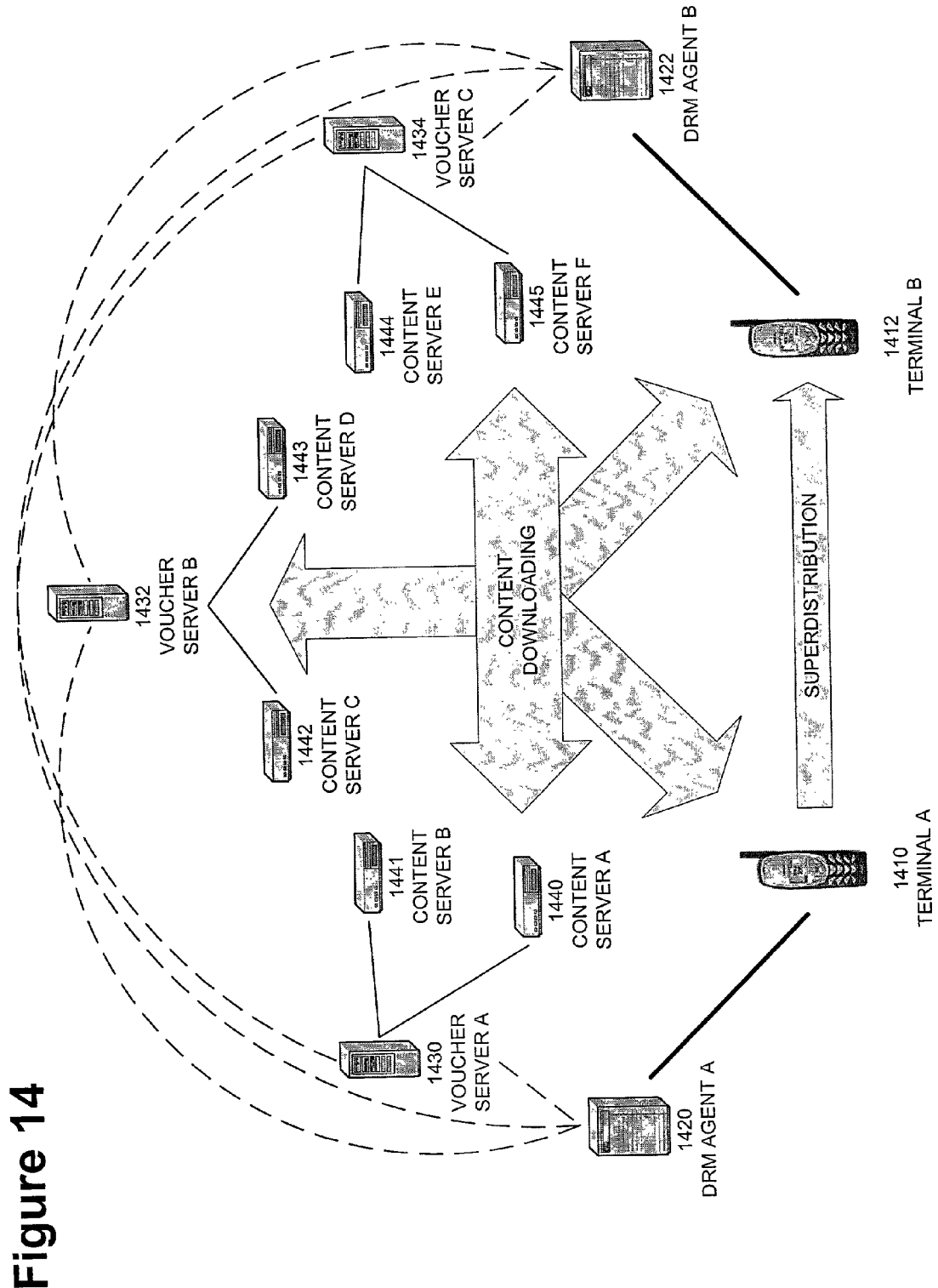
FIG. 14 is a functional block diagram that expands upon the architecture shown in FIG. 12 to illustrate the interaction of a more complex Mobile DRM system to illustrate the relationships between the participating entities.

FIGS. 13 and 14 expand upon the architecture shown in FIG. 12 to illustrate the interaction of a more complex Mobile DRM system to illustrate the relationships between the participating entities.

Content registration is done between a Content Server and a Voucher Server.

Content needs to be registered into the DRM system before it can be distributed to end users. During this registration the content is packaged into a DRM capsule that forces terminals to acquire a voucher before they are able to consume the content. Usually this includes content encryption. Only after registration the content (DRM packaged version of it) may be distributed to end users.

After content registration has taken place, the following shall apply (note: some things may already apply before registration). The piece of content has a unique ID (Content ID, CID). The Content ID needs to be associated with the content. In addition of being a unique identifier it is anticipated that in most cases the Content ID also points to the actual content object in the Content Server (URL). There is a specific Voucher Server that assumes responsibility for issuing vouchers for that specific piece of content. The URI pointing to the Voucher Server is associated with the content and travels with the content to terminals. Mechanisms for this are specified in (XHTML <object> element parameter "accessRights) and (<admin> element in the voucher meta data). The specific Voucher Server has sufficient information for issuing vouchers. This includes Content ID, Content Encryption Key, voucher templates with business rules, pricing information related to each voucher template. The Content Server has sufficient information to distribute the content. This includes the DRM protected version of the content.

Content registration happens in most cases only once per a piece of content. Re-registration may include Content Encryption Key refreshing (implies repackaging), pricing modifications, adding new voucher templates etc.

There are two models to register content, Voucher Server centric and Content Server centric. Both models are functionally equal but differ in the task division between the two entities.

In this registration model the Voucher Server is responsible for almost all of the DRM related issues. For example, Content Encryption Key generation and storage and packaging the content into the DRM capsule.

Content Server does not need to bother about DRM details, it only decides the prices for voucher templates and sends the plain content to the Voucher Server.

From security point of view this model has the advantage that the Content Encryption Key leaves the Voucher Server only inside a protected voucher. The Content Server does not need to know the Content Encryption Key.

Registering the same piece of content with two Voucher Servers results in two different DRM packaged versions of the same content. This may not be desirable.

In this model the Content Server handles the DRM specific details and packages the content into the DRM capsule. Content Server informs the Voucher Server only about the absolutely necessary details it needs to know in order to issue vouchers.

This model supports scenarios where the same piece of content is registered with multiple Voucher Servers and still there is only one DRM packaged version, however, this also depends on the security model.

Content is distributed in the DRM system from the Content Server to Terminal and from Terminal to Terminal (super-distribution). Only registered (i.e. DRM packaged) content should be distributed. The assumption that packaged content is useless without a voucher makes content distribution requirements pretty loose. We can use whatever transport mechanisms we desire, if the following requirements are fulfilled the content is in protected DRM packaged format and the information that is required by the voucher acquisition process is carried with the content (including Content ID, Voucher Server URL).

The most feasible transport mechanisms for Content Server to Terminal distribution are downlading in a standard browsing session (http) or server originated messaging with MMS. In Terminal to Terminal super-distribution MMS is an important mechanism. In addition, local link via OBEX over BT or cable may be used.

Voucher acquisition is the most important function of the DRM system. During that process a voucher is generated and distributed to the terminal and a monetary transaction takes place. The entities related to the voucher acquisition are Terminal, DRM Agent and Voucher Server.

The Terminal initiates voucher acquisition when the end user wants to consume content for which the terminal does not have a voucher. In the basic scenario the terminal contacts the end user's DRM Agent and requests an offer for a voucher. DRM Agent contacts the specific Voucher Server that registered the content and requests information about the vouchers (e.g. price). DRM Agent makes an offer for the end user. If end user accepts the offer DRM Agent deducts the appropriate amount of money from the end users account (e.g. operator billing) and requests the Voucher Server to generate one voucher for that terminal. The voucher is then sent to the terminal and after that the terminal is able to consume the content.

Money is collected from the end user during voucher acquisition. At the end of the day (or week or month) the settlement process must take place. In that process, each participant in the value chain gets a separate share of the money.

DRM Agent is entitled to its share because it takes care of the payment transaction with the end user. DRM Agent keeps track of all issued vouchers.

Voucher Server is the middleman between Content Servers and DRM Agents and is entitled for its share because it handles the content registration and voucher generation related issues. Voucher Server also keeps track of issued vouchers.

Content Server is close to the Content Owner (in many cases the same entity) and thus should get its large share because the actual value that the end user paid for is in the content itself. However, super-distribution based voucher acquisitions are invisible for the Content Server making it impossible for it to keep track of content consumption. Content Server must rely on the information received from the Voucher Server.

The settlement process is external to the DRM system and can be implemented by interfacing with existing invoicing systems.

The digital content is created (or aggregated) by the Content Server. This implies that the Content Server is in close relationship with the Content Owner.

The main functions of Content Server is to register digital content with a Voucher Server and distribute registered content to an end user. In most cases the Content Server is just a normal http-server with a content registration interface integrated to it.

The main functions of the Voucher Server are to receive content registration requests from Content Servers and to issue vouchers that enable terminals to consume registered content.

The voucher generation decision is an important control point from security point of view.

Voucher Server is in close relationship with the Content Server and must also have an agreement with a set of DRM Agents in order to make ensure that a large population of end users can consume the content. This is a win-win situation for both the Voucher Servers and DRM Agents.

Voucher Server maintains a database of registered content and keeps tracks of the generated vouchers.

DRM Agent is the middleman between the terminals that want to consume content and the Voucher Servers that generate the vouchers (i.e., DRM Agent plays a central role in the voucher acquisition process) especially in the payment transaction. The rationale for introducing a middleman is related to the difficulty of doing cost-efficient and convenient invoicing between multiple Voucher Servers and the end user.

The most important role of the DRM Agent is to handle the payment collection from the end user before the voucher is issued by the Voucher Server. This implies that there is a close relationship between the end user and the DRM Agent. In addition, the DRM Agent must also have an agreement with a set of Voucher Servers.

DRM Agent maintains a user database and keeps track of the generated vouchers.

The terminal is DRM system compliant and thus implements the communication protocols and functionality related to interfaces with Content Server, DRM Agent and other Terminals. The DRM system also assumes that some kind of local voucher and content repository is implemented.

Information about the chosen DRM Agents is configured to the terminal by the end user or the mobile operator (i.e., the terminal always initiates the voucher acquisition dialog with one of the end user's own DRM Agents).

The External Payment System may be, for example, operator billing system or credit card payment system.

All of the terminal management issues are separated to a DRM Terminal Infrastructure (DRMI). These include mechanisms for terminal initialization, personalization, key renovation and terminal revocation.

Referring again to FIG. 12 and FIG. 15, the Content Server-Voucher Server CS-VS interface is used to register digital content into the DRM system. Registration requests and responses add, modify, or delete a piece of content and the related information from Voucher Server. Mutual authentication is required between CS and VS. In addition, confidentiality and integrity of the communications must be protected. SOAP requests and responses over http with a SSL connection. VS acts as an http-server, CS as an http-client. Content registration may be quite infrequent in some cases. This implies that the interface can also be implemented with, for example, secure electronic-mail messaging between CS and VS operators.

Referring again to FIG. 12 and FIG. 15, the Content Server-Terminal CS-T interface is used to distribute the DRM protected content from the Content Server to the Terminals. Content object downloading network originated MMS messaging. There are no major security requirements for this interface. However, it is useful but not mandatory for the end user to authenticate the Content Server. The same goes for the other way around, although that is just normal behaviour of a Content Server and thus out of the scope of the DRM system. Spamming control needs to be implemented at some stage. Content downloading in a standard http/WAP-browsing session. The content may be wrapped inside a MIME or WAP multi-part message. Content may also be distributed with MMS messaging. Since MMS messages are based on RFC 822 the wrapping is similar to the browsing/downloading scenario. The actual transport mechanism should not be affected by DRM, only the processing of the received object is DRM specific.

Referring again to FIG. 12 and FIG. 15, the Terminal-Terminal T-T interface is used to super-distribute content and possibly vouchers from terminal to terminal. Content object sending to another terminal. This may include sending a preview or no-rights voucher with the content. There are no major security requirements for this interface. It is useful for the end user to authenticate the origin of the message. Spamming control needs to be implemented at some stage. The actual transport mechanism should not be affected by DRM, only the processing of the received object is DRM specific.

Referring again to FIG. 12 and FIG. 15, the Terminal-DRM Agent T-DA interface is used to acquire a voucher. Payment transaction is done via this interface. For voucher acquisition, the terminal initiates the acquisition process (T=>DA: CID, Transaction ID, Voucher Server URL, Terminal's DRM ID), DRM Agent responds and sends optionally an offer for the voucher, end user accepts or rejects the offer and performs payment related authentication, DRM Agent sends the voucher to the terminal. For GIVE voucher acquisition, the terminal initiates GIVE voucher acquisition process (T=>DA: CID, Transaction ID, Voucher Server URL, Terminal's DRM ID), DRM Agent responds and sends an offer for the GIVE voucher, end user accepts or rejects the offer and performs payment related authentication, DMR Agent sends the GIVE voucher to the terminal, terminal sends the GIVE voucher to another terminal (interface T-T). For GIVE voucher consumption, the terminal receives GIVE voucher (interface T-T), the Terminal sends GIVE voucher to the DRM Agent (T=>DA: GIVE voucher information, Transaction ID, Voucher Server URL, Terminal's DRM ID), DRM Agent sends a "normal" voucher back to the terminal, the terminal may download the content if it did not already have it (interface CS-T).

DRM Agent must authenticate the end user (actually DRM Agent is interested in authorization. However, authorization is usually based on authentication). The end user should be able to authenticate the DRM Agent, at least in those cases where it sends confidential information to the DRM Agent (e.g. username password). The integrity of the communications should be protected. Confidentiality requirements are not that major, expect possibly for GIVE vouchers (depends on the GIVE voucher implementation).

Referring again to FIG. 12 and FIG. 15, the DRM Agent-Voucher Server DA-VS interface is used to request information and vouchers from the Voucher Server. For voucher information requests and responses, DA=>VS Content ID, terminal DRM ID, transaction ID and VS=>DS Voucher descriptions and prices. For voucher requests and responses, DA=>VS Content ID, terminal DRM ID, transaction ID and VS=>DS Voucher. Mutual authentication is required between DA and VS. In addition, integrity of the communications must be protected. SOAP requests and responses over http with a SSL connection. VS acts as an http-server, DA as an http-client.

Referring again to FIG. 12 and FIG. 15, the DRM Agent-External Payment System DA-EPS interface is used to collect real money from the end user. The implementation of this interface is a feature of a specific DRM agent product.

Referring back to FIG. 12, the Voucher Server-DRM Terminal Infrastructure VS-DRMI interface is used by the Voucher Server to request information about the DRM terminals. The function of this interface is to get terminal cryptographic information of a specific terminal (e.g., symmetric key, public key or certificate) and to check revocation status of a specific terminal. One implementation is to use a full-blown terminal PKI with a directory service containing terminal certificates and revocation lists. This interface will most likely be specific to a terminal vendor and thus a Voucher Server product will need to implement a plug-in architecture for multiple terminal vendor DRMI implementations.

Referring again to FIG. 12 and FIG. 15, the Terminal-DRM Terminal Infrastructure T-DRMI interface is used for terminal management operations. The function of this interface is to perform terminal initialization (e.g., key generation), terminal renovation (e.g., key refresh, DRM client binary update), and terminal revocation. Anomaly detection mechanisms must be used to detect cracked terminals. This interface will most likely be terminal vendor specific and is used in some implementations only during manufacturing phase of the terminal.

The interfaces described above do not include all information exchange between the entities of the architecture. Certain contractual arrangements need to be done beforehand and monetary settlement after the fact (e.g. weekly or once in a month). In addition, mutual authentication is required in most cases between communicating parties implying that some kind of authentication information (e.g. usernames and passwords) may need to be exchanged beforehand.

These kind of arrangements are done between Content Server and Voucher Server, End user (terminal) and DRM Agent, DRM Agent and Voucher Server, DRM Agent and External Payment System, and Voucher Server and DRM Terminal Infrastructure.

As for security considerations, the DRM problem can be solved in a simple way if we do not allow super-distribution. This is called the "forward-lock" method that disables the end-user from forwarding the content to another terminal. Thus, everyone must get their ringing tone or whatever from the retail site and pay for it.

If we enable super-distribution the rules of the game are radically different. It gets very hard to keep the content within a closed system of trusted terminals, especially without dramatically restricting the super-distribution mechanisms.

Super-distribution changes the dynamics of security breaks when compared to the forward-lock solution. In the forward-lock solution it is difficult to distribute the cracked piece of content in large scale because ordinary terminals can not be trivially used for re-distribution. However, if super-distribution is enabled the cracked version will get distributed with the same mechanism as the original content. And paradoxically, the cracked version will get accelerated super-distribution because of its outstanding price/quality ratio when compared to the original piece. Thus, the competition between the cracked and original versions is quite unfair and may lead to a situation where the cracked version spreads like a virus and outnumbers the original version by far. This is difficult to estimate because we do not have much experience on suberdistribution.

The scenario above shows that it is very dangerous to compare the security requirements of forward-lock and super-distribution systems (e.g., "It is already possible to crack ringing tones in the forward-lock system but that has not been a problem—why should it be a problem in the super-distribution case?).

At the end of the day, cryptography is the only technology that provides us with mechanisms to protect the content once it gets distributed to an untrusted terminal (e.g. PC). In practice this means that the content is encrypted and the decryption key is only available for those terminals that have paid to consume the content.

Table 2 below describes some possible solutions to the DRM problem.

TABLE 2

| Solution name | Description | Comments |
| --- | --- | --- |
| Forward-lock | Terminal UI prevents the end user to forward the content to another terminal. Payment is done before downloading the content. | This is already used in Nokia mobile phones with e.g. ringing tones. Forward-lock kills super-distribution. |
| Link forwarding | This is content forward-lock, but allows the end user to forward the content URL. | Content is always downloaded from the URL into the terminal and payment is done before content downloading. This is an attempt to provide the functionality and user experience of super-distribution |

TABLE 2-continued

| Solution name | Description | Comments |
| --- | --- | --- |
| | | without a need for DRM key management infrastructure. This solution does not utilize the possibility to use an effective local link for super-distribution of the content. |
| Plain transport security | This is a DRM solution that piggybacks transport layer security protocols. | Messaging based super-distribution (e.g. MMS) is difficult to handle with this approach because it allows that the content can be sent to e.g. PC. That is difficult to prevent. |
| Content encrypted, voucher in plain text | Content is statically encrypted but the voucher (and the content decryption key within) is in plain text. Transport layer security protocols are piggybacked to protect the voucher while it is in transit. The vouchers that contain the decryption key are not forwarded. | This is an attempt to provide content encryption but avoid storing secret/private keys inside the terminal because of the costs of such DRM key management infrastructures. How to prevent that the voucher does not in a trivial way end up into an untrusted terminal (e.g. PC) and compromise the content? Client authentication would solve this, but that would require a secret inside the terminal... This solution is transport agnostic for the content delivery but not for the voucher delivery. |
| Content encrypted, voucher encrypted | This is the basic voucher based DRM model. | Securitywise, this solution is totally transport agnostic. Voucher needs to be personalized (if we assume that each terminal has personal keys). |

Method and System for Issuing Rights for Copyright Protected Content

Method for issuing rights for (copyright) protected content in a mobile communication environment with a wireless terminal by means of vouchers, which are issued by a voucher server having a connection to the mobile network of the terminal and having a connection to at least one content server. The vouchers issued by the voucher server contain usage rules, rights, and business rules relating to a content item and to the user. The voucher is connected to the content but is separate from the content. The voucher is deliverable separately from the content as specified by the terminal or the user to a terminal and/or to a server within the communication network for further processing and/or for acquiring the issued rights.

Method and System for Acquiring Rights for Copyright Protected Content

Method for acquiring rights for (copyright) protected content in a mobile communication environment with a wireless terminal by means of vouchers, which are issued by a voucher server having a connection to the mobile network of the terminal and having a connection to at least one content server. The method comprises steps of creating a connection with the content server (and the payment server), selecting at least one content item from a plurality of content items on a content server, specifying the scope of rights to the chosen content item(s), making payment(s) for the selected content item(s), receiving the voucher(s) for the selected and purchased content item(s), and storing the received voucher(s) at the terminal and/or at a server having a connection to the terminal and/or on a /physical carrier having a connection to the terminal for storing the received voucher(s). According to the method the rights issued by the voucher can also be modified according to the usage and/or business rules of the voucher and/or the voucher issuing system.

A registered terminal can acquire additional vouchers and/or modifications for existing vouchers with a one-click procedure (the terminal/user and the acquired vouchers are identified, expiry warnings)

Method and System for Accessing Copyright Protected Content

Method for accessing (copyright) protected content in a mobile communication environment by means of a wireless terminal using vouchers, which are issued by a voucher server having a connection to the mobile network of the terminal and having a connection to at least one content server and which vouchers specify at least a part of the scope of rights acquired unambiguously. According to the method a voucher specifying the scope of the rights to a content item is stored at the terminal or at a server having connection to the terminal and accessible to the user of the terminal for controlling the use of the specified content item, e.g., for consuming and/or other (further) processing, e.g., downloading, storing, super-distributing etc. as specified in the voucher. The specified content is delivered to the specified location after the validity and/or authenticity of the voucher is verified. In super-distribution the super-distributed content is made available according to the usage rules for that content item.

Method and System for Transferring Access Rights to Copyright Protected Content

Method for transferring access rights to (copyright) protected content in a mobile communication environment by means of a wireless terminals using vouchers, which are issued by a voucher server having a connection to the mobile network of the terminal and having a connection to at least one content server. According to the method at least one acquired voucher specifying the scope of the rights to a content item is accessible to the user of the terminal for controlling the use of the specified content item, e.g., for consuming and/or other (further) processing, e.g. downloading, storing, super-distributing etc. as specified in the voucher. The voucher can be stored at the first terminal and/or at a server having connection to the first terminal and/or at a (physical) carrier, which can be accessed by the first terminal. All or a part of the rights specified in the acquired voucher can be transferred to at least another terminal.

The transfer, which can be lending or super-distribution starts either with an offer from the first terminal (sender) to the second terminal (receiver) or with a request from the second terminal to the first terminal preferably by using a IR or RF link between the terminals. The first (sender) terminal transmits a message to the voucher server expressing the intent (lend/super-distribute) to transfer the rights. The message may contain in addition to the information concerning the voucher, also such information on the receiving terminal that the transaction can be fulfilled (identification of the second terminal and payment server of the second terminal). The voucher of the first terminal is modified according to the transfer intent.

The resulting invention is applicable to virtually all digital communications networks, including wide area networks (WANs), metropolitan area networks (MANs), local area networks (LANs), and personal area networks (PANs). The resulting invention is applicable to fixed station wireline networks, mobile wireless networks, and hybrid combinations of fixed station wireline networks communicating through wireless access points with mobile wireless networks. In particular, the resulting invention is applicable to any mobile computing environment, including any wireless wide area network such as a cellular telephone network or any short range wireless system such as a wireless local area network or a wireless personal area network. Examples of wireless, wide area network architectures to which the invention applies include Global System for Mobile Communication (GSM), IS-136 TDMA-based Digital Advanced Mobile Phone Service (DAMPS), Personal Digital Cellular (PDC), IS-95 CDMA-based cdmaOne System, General Packet Radio Service (GPRS) and broadband wireless systems such as W-CDMA, and Broadband GPRS. Examples of short-range wireless systems to which the invention applies include the Bluetooth Standard, the IEEE 802.11 Wireless LAN Standard the HIPERLAN Standard, the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

Although the embodiments disclosed herein describe a fully functioning method, system, and computer program product for controlling the distribution of a digital asset in a mobile environment, the reader should understand that other equivalent embodiments exist. Since numerous modifications and variations will occur to those who review this disclosure, the method, system, and computer program product for controlling the distribution of a digital asset in a mobile environment is not limited to the exact construction and operation illustrated and disclosed herein. Accordingly, this disclosure intends all suitable modifications and equivalents to fall within the scope of the claims.

We claim:

1. A method comprising:
   sending with a wireless device a request for a voucher for protected content of a digital asset encrypted with a content key and information expressed in the voucher for obtaining rights to the content, said digital asset to be downloaded to the wireless device from any one of a plurality of content servers;
   receiving with the wireless device a primary and a secondary voucher separate from said protected content;
   said primary voucher allowing a user to render content a plurality of times, and including a first pointer to the content, and further including a first reference to the secondary voucher;
   said secondary voucher allowing a preview of the content to be distributed to another user, and including a second pointer to the content, and further including a second reference to the secondary voucher allowing the secondary voucher to create a duplicate of itself;
   said primary and secondary vouchers having metadata including:
      identification information of the content associated with the voucher;
      use information specifying the type of use intended for the content; and
      restriction information limiting usage of the content;
   said primary voucher including transaction information including said content key;
      said use information including selective intent rules specifying at least whether no right to copy the content is given to the receiver, whether right to copy the content is relinquished by the sender and given to the receiver, or whether right to copy the content is kept by the sender and also given to the receiver;
   accessing the primary voucher in the wireless device to cause a duplicate of the content as a primary content copy to be transmitted to a receiving terminal with the right to copy the content in response to said selective intent rules;
   using the first reference in the primary voucher to access the secondary voucher in the wireless device to cause a preview copy of the content to be transmitted to a receiving terminal with no right to copy the content in response to said selective intent rules;
   enabling the wireless device to decrypt said encrypted content with said content key; and
   interpreting said use information in said vouchers to carry out said selective intent rules.

2. The method of claim 1, wherein the wireless device includes a device ID and wherein the primary voucher includes metadata having transaction information including said content key joined with a reference device ID for the wireless device, further comprising:
   recovering said content key if said device ID matches the reference device ID in the metadata; and
   enabling the wireless device to decrypt said encrypted content with the said recovered content key.

3. The method of claim 1, wherein the wireless device includes a user ID and wherein the primary voucher includes metadata having transaction information including said content key joined with a reference user ID for the wireless device, further comprising:
   recovering said content key if said user ID matches the reference user ID in the metadata; and
   enabling the wireless device to decrypt said encrypted content with the said recovered content key.

4. A system comprising:
   a memory device; and
   a processor disposed in communication with the memory device, the processor configured to:
      send a request for a voucher for protected content of a digital asset encrypted with a content key and information expressed in the voucher for obtaining rights to the content, said digital asset to be downloaded to the wireless device from any one of a plurality of content servers;
receive with the wireless device a primary and a secondary voucher separate from said protected content;
said primary voucher allowing a user to render content a plurality of times, and including a first pointer to the content, and further including a first reference to the secondary voucher;
said secondary voucher allowing a preview of the content to be distributed to another user, and including a second pointer to the content, and further including a second reference to the secondary voucher allowing the secondary voucher to create a duplicate of itself;
said primary and secondary vouchers having metadata including:
identification information of the content associated with the voucher;
use information specifying the type of use intended for the content; and
restriction information limiting usage of the content;
said primary voucher including transaction information including said content key;
said use information including selective intent rules specifying at least whether no right to copy the content is given to the receiver, whether right to copy the content is relinquished by the sender and given to the receiver, or whether right to copy the content is kept by the sender and also given to the receiver;
access the primary voucher in the wireless device to cause a duplicate of the content as a primary content copy to be transmitted to a receiving terminal with the right to copy the content in response to said selective intent rules;
use the first reference in the primary voucher to access the secondary voucher in the wireless device to cause a preview copy of the content to be transmitted to a receiving terminal with no right to copy the content in response to said selective intent rules;
enable the wireless device to decrypt said encrypted content with said content key; and
interpret said use information in said vouchers to carry out said selective intent rules.

5. The system of claim 4, wherein the wireless device includes a device ID and wherein the primary voucher includes metadata having transaction information including said content key joined with a reference device ID for the wireless device, the processor further configured to:
recover said content key if said device ID matches the reference device ID in the metadata; and
enable the wireless device to decrypt said encrypted content with the said recovered content key.

6. The system of claim 4, wherein the wireless device includes a user ID and wherein the primary voucher includes metadata having transaction information including said content key joined with a reference user ID for the wireless device, the processor is further configured to:
recover said content key if said user ID matches the reference user ID in the metadata; and
enable the wireless device to decrypt said encrypted content with the said recovered content key.

7. A computer program product comprising:
a computer readable medium;
program code in said computer readable medium for sending with a wireless device a request for a voucher for protected content of a digital asset encrypted with a content key and information expressed in the voucher for obtaining rights to the content, said digital asset to be downloaded to the wireless device from any one of a plurality of content servers;
program code in said computer readable medium for receiving with the wireless device a primary and a secondary voucher separate from said protected content;
said primary voucher allowing a user to render content a plurality of times, and including a first pointer to the content, and further including a first reference to the secondary voucher;
said secondary voucher allowing a preview of the content to be distributed to another user, and including a second pointer to the content, and further including a second reference to the secondary voucher allowing the secondary voucher to create a duplicate of itself;
said primary and secondary vouchers having metadata including:
identification information of the content associated with the voucher;
use information specifying the type of use intended for the content; and
restriction information limiting usage of the content;
said primary voucher including transaction information including said content key;
said use information including selective intent rules specifying at least whether no right to copy the content is given to the receiver, whether right to copy the content is relinquished by the sender and given to the receiver, or whether right to copy the content is kept by the sender and also given to the receiver;
program code in said computer readable medium for accessing the primary voucher in the wireless device to cause a duplicate of the content as a primary content copy to be transmitted to a receiving terminal with the right to copy the content in response to said selective intent rules;
program code in said computer readable medium for using the first reference in the primary voucher to access the secondary voucher in the wireless device to cause a preview copy of the content to be transmitted to a receiving terminal with no right to copy the content in response to said selective intent rules;
program code in said computer readable medium for enabling the wireless device to decrypt said encrypted content with said content key; and
program code in said computer readable medium for interpreting said use information in said vouchers to carry out said selective intent rules.

8. The computer program product of claim 7, wherein the wireless device includes a device ID and wherein the primary voucher includes metadata having transaction information including said content key joined with a reference device ID for the wireless device, further comprising:
program code in said computer readable medium for recovering said content key if said device ID matches the reference device ID in the metadata; and
program code in said computer readable medium for enabling the wireless device to decrypt said encrypted content with the said recovered content key.

9. The computer program product of claim 7, wherein the wireless device includes a user ID and wherein the primary voucher includes metadata having transaction information including said content key joined with a reference user ID for the wireless device, further comprising:
program code in said computer readable medium for recovering said content key if said user ID matches the reference user ID in the metadata; and program code in said computer readable medium for enabling the wireless device to decrypt said encrypted content with the said recovered content key.

10. A method comprising:
sending with a wireless device a request for a voucher for protected content of a digital asset encrypted with a content key and information expressed in the voucher for obtaining rights to the content, said digital asset to be downloaded to the wireless device from any one of a plurality of other wireless devices;
receiving with the wireless device a primary and a secondary separate from said protected content;
said primary voucher allowing a user to render content a plurality of times, and including a first pointer to the content, and further including a first reference to the secondary voucher;
said secondary voucher allowing a preview of the content to be distributed to another user, and including a second pointer to the content, and further including a second reference to the secondary voucher allowing the secondary voucher to create a duplicate of itself;
said primary and secondary vouchers having metadata including:
identification information of the content associated with the voucher;
use information specifying the type of use intended for the content; and
restriction information limiting usage of the content;
said primary voucher including transaction information including said content key;
said use information including selective intent rules specifying at least whether no right to copy the content is given to the receiver, whether right to copy the content is relinquished by the sender and given to the receiver, or whether right to copy the content is kept by the sender and also given to the receiver;
accessing the primary voucher in the wireless device to cause a duplicate of the content as a primary content copy to be transmitted to a receiving terminal with the right to copy the content in response to said selective intent rules;
using the first reference in the primary voucher to access the secondary voucher in the wireless device to cause a preview copy of the content to be transmitted to a receiving terminal with no right to copy the content in response to said selective intent rules;
enabling the wireless device to decrypt said encrypted content with said content key; and
interpreting said use information in said vouchers to carry out said selective intent rules.

11. The method of claim 10, wherein the wireless device includes a device ID and wherein the primary voucher includes metadata having transaction information including said content key joined with a reference device ID for the wireless device, further comprising:
recovering said content key if said device ID matches the reference device ID in the metadata; and
enabling the wireless device to decrypt said encrypted content with the said recovered content key.

12. The method of claim 10, wherein the wireless device includes a user ID and wherein the primary voucher includes metadata having transaction information including said content key joined with a reference user ID for the wireless device, further comprising:
recovering said content key if said user ID matches the reference user ID in the metadata; and
enabling the wireless device to decrypt said encrypted content with the said recovered content key.

13. A system comprising:
a memory device; and
a processor disposed in communication with the memory device, the processor configured to:
send a request for a voucher for protected content of a digital asset encrypted with a content key and information expressed in the voucher for obtaining rights to the content,
said digital asset to be downloaded to the wireless device from any one of a plurality of other wireless devices;
receive with the wireless device a primary and a secondary voucher separate from said protected content;
said primary voucher allowing a user to render content a plurality of times, and including a first pointer to the content, and further including a first reference to the secondary voucher;
said secondary voucher allowing a preview of the content to be distributed to another user, and including a second pointer to the content, and further including a second reference to the secondary voucher allowing the secondary voucher to create a duplicate of itself;
said primary and secondary vouchers having metadata including:
identification information of the content associated with the voucher;
use information specifying the type of use intended for the content; and
restriction information limiting usage of the content;
said primary voucher including transaction information including said content key;
said use information including selective intent rules specifying at least whether no right to copy the content is given to the receiver, whether right to copy the content is relinquished by the sender and given to the receiver, or whether right to copy the content is kept by the sender and also given to the receiver;
access the primary voucher in the wireless device to cause a duplicate of the content as a primary content copy to be transmitted to a receiving terminal with the right to copy the content in response to said selective intent rules;
use the first reference in the primary voucher to access the secondary voucher in the wireless device to cause a preview copy of the content to be transmitted to a receiving terminal with no right to copy the content in response to said selective intent rules;
enable the wireless device to decrypt said encrypted content with said content key; and
interpret said use information in said vouchers to carry out said selective intent rules.

14. The system of claim 13, wherein the wireless device includes a device ID and wherein the primary voucher includes metadata having transaction information including said content key joined with a reference device ID for the wireless device, the processor further configured to:
recover said content key if said device ID matches the reference device ID in the metadata; and
enable the wireless device to decrypt said encrypted content with the said recovered content key.

15. The system of claim 13, wherein the wireless device includes a user ID and wherein the primary voucher includes metadata having transaction information including said content key joined with a reference user ID for the wireless device, the processor further configured to:

recover said content key if said user ID matches the reference user ID in the metadata; and enable the wireless device to decrypt said encrypted content with the said recovered content key.

16. A computer program product comprising:

a computer readable medium;

program code in said computer readable medium for sending with a wireless device a request for a voucher for protected content of a digital asset encrypted with a content key and information expressed in the voucher for obtaining rights to the content, said digital asset to be downloaded to the wireless device from any one of a plurality of other wireless devices;

program code in said computer readable medium for receiving with the wireless device a primary and a secondary voucher separate from said protected content;

said primary voucher allowing a user to render content a plurality of times, and including a first pointer to the content, and further including a first reference to the secondary voucher;

said secondary voucher allowing a preview of the content to be distributed to another user, and including a second pointer to the content, and further including a second reference to the secondary voucher allowing the secondary voucher to create a duplicate of itself;

said primary and secondary vouchers having metadata including:

identification information of the content associated with the voucher;

use information specifying the type of use intended for the content; and restriction information limiting usage of the content;

said primary voucher including transaction information including said content key;

said use information including selective intent rules specifying at least whether no right to copy the content is given to the receiver, whether right to copy the content is relinquished by the sender and given to the receiver, or whether right to copy the content is kept by the sender and also given to the receiver;

program code in said computer readable medium for accessing the primary voucher in the wireless device to cause a duplicate of the content as a primary content copy to be transmitted to a receiving terminal with the right to copy the content in response to said selective intent rules;

program code in said computer readable medium for using the first reference in the primary voucher to access the secondary voucher in the wireless device to cause a preview copy of the content to be transmitted to a receiving terminal with no right to copy the content in response to said selective intent rules;

program code in said computer readable medium for enabling the wireless device to decrypt said encrypted content with said content key; and program code in said computer readable medium for interpreting said use information in said vouchers to carry out said selective intent rules.

17. The computer program product of claim 16, wherein the wireless device includes a device ID and wherein the primary voucher includes metadata having transaction information including said content key joined with a reference device ID for the wireless device, further comprising:

program code in said computer readable medium for recovering said content key if said device ID matches the reference device ID in the metadata; and program code in said computer readable medium for enabling the wireless device to decrypt said encrypted content with the said recovered content key.

18. The computer program product of claim 16, wherein the wireless device includes a user ID and wherein the primary voucher includes metadata having transaction information including said content key joined with a reference user ID for the wireless device, further comprising:

program code in said computer readable medium for recovering said content key if said user ID matches the reference user ID in the metadata; and program code in said computer readable medium for enabling the wireless device to decrypt said encrypted content with the said recovered content key.

* * * * *

UNITED STATES PATENT AND TRADEMARK OFFICE
CERTIFICATE OF CORRECTION

PATENT NO. : 7,421,411 B2  Page 1 of 1
APPLICATION NO. : 10/095062
DATED : September 2, 2008
INVENTOR(S) : Kontio et al.

It is certified that error appears in the above-identified patent and that said Letters Patent is hereby corrected as shown below:

<u>Column 54</u>

In claim 4, line 64, "forprotected" should read --for protected--.

Signed and Sealed this

Seventeenth Day of February, 2009

JOHN DOLL
*Acting Director of the United States Patent and Trademark Office*